United States Patent
Miyazaki et al.

(10) Patent No.: US 7,483,177 B2
(45) Date of Patent: Jan. 27, 2009

(54) PRINT PROCESSING SYSTEM, PRINT PROCESSING METHOD, PRINT PROCESSING PROGRAM, PRINTER DEVICE, PRINTING INSTRUCTION DEVICE

(75) Inventors: Mariko Miyazaki, Kanagawa (JP); Hideki Fujimoto, Kanagawa (JP); Tadaaki Sato, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1041 days.

(21) Appl. No.: 10/809,502

(22) Filed: Mar. 26, 2004

(65) Prior Publication Data

US 2005/0007632 A1 Jan. 13, 2005

(30) Foreign Application Priority Data

| Jul. 10, 2003 | (JP) | ............................. 2003-272992 |
| Jul. 10, 2003 | (JP) | ............................. 2003-272994 |
| Aug. 5, 2003 | (JP) | ............................. 2003-286870 |

(51) Int. Cl.
*B41C 1/02* (2006.01)
*G06F 15/173* (2006.01)

(52) U.S. Cl. ..................... 358/3.29; 709/224

(58) Field of Classification Search ............... 358/3.29, 358/1.14, 1.15, 504, 518, 1.18; 709/200, 709/206, 223, 224; 428/195.1, 32.18, 32.2, 428/34.4, 411.1; 400/82, 109.1, 127, 131; 283/67, 91, 107, 904
See application file for complete search history.

(56) References Cited

U.S. PATENT DOCUMENTS

| 6,718,871 B1* | 4/2004 | Fritz ........................... 101/3.1 |
| 7,020,840 B2* | 3/2006 | Sharp .......................... 715/209 |
| 2004/0153204 A1* | 8/2004 | Blanco ....................... 700/207 |

FOREIGN PATENT DOCUMENTS

| JP | A 9-150559 | 6/1997 |
| JP | A 2001-134006 | 5/2001 |
| JP | A 2001-134091 | 5/2001 |
| JP | A 2001-194846 | 7/2001 |

* cited by examiner

*Primary Examiner*—Saeid Ebrahimi Dehkordy
(74) *Attorney, Agent, or Firm*—Oliff & Berridge, PLC

(57) ABSTRACT

A printing instruction device which generates a print job of document information as an object to be printed and sends it to a printer device, includes an embossed printing instruction unit that instructs embossed print setting including an object to be embossed-printed; an extraction unit that analyzes the document information to be printed and extracts the object instructed by the embossed printing instruction unit; an embossed print drawing command generation unit that generates, in accordance with the extracted object, an embossed print drawing command needed for embossed printing of the object; and a print job generation unit that generates the print job by adding the embossed print drawing command to a non-embossed print drawing command needed for non-embossed printing of the document information to be printed.

64 Claims, 46 Drawing Sheets

FIG.8A  TRANSFER STEP (Y) 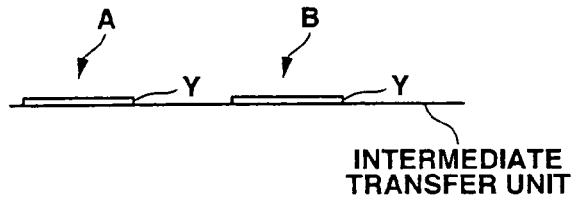
FIG.8B  TRANSFER STEP (M) 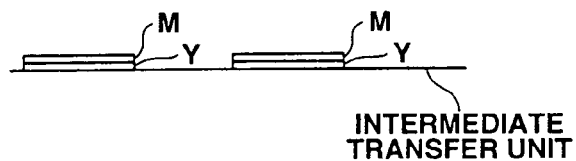
FIG.8C  TRANSFER STEP (C) 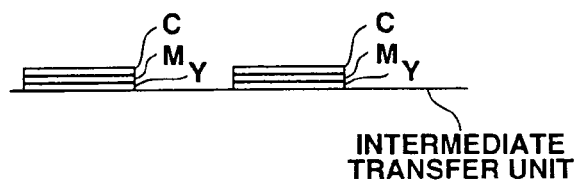
FIG.8D  TRANSFER STEP (K) 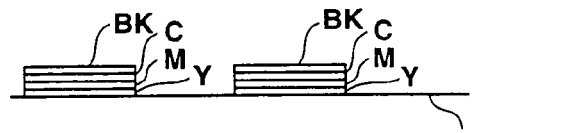
FIG.8E  TRANSFER STEP (H) 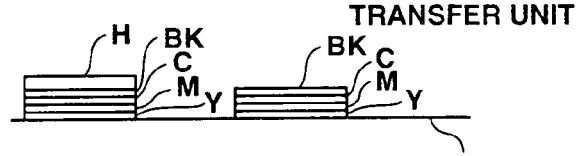
FIG.8F  SECONDARY TRANSFER STEP 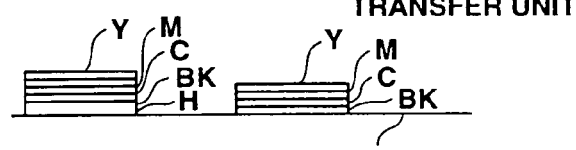
FIG.8G  FIXING STEP 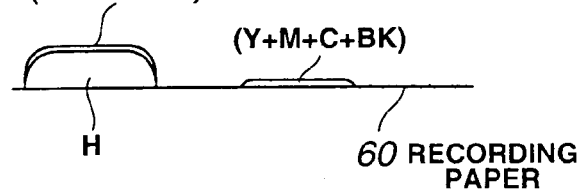

REFLECT OVERLAP

DISREGARD OVERLAP

OVERLAP IS NOT EMBOSSED

LOGIC OPERATION ON OVERLAP

DISPLACEMENT IN PRESCRIBED DIRECTION

ENHANCEMENT OF CONTOUR

INDICATION OF SHADOW ON THE PERIPHERY BY GRADATION

FIG.17

EMBOSSED PRINT SETTING 41

EMBOSSED PRINT DESIGNATION
- ☑ EMBOSSED PRINTING
- ☐ PSEUDO EMBOSSED PRINTING
- ⦿ PRINTING EMBOSSED IMAGE LAST
- ○ PRINTING EMBOSSED IMAGE FIRST

EMBOSSING TARGET DESIGNATION
- ☑ FONT — Arial ▼
- ☑ GRAPHIC — RECTANGLE ▼
- ☐ FONT MODIFICATION — BOLD ▼
- ☑ COLOR — RED ▼
- ☑ SPECIFIC SYMBOLS — ※ ○ △ ▼
- ☐ IMAGE

VARIATION DESIGNATION
- ☑ HEIGHT — 2mm ▼
- ☐ DATA SCALING — 120% ▼
- ☐ EMBOSSED SHAPE — SEMICYLINDRICAL FORM ▼
- ☐ ENHANCEMENT OF A SOLID — SHADOWING ▼
- ☑ COLOR ADDITION — GRADATION 1 ▼
- ☐ EMBOSSED SURFACE PATTERN — SHADE 1 ▼

OVERLAP DESIGNATION
- ⦿ REFLECT OVERLAP
- ○ DISREGARD OVERLAP
- ○ NOT EMBOSS OVERLAP
- ○ LOGIC OPERATION ON OVERLAP — AND ▼

ALLOCATION OF ATTRIBUTE VALUE TO HEIGHT
- ○ CONVERT BRIGHTNESS INTO HEIGHT
- ○ CONVERT CHROMA INTO HEIGHT
- ○ CONVERT HUE INTO HEIGHT
- ○ CONVERT DENSITY INTO HEIGHT

FIG.37

EMBOSSED PRINT SETTING 42

EMBOSSED PRINT DESIGNATION
- ☑ EMBOSSED PRINTING
- ☐ PSEUDO EMBOSSED PRINTING
- ⦿ PRINTING EMBOSSED IMAGE LAST
- ○ PRINTING EMBOSSED IMAGE FIRST

EMBOSSING TARGET DESIGNATION
- ☑ FONT — Arial ▼
- ☑ GRAPHIC — RECTANGLE ▼
- ☐ FONT MODIFICATION — BOLD ▼
- ☑ COLOR — RED ▼
- ☑ SPECIFIC SYMBOLS — ※ ○ △ ▼
- ☐ IMAGE ☐ OTHER — STAMP ▼

VARIATION DESIGNATION
- ☑ HEIGHT — 2mm ▼
- ☐ DATA SCALING — 120% ▼
- ☐ EMBOSSED SHAPE — SEMICYLINDRICAL FORM ▼
- ☐ ENHANCEMENT OF A SOLID — SHADOWING ▼
- ☑ COLOR ADDITION — GRADATION 1 ▼
- ☐ EMBOSSED SURFACE PATTERN — SHADE 1 ▼

OVERLAP DESIGNATION
- ⦿ REFLECT OVERLAP
- ○ DISREGARD OVERLAP
- ○ NOT EMBOSS OVERLAP
- ○ LOGIC OPERATION ON OVERLAP — AND ▼

ALLOCATION OF ATTRIBUTE VALUE TO HEIGHT
- ○ CONVERT BRIGHTNESS INTO HEIGHT
- ○ CONVERT CHROMA INTO HEIGHT
- ○ CONVERT HUE INTO HEIGHT
- ○ CONVERT DENSITY INTO HEIGHT

FIG.38A

AAA

<ESC>※ATTENTION <ESC>

FIG.38B

AAA
bbb
※ATTENTION
ddd
eee

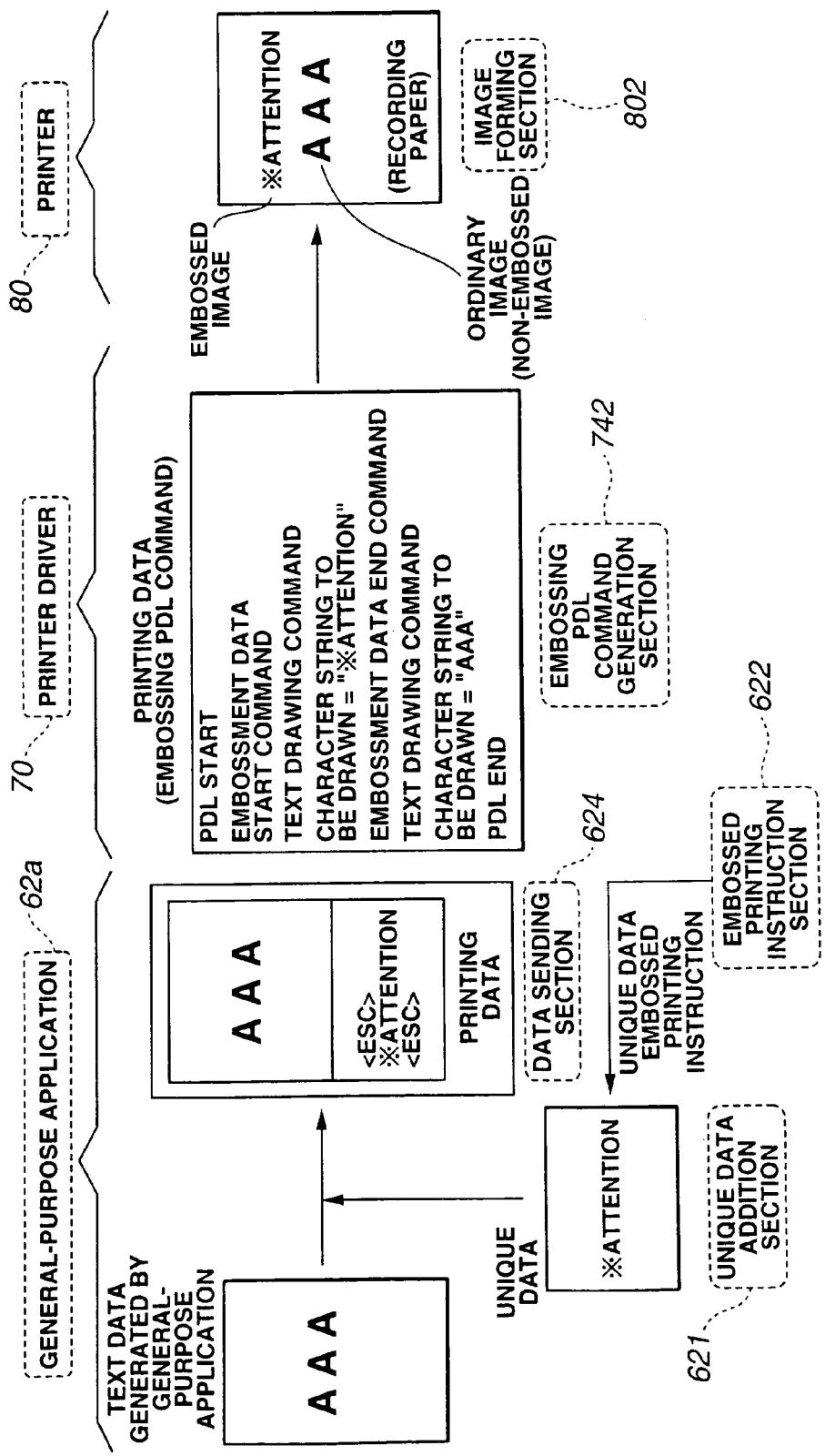

PRINT PROCESSING SYSTEM, PRINT PROCESSING METHOD, PRINT PROCESSING PROGRAM, PRINTER DEVICE, PRINTING INSTRUCTION DEVICE

BACKGROUND OF THE INVENTION

1. Field of the Invention

The present invention relates to a print processing system comprising a printer device and a printing instruction device, and more particularly to a print processing system, a print processing method, a print processing program, a printer device and a printing instruction device capable of instructing embossed print settings containing an object subject to embossed printing when embossed printing including an embossed image is executed according to document information subject to printing provided by an application and additional information.

2. Description of the Related Art

Today, image forming devices such as printers and copy machines for forming embossed images by an electrophotographic method or an electrostatic recording method and using an expandable toner are known.

For example, Japanese Patent Laid-Open Publications No. 2001-134006, No. 2001-134091 and No. 2001-194846 disclose a technology of forming an embossed image by placing toner images containing color materials of prescribed colors on an expandable toner image in an electrophotographic recording process, expanding the expandable toner image by heating in a fixing step, and melting and fixing the toner images of the individual colors on the expanded toner image.

As a print processing system for achieving the above embossed printing, it may be configured to have a printer driver and a printer as shown in, for example, FIG. 44.

But, the printer driver used for such a conventional system merely has a processing function of generating, for example, a command in a PDL (Page-Description Language) form and sending it to a printer according to document information subject to printing by a drawing command from an application.

In other words, the printer driver of the above conventional system does not have a function of executing an embossed printing instruction about which part of the document information to be printed is embossed-printed and is naturally incapable of printing the designated part of the document information as an embossed image according to the embossed printing instruction.

Therefore, to achieve the embossed printing by the conventional system of the above type, the embossed printing instruction must be based on an application.

Thus, the conventional system is incapable of executing an embossed printing instruction about which part of the document information subject to printing is embossed-printed except that a special application having an embossed printing instruction function is used and has a disadvantage that an ordinary application and printer cannot be used to achieve the embossed printing.

As a print processing system for achieving the embossed printing as described above, it was considered to configure as shown in, for example, FIG. 45 that a particular data section in data (document information) to be printed and input from an information input section was instructed from a user by some method and the instructed data section was printed as an embossed image by a printer using fixed embossed output specifications previously provided for the system.

The conventional system of the type described above was capable of instructing which part of the data to be printed was embossed-printed but was not provided with a function of instructing embossed output specifications indicating how to form an embossed image.

Therefore, the embossed printing of the data section instructed by the user was limited to the embossed output specifications predetermined by the system.

Thus, the conventional system can instruct which part of the data to be printed is embossed-printed but has drawbacks that it cannot instruct the embossed output specifications indicating how to form an embossed image, so that the data section instructed by the user must be embossed-printed with the embossed output specifications predetermined by the system, and embossed printing satisfying various embossed output specifications desired by the user cannot be executed.

There is also a known unique data-added print processing system which adds unique data to text data to be input from external software and performs an image print output processing according to the text data to which the unique data is added.

As a method of achieving such a type of unique data-added print processing system, for example, the printer driver having received data (text data) to be printed from the application adds unique data to be input from the device per se to the text data and sends it to the printer, and the printer prints out an image having a mixture of the text data from the application and the unique data added by the printer driver.

FIG. 46 is a conceptual diagram showing a flow of the print processing by the above-described type of conventional system.

In FIG. 46, when text data "AAA" to be printed is input from a general-purpose application, a printer driver 70*a* adds, for example, data "confidential" as unique data to generate print data and sends it to a printer 80*a*.

In this case, the print data being sent from the printer driver 70*a* to the printer 80*a* includes, for example, a drawing command in a PDL (Page-Description Language) form or the like, and especially it includes a drawing command (PDL command) corresponding to the text data "AAA" and the unique data "confidential" added thereto.

Meanwhile, the printer 80*a* analyzes the print data being input from the printer driver 70*a* and prints out the pertinent data according to the drawing command contained therein.

In the print processing process of the above conventional system, the print data generated by the printer driver 70*a* is a drawing command indicating simple drawing of the text data "AAA" and the unique data "confidential", and the output result by the printer 80*a* is simple printout of images corresponding to both data as an ordinary non-embossed image.

Therefore, it is impossible for the user to determine by simply seeing the printed result whether the "confidential" is the unique data added during the processing.

As a specific example of the conventional system of the type described above, for example, Japanese Patent Laid-Open Publication No. 9-150559 discloses a printer system which pastes image data corresponding to unique data to a fixed form of document corresponding to text data and prints it.

According to the above conventional system, both the text data (fixed form of document) and the unique data (image data) are simply printed as an ordinary image (non-embossed image), and it cannot be judged that the image data was added during the processing (printer driver 70*a*).

Thus, the above-described conventional system generates the drawing command according to the text data which is input from external software and the unique data added during the processing and prints out both the data as the ordinary plane image according to the drawing command. Therefore, it has a drawback that the user cannot distinguish between the text data input from the external software and the unique data added during the processing by simply seeing the printed result.

SUMMARY OF THE INVENTION

The present invention has been made in view of the above circumstances and provides a print processing system capable of executing embossed printing using an ordinary application, a printer device used therefor, a printing instruction device and a program therefor.

The present invention also provides a print processing system, that the user can instruct embossed printing specifications and an embossed image with embossed specifications closer to an image possessed by the user can be printed, and a printing instruction device used therefor.

The present invention also provides a print processing system having a print processing function capable of easily judging which data is unique data added during the processing from the printed result according to the text data and the unique data added to it and a print processing method.

A print processing system according to a first aspect of the present invention comprises a printing instruction device that generates a print job of document information as an object to be printed and sends it to a printer device and the printer device that receives the print job from the printing instruction device and records an image according to the print job, wherein an embossed printing instruction unit instructing embossed print settings including an object subject to embossed printing is disposed on at least one of the printing instruction device and the printer device.

According to the first aspect of the present invention, at least one of the printing instruction device and the printer device is provided with the function of instructing the embossed print settings including the object subject to embossed printing. Thus, when the desired object or the like is simply designated by the embossed printing instruction function, the embossed printing having the designated object mixed as an embossed image can be achieved using an ordinary application.

A print processing system according to a second aspect of the present invention, that executes print processing to print an image having a mixture of an embossed image according to document information subject to printing, comprises an embossed printing instruction unit that instructs embossed output specifications including a height of the embossed image; an embossed print drawing command generation unit that generates an embossed print drawing command needed to print an object subject to embossed printing in the document information subject to printing according to the embossed output specifications instructed by the embossed printing instruction unit; and a printing unit that generates embossed print data according to the embossed print drawing command generated by the embossed print drawing command generation unit and using the embossed print data to print out an object subject to drawing by the embossed print drawing command as an embossed image satisfying the embossed output specifications instructed by the embossed printing instruction unit.

According to the second aspect of the present invention, the instruction unit that instructs embossed output specifications including a height, a relief shape and the like of the embossed image is disposed to generate the embossed print drawing command, which is needed to print the object to be embossed-printed in the document information subject to printing with the embossed output specifications instructed by the instruction unit. Therefore, the user can designate desired embossed output specifications from various types of embossed output specifications to print out an embossed image closer to the image possessed by the user, and the embossed image can be expressed as an embossed image more effectively by using the embossed output specifications rich in variations.

A print processing system according to a third aspect of the present invention comprises a unique data adding unit that adds unique data to text data to be input; an embossed printing instruction unit that instructs whether the unique data to be added to the text data is embossed-printed or not; a unique data embossing instruction processing unit that adds the unique data to the text data and outputting it including an embossed printing instruction to the unique data when embossed printing of the unique data is instructed by the embossed printing instruction unit; and an embossment data processing unit that recognizes unique data in the data according to a unique data embossed printing instruction in the data being output from the unique data embossing instruction processing unit as embossment data to be embossed-printed and processing to output the unique data recognized as the embossment data and the text data not recognized as the embossment data as an embossed image and an ordinary image.

According to the third aspect of the present invention, it is configured that when the unique data to be added to the text data is instructed to be embossed-printed or not and the embossed printing is instructed, the unique data is added to the text data and output including the embossed printing instruction to the unique data, the unique data contained in the data is recognized as embossment data to be embossed-printed according to the unique data embossed printing instruction contained in the data to be output, and the unique data recognized as the embossment data and the text data not recognized as the embossment data each are output as an embossed image and an ordinary image. Therefore, the text data and the unique data each are printed out as a non-embossed image and an embossed image in an apparently different mode, and the user can easily judge from the printed result that the data printed as the embossed image is the unique data added during the processing.

BRIEF DESCRIPTION OF THE DRAWINGS

Preferred embodiments of the present invention will be described in detail based on the following figures, wherein:

FIG. 8 is a conceptual sectional diagram showing the structure of a toner image in a transfer and fixing process by an image forming section;

FIG. 17 is a diagram showing a structure of a UI screen for executing an embossed print setting instruction;

FIG. 37 is a diagram showing a structure of the embossed print setting screen according to the third embodiment;

FIG. 38 is a conceptual diagram showing a data transmission mode from the data sending section according to the third embodiment;

FIG. 39 is a diagram showing a flow of a print processing operation of the system according to the third embodiment;

DETAILED DESCRIPTION OF THE INVENTION

Embodiments of the present invention will be described in detail with reference to the accompanying drawings.

First, a print processing by the print processing system according to the first embodiment of the invention will be described briefly with reference to FIG. 1 and FIG. 2.

Figure 1:
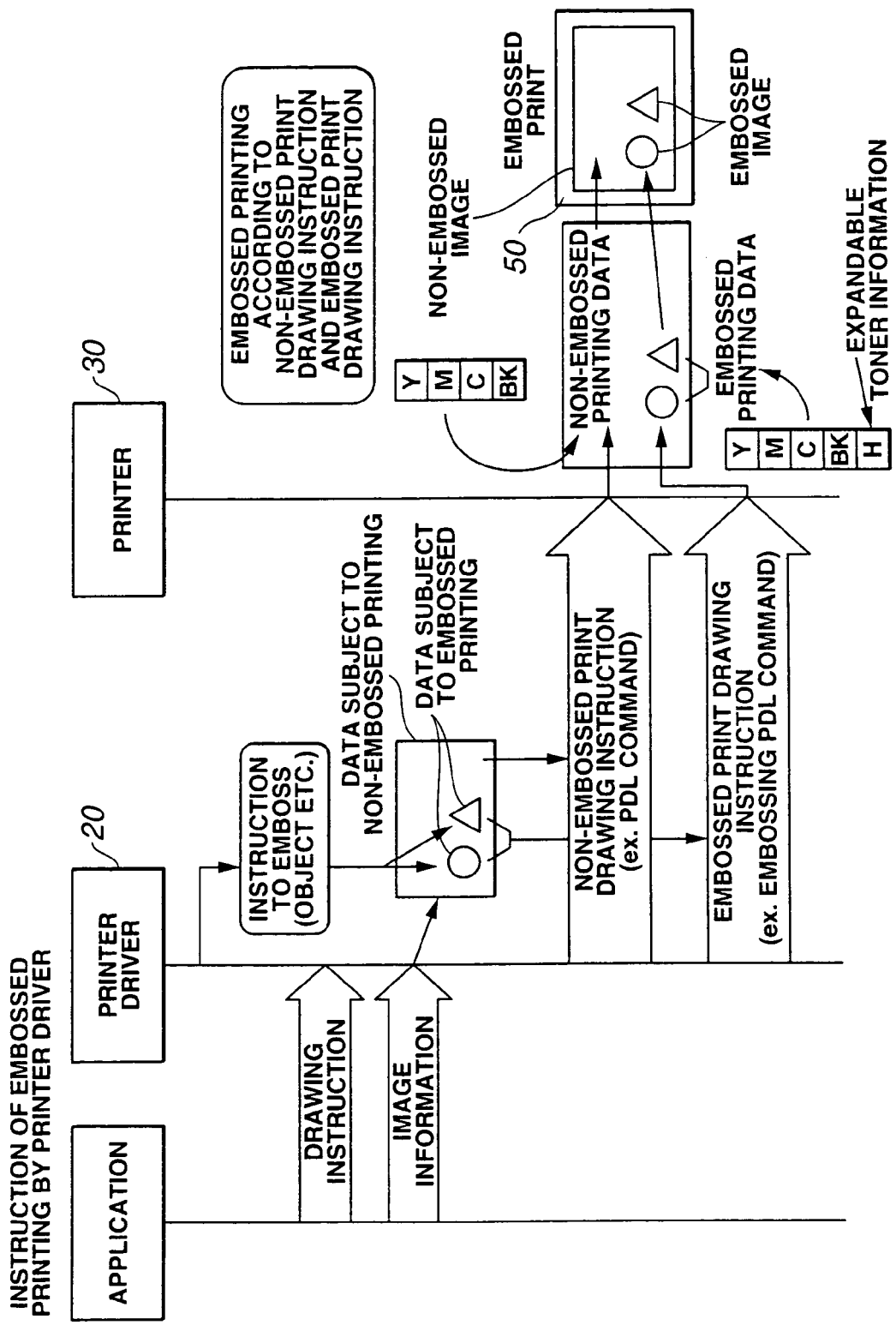
FIG. 1 is a conceptual diagram showing a print processing operation of instructing embossed print settings by a printer driver.
Figure 2:
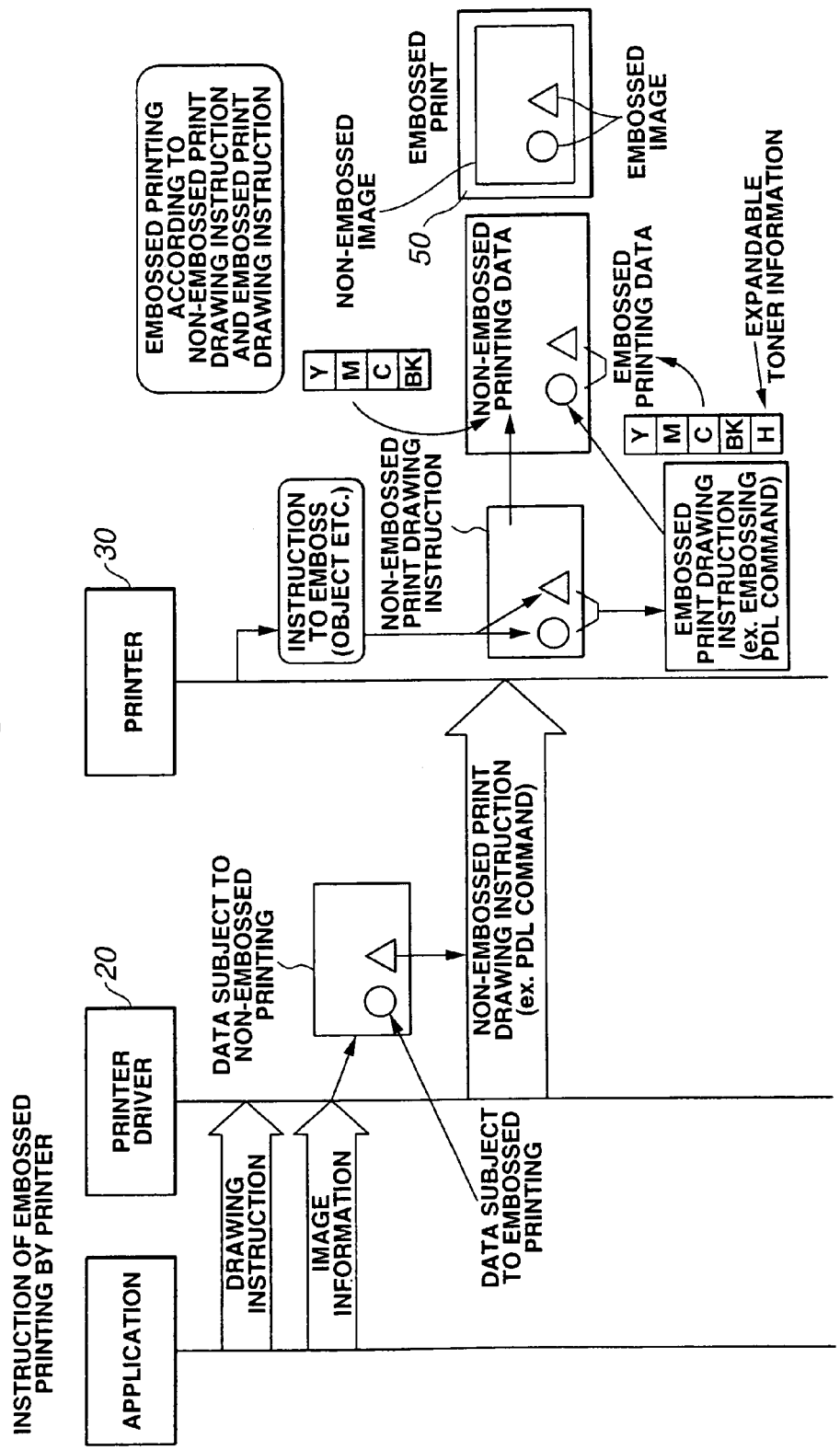
FIG. 2 is a conceptual diagram showing a print processing operation of instructing embossed print settings by a printer.

As shown in FIG. 1 and FIG. 2, the print processing system of the first embodiment comprises a printer driver 20 which generates a print job of document information input as an object to be printed and sends it to a printer 30 and the printer 30 which receives the print job from the printer driver 20 and prints an image according to the print job.

In this system, at least one of the printer driver 20 and the printer 30 are provided with an embossed printing instruction unit (corresponding to a UI screen 40 (see FIG. 5) to be described later) which instructs embossed print settings such as an object to be embossed-printed (text, graphics, specific symbols in the text, etc.), a style (embossed output specifications: height, overlap processing when embossed images are overlapped, etc.) of printing the object as an embossed image, and the like.

FIG. 1 and FIG. 2 each are conceptual diagrams showing print processing operations when the above-described embossed print setting instruction is executed by the printer driver 20 and by the printer 30.

In FIG. 1, the printer driver 20 executes an embossed printing instruction by the embossed printing instruction unit (indicated by UI (user interface) in the drawing). In this case, ○ and Δ (not indicating figures but various types of objects such as text and graphics) are instructed as an object to be embossed-printed. Information about such objects under the embossed printing instruction is stored as embossed print setting information in a prescribed storage area.

After the above-described embossed printing instruction is completed, document information to be printed is input to the printer driver 20 by a drawing command from an application, and the printer driver 20 refers to the embossed print setting information to analyze the document information and extracts the object under the embossed printing instruction.

Subsequently, the printer driver 20 generates an embossed print drawing command (corresponding to an embossing PDL command in embodiments to be described later), which is needed for embossed printing of the object, in accordance with the extracted object (data subject to embossed printing).

For an object (data subject to non-embossed printing) which is not under the embossed printing instruction, the printer driver 20 generates a non-embossed print drawing command (corresponding to the PDL command in embodiments described later) needed for ordinary printing (non-embossed printing) of the document information.

Then, the embossed print drawing command is added to the non-embossed print drawing command to generate a print job, which is then sent to the printer 30.

Upon receiving the print job from the printer driver 20, the printer 30 analyzes the non-embossed print drawing command and embossed print drawing command contained in the print job and develops a bitmap according to the analyzed result to generate data for printing.

This data for printing is a mixture of data (non-embossed print data) which can print the object subject to drawing by the non-embossed print drawing command as a non-embossed image and data (embossed print data) which can print the object subject to drawing by the embossed print drawing command as an embossed image satisfying the embossed print setting content.

The non-embossed print data comprises multi-color gray scale data of, for example, Y (yellow), M (magenta), C (cyan) and BK (black) in compliance with the structure of an image forming section (not shown), while the embossed print data comprises gray scale data of Y, M, C and BK with addition of an expandable toner amount, namely gray scale data (H) for an expandable toner for determining the height of the expanded embossed image.

Then, in the printer 30, the image forming section makes embossed printing on recording paper 50 according to the printing data.

At this time, a multi-color non-embossed image is formed of Y, M, C and BK toners from the non-embossed print data, and an embossed image (an image corresponding to ○, Δ in the drawing: object under the embossed printing instruction by the UI) having the multicolor of Y, N, C and BK placed on the embossed portion formed by the expansion of the expandable toner (H) is formed according to the embossed print data.

Then, a print processing operation to execute the embossed print setting instruction by the printer 30 will be described with reference to FIG. 2.

In FIG. 2, the printer 30 executes the embossed printing instruction by the embossed printing instruction unit (indicated by UI in the drawing). In the printer 30, ○ and Δ are instructed as the object to be embossed-printed in the same way as in the printer driver 20, and information (embossed print setting information) on the object under the embossed printing instruction and the like is stored in a prescribed storage area.

After the above-described embossed printing instruction is completed, document information subject to printing is input to the printer driver 20 from the application. The printer driver 20 generates a printable non-embossed print drawing command (corresponding to the PDL command in embodiments to be described later) which enables to print the document information as the non-embossed image and sends it as a print job to the printer 30.

Meanwhile, the printer 30, which has received the print job from the printer driver 20, refers to the embossed print setting information previously registered by the UI to analyze the non-embossed print drawing command in the print job and extracts the object under the embossed printing instruction.

Then, the printer 30 generates an embossed print drawing command (corresponding to the embossing PDL command in embodiments described later), which is needed for the embossed printing of the object, in accordance with the extracted object (data subject to embossed printing).

Here, a non-embossed print drawing command needed for the ordinary printing (non-embossed printing) of the document information is remained as it is for the object (data subject to non-embossed printing) which is not under the embossed printing instruction.

Subsequently, the printer 30 analyzes the non-embossed print drawing command and the embossed print drawing command, develops a bitmap according to the analyzed result and generates printing data comprising non-embossed print data and embossed print data.

Then, the image forming section executes embossed printing on the recording paper 50 using the printing data by the same processing as that described with reference to FIG. 1.

At this time, a multicolor non-embossed image of Y, M, C, BK toners is formed from the non-embossed print data, and an embossed image (image corresponding to ○, Δ in the drawing: object under the embossed printing instruction by the UI) having a multicolor image of Y, M, C, BK placed on the portion which is embossed by the expansion of the expandable toner (H) is formed from the embossed print data.

It is apparent from FIG. 1 and FIG. 2 that the system of the first embodiment is provided with a processing function of printing the object under the embossed printing instruction as an embossed image satisfying the embossed print setting contents (designated embossed output specifications) according to the embossed printing instruction by executing an embossed print setting instruction about which object is embossed-printed by which of the printer driver 20 and the printer 30.

By configuring as described above, the object under the embossed printing instruction can be embossed-printed as an embossed image by simply executing the embossed printing instruction by either the printer driver 20 or the printer 30 without using a special application.

Then, the first embodiment will be described.

Figure 3:
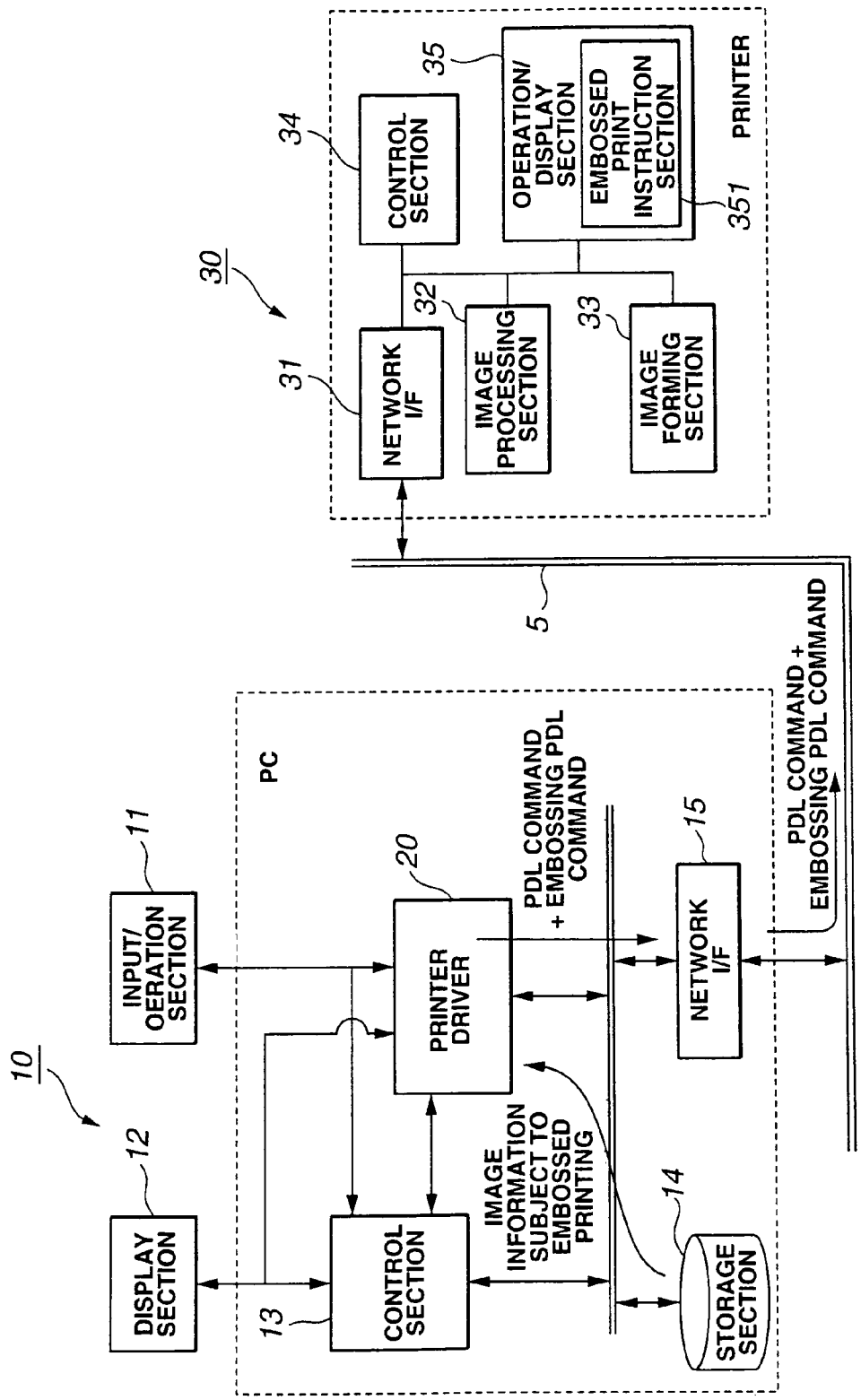
FIG. 3 is a block diagram showing a structure of a print processing system according to a first embodiment of the present invention.

FIG. 3 is a block diagram showing a structure of the print processing system according to the first embodiment, and same numerals are used to denote same parts as those in FIG. 1 and FIG. 2.

The system of this embodiment is configured of a personal computer (PC) 10 and a printer 30 which are connected through an interface 5.

The PC 10 includes an input/operation section 11 formed of an input device such as a keyboard, a mouse and the like, a display section 12 for displaying various kinds of information, a control section 13 for controlling the entire device, a storage section 14 for storing various kinds of information, a network interface (NW I/F) 15 for controlling an interface with the network 5 and a printer driver 20 for controlling a printing operation by sending a print job to the printer 30.

The printer 30 includes an NW I/F 31 for controlling an interface with the network 5, an image processing section 32 for conducting analysis of a PDL command and an embossing PDL command and an image processing such as bitmap development according to the print job received from the printer driver 20, an image forming section 33 for forming an image on recording paper according to the print data (bitmap data) generated by the image processing section 32, a control section 34 for controlling the entire device, and an operation/display section 35 formed of a touch panel or the like.

According to this system, when a drawing command is given to the document information (file data or the like)

generated by various kinds of applications on the PC 10, the printer driver 20 which is built in the PC 10 and the printer 30 which is connected to the PC 10 through the network 5 cooperate to print an image according to the document information subject to the printing.

Figure 4:
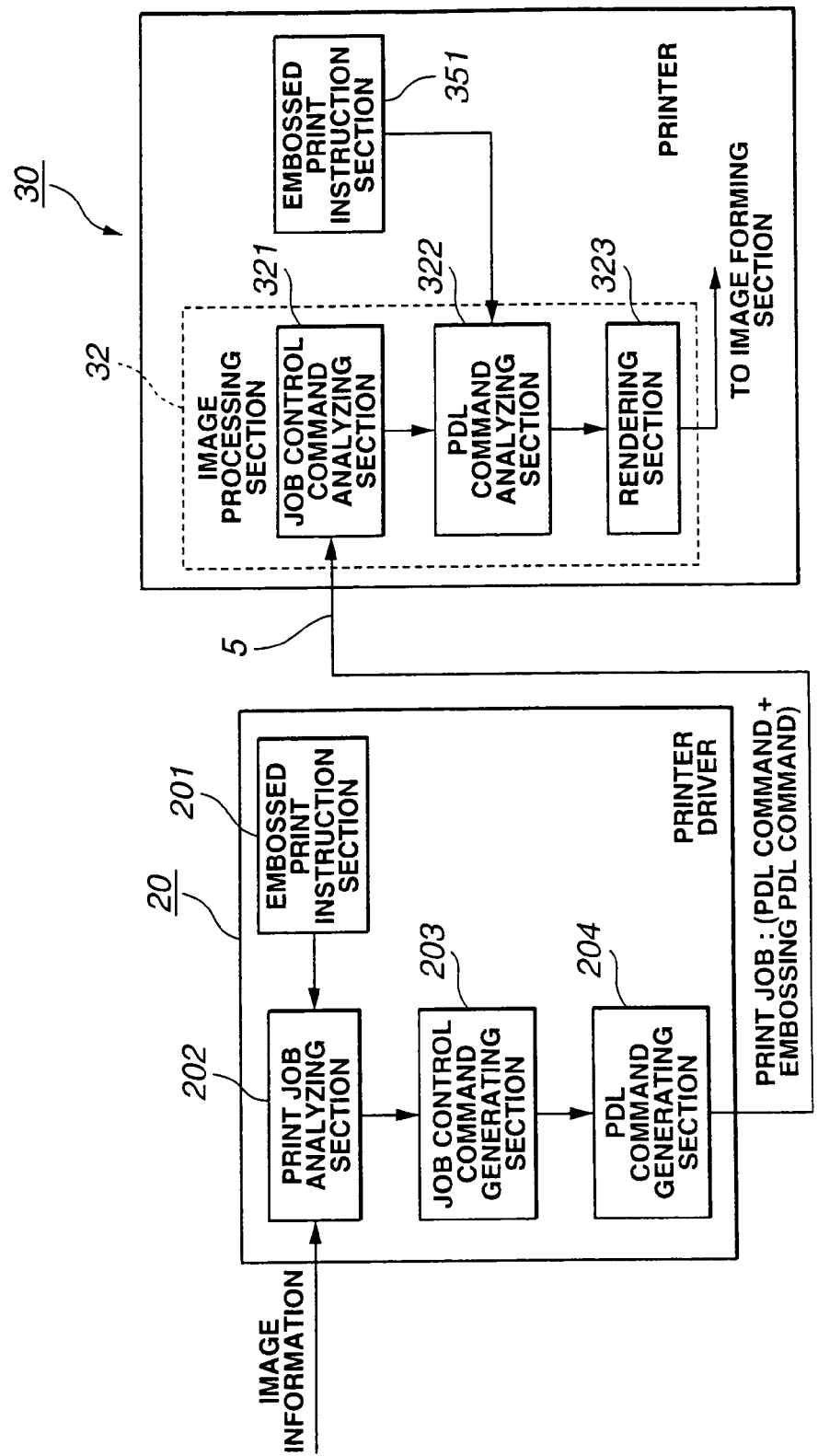
FIG. 4 is a diagram showing a detail structure of the printer driver and the printer.

FIG. 4 is a diagram showing the detail structures of the printer driver 20 and the printer 30. In the structure of the printer 30, the parts other than an embossed print instruction section 351 and the image processing section 32 are omitted.

The printer driver 20 shown in FIG. 4 includes an embossed print instruction section 201, a print job analyzing section 202, a job control command generating section 203 and a PDL command generating section 204.

The embossed print instruction section 201 in the printer driver 20 executes the embossed printing instruction to determine which part of document information to be printed is embossed-printed for each print job given from the various kinds of applications of the PC 10 and corresponds to the embossed printing instruction unit (UI) described with reference to FIG. 1 and FIG. 2.

Figure 5:
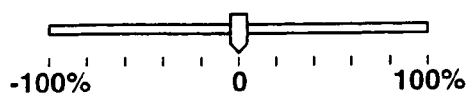
FIG. 5 is a diagram showing a structure of a UI screen for executing an embossed print setting instruction.

For example, this embossed print instruction section 201 is to execute the embossed printing instruction by using the UI screen 40 shown in FIG. 5, and it is specifically realized by the input/operation section 11 and the display section 12 of the PC 10.

Meanwhile, the printer 30 includes the embossed print instruction section 351, a job control command analyzing section 321, a PDL command analyzing section 322 and a rendering section 323.

The embossed print instruction section 351 in the printer 30 executes the embossed printing instruction about which part of the document information to be printed is embossed-printed in response to on all print jobs given from the printer driver 20.

This embossed print instruction section 351 executes the embossed printing instruction by the UI screen 40 shown in FIG. 5 in the same way as the embossed print instruction section 201 of the printer driver 20, and the embossed printing instruction is specifically realized by the function of the operation/display section 35 of the printer 30.

Then, the embossed print instruction section 201 of the printer driver 20 and the embossed print instruction section 351 of the printer 30 will be described about their embossed printing instruction function.

Here, the embossed printing instruction function of the embossed print instruction section 201 of the printer driver 20 is described to simplify the description, but the embossed print instruction section 351 of the printer 30 can also execute the same embossed printing instruction by the operation/display section 35.

The embossed print instruction section 201 in the printer driver 20 supports, for example, the UI screen (embossed print setting screen) 40 configured as shown in FIG. 5 as a user interface (UI) for instructing an object subject to the embossed printing and instructing embossed output specifications (height of an embossed image, overlap processing, etc.) of an embossed image.

This UI screen 40 can be shown on the display section 12 by a prescribed operation of the input/operation section 11 and is provided with individual embossed print designation fields for priority of embossed print designation, embossed print designation, embossment target designation, overlap designation, attribute value-to-height allocation designation and height adjustment.

In the embossed print designation priority field, designation (a selection mark is placed in a pertinent option button (hereinafter referred to as OB) to designate) can be made whether the priority is given to the embossed printing instruction by the printer driver 20 (using the driver setting) or the embossed printing instruction by the printer 30 (using the printer setting).

When it is designated in the embossed print designation priority field to use the setting of the printer driver 20, control information indicating the designation is set, and it is controlled (priority setting control) according to the control information so that only the embossed printing instruction from the embossed print instruction section 201 of the printer driver 20 is accepted by, for example, negotiations between the printer driver 20 and the printer 30 and the embossed printing instruction from the embossed print instruction section 351 of the printer 30 is prohibited.

Conversely, when the use of the setting of the printer 30 is designated, the control information indicating it is set, and it is controlled according to the control information so that the embossed printing instruction from the embossed print instruction section 201 of the printer driver 20 is prohibited through the same negotiations as above, and only the embossed printing instruction from the embossed print instruction section 351 of the printer 30 is accepted.

In the embossed print designation field on the UI screen 40, a printing mode whether embossed printing (special printing) is executed or whether pseudo embossed printing is executed can be designated.

Specifically, it can be designated whether embossed printing is executed or not depending on whether a checkmark is placed in the "embossed printing" check box (hereinafter abbreviated as CB) of the same field.

In this example, it is possible to designate whether the embossed printing is executed or not as special printing. Therefore, when this item is set by the printer 30 but the printer 30 does not have a special printing function such as embossed printing using the expandable toner, variations such as setting of this mode can be provided.

Especially, when the embossed printing is designated in this example, "printing the embossed image last" or "printing the embossed image first" OB is used to designate whether the embossed image is printed last (printing mode that the expandable toner forms the bottom layer after printout) or first (printing mode that the expandable toner forms the top layer after printout).

The reason for necessity of setting the processing order is that the expandable toner is not a translucent material. In other words, the base on which the expandable toner of a non-translucent material is placed becomes invisible, enabling to designate the order of the embossed printing using the expandable toner. And, such settings can be made possible by the printer driver 20, the print server or the printer 30 itself.

In this field, the "pseudo embossed printing" CB can be checked to set a mode (trial printing mode) to execute pseudo embossed printing without using the expandable toner. In this trial printing mode, printing using an ordinary toner (non-expandable toner) is executed with the addition of an effect (e.g. a shadow, a frame or the like by the embossed printing with embossed appearance enhancement designation to be described later) obtained when printed using the expandable toner. This pseudo embossed printing will be described in detail later.

In the embossment target designation field of the UI screen 40, the object subject to embossed printing can be designated.

As the object which can be designated, there is a drawing object such as text, graphics or image. Such a drawing object is designated by placing a checkmark in the CB ("graphics" CB, "image" CB or the like) of the pertinent drawing object.

As an item for further detailed designation in this field, for example, a particular character such as "✗" or "☆" can be designated in the text configuring document information to be printed. This designation is made by checking in the "specific symbol" CB and inputting a desired special character in an accompanying combo box (hereinafter abbreviated as CMB).

For example, a particular font such as "Arial" in the text can also be designated. This designation is made by checking in the "font" CB to select a desired font from the accompanying CMB.

Similarly, a special font can be designated in the text. For example, when there is a virtual font such as an embossment font as such a special font, that virtual font is used.

A particular modification command such as bold or italic can also be designated. This designation is made by checking in the "font modification" CB and selecting a desired font modification from the accompanying CMB.

When a graphic is designated as the object subject to embossed printing by checking in the "graphics" CB in this field, all graphic objects in the document information subject to the printing can be embossed-printed.

When a graphic is designated, the accompanying CMB of the "graphics" CB can be used to designate (select) a particular shape such as a rectangle, a circle or a triangle.

In this field, a particular color in the drawing object (text and graphic) can be designated. This designation is made by checking the "color" CB to select a desired color from the accompanying CMB.

Information on the designated color is indicated by a color name (red) in FIG. 5. Specifically, for example magenta is designated in a form of (R=255, G=0, B=255).

When a particular color is designated for a drawing object, it may be configured to also designate whether the pertinent color is placed on the embossed print surface.

When there is an area where objects subject to embossed printing overlap, it is allowed to designate in the overlap designation field on the UI screen 40 that the overlapped area has its height increased by n times (n=the number of overlaps) (reflection of overlap), the overlapped area of the object subject to expansion printing does not have its height increased by n times (disregard of overlap), the overlapped area of the object subject to expansion printing is not expanded (overlap is not embossed-printed), or it is decided by a logic operation whether the overlapped area of the object subject to expansion printing is expanded (logic operation on overlap).

This designation is made by making a selection mark in any one, which corresponds to a desired overlap processing method, among the individual OBs corresponding to "Reflection of overlap", "Disregard of overlap", "No embossment to overlap" and "Logic operation on overlap" in the same field. When the selection mark is made in the "Logic operation on overlap" OB, a logic operation method (AND, OR) is also designated.

In the attribute value-to-height allocation designation field on the UI screen 40, a parameter for converting a pertinent expandable toner height can be designated in order to execute the embossed printing by extracting the attribute value of each kind of parameter in the document information subject to the printing and converting (assigning) the attribute value into the expandable toner height.

In this example, as a parameter to be used for the conversion of an expandable toner height, each parameter such as brightness, contrast, edge or density can be designated. This designation is made by placing the selection mark in the OB corresponding to a desired conversion method among the individual OBs corresponding to "brightness-to-height conversion", "contrast-to-height conversion", "edge-to-height conversion" and "density-to-height conversion" in the same field.

In the height adjustment field on the UI screen 40, the shown setting bar is moved by a mouse or the like and stopped in a prescribed position between −100% and 100%, so that a relief of the expandable toner can be designated for its increase or decrease (height adjustment) at a ratio of the stopped position with respect to a default ("0" in the setting bar) value.

Then, the print processing operation of the print processing system of this embodiment will be described.

First, the print processing operation of the printer driver 20 will be described with reference to the flow chart shown in FIG. 6.

In the system of this embodiment (see FIG. 3), when document information (hereinafter referred to as file data) generated by a prescribed application is embossed-printed by the PC 10, the object to be embossed-printed is determined with reference to an image corresponding to the file data shown on the display section 12. Then, an instruction (embossed printing instruction) needed for the embossed printing of the object is executed using the UI screen 40 from the embossed print instruction section 201 (see FIG. 4) of the printer driver 20.

Specifically, a checkmark (✓) is placed in the "embossed printing" CB in the embossed print designation field of the UI screen 40, and either "Print embossed image last" or "Print embossed image first" is selected.

A desired one is selected among the individual items of font, graphic, font modification, color, specific symbol and image in the embossment target designation field, a checkmark is placed in the desired item's CB, and the CMB of the checked item is operated to select a desired condition (for example, Arial for the font, or for example, a rectangle for the graphic).

If necessary, the overlap designation field, the attribute value-to-height allocation designation field and the height adjustment field are used to designate a desired embossed printing mode.

To execute the embossed printing instruction by the printer driver 20, it is necessary to previously select "use of driver setting" in the embossed print designation priority field of the UI screen 40.

Thus, when a print start instruction on the file being shown on the display section 12 is given from the application on the PC 10 after the embossed printing instruction is executed from the embossed print instruction section 201, the print job comprising the file data and its drawing command is sent to the printer driver 20.

After the printer driver 20 has received the print job from the application (YES in step S601), the print job analyzing section 202 judges whether there is an embossed printing instruction from the embossed print instruction section 201 (step 602).

This judgment is previously designated by, for example, the embossed print instruction section 201, and embossed print setting information stored in, for example, the storage section 14 is referenced to check whether "use of driver setting" and "embossed printing" are set in it.

Here, when there is not an embossed printing instruction (NO in step S602), the print job analysis section 202 analyzes the print job (file data) from the application (step 603) and sends the analyzed results (components (character, graphics, image, etc.), position and size thereof) to the job control command generating section 203.

The job control command generating section 203 uses the analyzed results of the print job to generate a control command (drawing command) needed for non-embossed printing of the file data (step S604) and gives the control command to the PDL command generating section 204.

The PDL command generating section 204 uses a control command generated by the job control command generating section 203 to generate a PDL command (drawing command for non-embossed printing) describing which component is printed where and how (ordinary printing =non-embossed printing) in a PDL form (step S605) and sends the PDL command as a print job to the printer 30 (step S606).

Meanwhile, when there is an embossed printing instruction (YES in step S602), the print job analyzing section 202 refers to the embossed print setting information, which is previously designated by the embossed print instruction section 201, to analyze the print job (file data) from the application (step S610).

During the analysis, it is checked whether the object to be analyzed is an object (font, graphic, specific symbol, etc. instructed in the embossment target designation field of the UI screen 40) under the embossed printing instruction (step S611). When the object under the embossed printing instruction is extracted (YES in step S611), the analyzed result (component (character, graphics, image, or the like), its position, size or the like) and embossed printing mode (information on individual items designated by embossed print designation field, overlap designation field, attribute value-to-height allocation designation field, height adjustment field of the UI screen 40) are sent to the job control command generating section 203.

Using the above analyzed results, the job control command generating section 203 generates an embossment control command (drawing command for embossed printing) needed for embossed printing of an object under the embossed printing instruction in a designated mode (embossed printing mode) (step S612), and gives the embossment control command to the PDL command generating section 204.

When the object being analyzed is an object not under the embossed printing instruction (NO in step S611), the file data to be printed is analyzed by the same way as in the step S603, and the analyzed result is sent to the job control command generating section 203.

The job control command generating section 203 uses the above analyzed results to generate a control command (drawing command for non-embossed printing) needed for the non-embossed printing of the object (step S613) and gives the control command to the PDL command generating section 204.

The processing from the above steps S610 to S613 is continued until the file data is thoroughly analyzed.

When the above analysis is completed (YES in step S614), the PDL command generating section 204 uses the control command generated by the job control command generating section 203 to generate a PDL command (non-embossed print drawing command) describing which component is non-embossed-printed where and how in a PDL form, also uses the embossment control command generated by the job control command generating section 203 to generate an embossing PDL command (embossed print drawing command) needed for the embossed printing of an object under the embossed print designation under the designated conditions (step S615), and sends the PDL command and the embossing PDL command as the print job to the printer 30 (step S616).

When the embossed print target and for example a specific symbol ":X:" are designated, the embossing PDL command for the above processing describes an embossed print drawing command instructing "embossed-print" in correspondence with the ":X:".

When "reflection of the overlap" is additionally designated in connection with the specific symbol ":X:", an embossed print drawing command which instructs "embossed-print"+ "Reflect overlap" in connection with the ":X:" is described.

Figure 7:
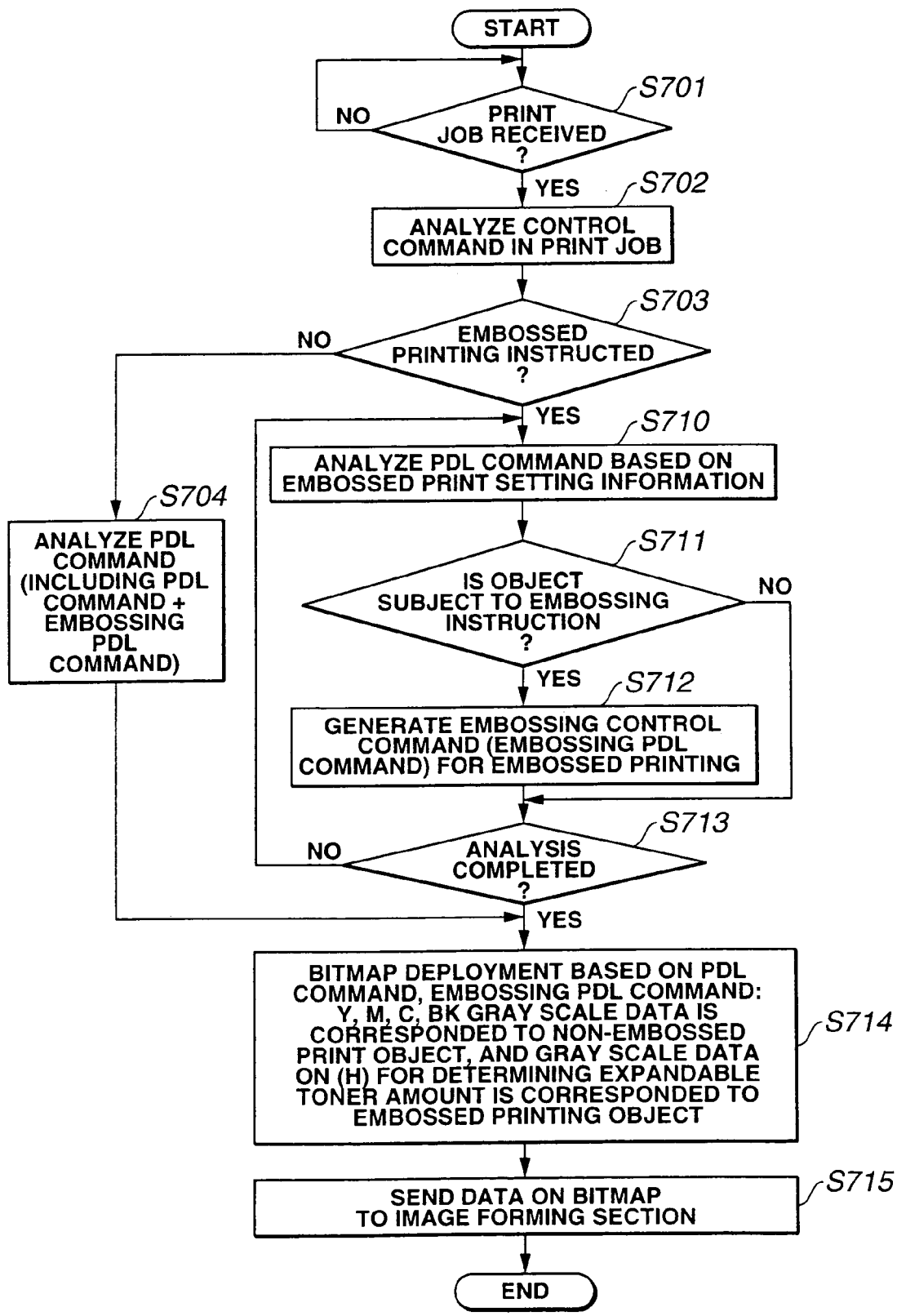
FIG. 7 is a flow chart showing a print processing operation of the printer.

Then, the processing operation of the printer 30 will be described with reference to FIG. 7.

When the printer 30 receives the print job (a case of the PDL command only and a case of the PDL command and the embossing PDL command) from the printer driver 20 through the network 5 (YES in step S701), the job control command analyzing section 321 analyzes the control command in the print job (step S702) and gives the analyzed result to the PDL command analyzing section 322.

Upon receiving the analyzed result from the job control command analyzing section 321, the PDL command analyzing section 322 judges whether there is an embossed printing instruction from the embossed print instruction section 351 (step 703).

This judgment is made by referring to embossed print setting information, which is previously designated by, for example, the embossed print instruction section 351 and stored in, for example, the control section 34, and checking whether "use of printer setting" and "embossed printing" are set in it.

In the printer 30, the embossed printing instruction can also be made by the embossed print instruction section 351 using the same UI screen 40 as the printer driver 20 does, and when the embossed printing instruction is made by the printer driver 20, the embossed printing instruction by the embossed print instruction section 351 is not accepted by the above-described priority setting control.

When there is not an embossed printing instruction as a result of the above checking (NO in step S703), the PDL command analyzing section 322 uses the control command analyzed result by the job control command analyzing section 321 to analyze the print job (a case of the PDL command only and a case of the PDL command and the embossing PDL command) from the printer driver 20 and gives the analyzed result to the rendering section 323.

The rendering section 323 performs bitmap development of the PDL command (or the PDL command and the embossing PDL command) received from the printer driver 20 in a page memory by one page according to the analyzed result of the PDL command analyzing section 322.

At this time, the rendering section 323 refers to the analyzed result of the PDL command analyzing section 322 to associate multicolor gray scale data of, for example, four colors (Y, M, C, BK: depending on the structure of the image forming section 33) with pixels corresponding to the object (non-embossed print object) under the drawing command by the PDL command, and to associate gray scale data (H) for the expandable toner in addition to the four-color gray scale data with pixels corresponding to the object (embossed print object) under the drawing command by the embossing PDL command so to execute the bitmap development (step S714).

And, every time the bitmap development for one page is completed, the gray scale data of each pixel on the bitmap is sequentially sent to the image forming section 33 (step S715).

Meanwhile, when there is an embossed printing instruction (YES in step S703), the PDL command analyzing section 322 refers to the embossed print setting information previously determined by the embossed print instruction section 351 to analyze the PDL command (when the embossed printing instruction can be made by the printer 30, the embossing PDL command is not sent from the printer driver 20) received from the printer driver 20 (step S710).

During the analysis, it is checked whether the object subject to analysis is an object (font, graphics, specific symbol or the like instructed in the embossment target designation field on the UI screen 40) under the embossed printing instruction (step S711), and only when the object under the embossed printing instruction is extracted (YES in step S711), the analyzed results (component (character, graphics, image, or the like), its position, size, etc.) and the embossed output specifications (information of each item designated in the information embossed print designation field, overlap designation field, attribute value-to-height allocation designation field and height adjustment field of the UI screen 40) are used to generate an embossment control command (embossed print drawing command) needed for the embossed printing of the object under the embossed printing instruction with the designated embossed print output specifications (step S712), and the embossment control command is given to the rendering section 323.

The processing from the step S710 to S712 is continued until all PDL commands received from the printer driver 20 are thoroughly analyzed.

After the above analysis is completed (YES in step S713), the rendering section 323 performs bitmap development for every page into the page memory using the result of analysis in step S710 of the PDL command received from the printer driver 20 and the embossment control command generated in step S712 according to the embossed print setting information instructed by the embossed print instruction section 351.

At this time, the rendering section 323 refers to the analyzed result of the PDL command analyzing section 322 to perform the above-described bitmap development by associating gray scale data of, for example, four colors (Y, M, C, BK: depending on the structure of the image forming section 33) with the pixel corresponding to the object (non-embossed printing object) under the drawing command by the PDL command and associating gray scale data (H) for the expandable toner in addition to the four-color gray scale data with the pixel corresponding to the object (embossed printing object) under the drawing command by the embossing PDL command in addition to the above gray scale data of four colors (step S714).

And, every time the bitmap development for one page is completed, gray scale data (Y, M, C, BK, H) of each pixel on the bitmap is sequentially sent to the image forming section 33 (step S715).

The image forming section 33 scans the record using the gray scale data (Y, M, C, BK, H) of each pixel being output from the rendering section 323 to print an image on recording paper and outputs it.

Then, the printing operation of the image forming section 33 will be described.

The image forming section 33 has, for example, an exposure/developing section which can form images of toners (ordinary toners: non-expandable toners) of four colors of Y, M, C, BK and the exposure/developing section which can form an expandable toner (H) image, and further has an intermediate transfer unit which performs multiple transfer (primary transfer) of the four-color toner images and the expandable toner image formed by the individual exposure/developing sections, a transfer section which transfers (secondary transfer) the toner image multiple transferred by the intermediate transfer unit onto the recording paper, and a fixing section which fixes the toner image onto the recording paper having the toner images transferred by the transfer section.

The color material gray scale data of four colors Y, M, C, BK and the expandable toner gray scale data (H) generated by the rendering section 323 of the image processing section 32 are sent to the pertinent individual exposure/developing section of the image forming section 33, and the individual color images and the expandable toner image are respectively formed for the individual exposure/developing sections.

Then, the toner images of individual colors and the expandable toner image are transferred in the sequentially overlaid state onto the intermediate transfer unit and then collectively transferred from the intermediate transfer unit onto the recording paper.

Here, when the toner images multi-transferred onto the intermediate transfer unit are transferred onto the recording paper, the order of the multi-transferred toner images is reversed to transfer the expandable toner image as the bottom layer.

Thus, when the toner images multi-transferred onto the recording paper is fixed by the fixing section, the expandable toner of the bottom layer is expanded by the heat applied then to create an embossed form. And, the toner images of the individual colors to be multi-transferred onto the expandable toner embossed by the expansion are fixed as an image of colors corresponding to the number of colors at that time.

As a result, an embossed color image having the color image (color material) formed on the embossed expandable toner (embossing material) is formed on the recording paper.

FIG. 8 is a conceptual sectional diagram of the structure of a toner image used for explanation of a transfer and fixing process by the image forming section 33 of the printer 30.

Here, FIG. 8A through FIG. 8E show a primary transfer process, FIG. 8F shows a secondary transfer process, and FIG. 8G shows a fixing process. A and B in FIG. 8A each show particular pixels.

In FIG. 8A, the pixel A is a pixel corresponding to the object under the embossed printing instruction. This pixel A has toner images of Y, M, C, BK, H sequentially multi-transferred onto the intermediate transfer unit by the primary transfer process (FIG. 8A through FIG. 8E), the multi-transferred toner layers are reversely transferred onto the recording paper 50 by the secondary transfer process (FIG. 8F), and the bottom layer expandable toner (H) is expanded and the individual color toners are melted and fixed thereon by the fixing process (FIG. 8G) to form the embossed color image.

The pixel B is a pixel corresponding to an object subject to ordinary printing (not under the embossed printing instruction). This pixel B has toner images of Y, M, C, BK sequentially multi-transferred onto the intermediate transfer unit by the primary transfer process (FIG. 8A through FIG. 8E), the multi-transferred toner layers are reversely transferred onto the recording paper by the secondary transfer process (FIG. 8F), and the multi-transferred color toners are melted and fixed by the fixing process (FIG. 8G) to form an ordinary (plane) color image.

It is apparent from the printing process shown in FIG. 8A through FIG. 8G that the document information subject to printing is printed as an embossed image when it has expandable toner gray scale data (H) added.

Addition of the gray scale data (H) to which pixel of the document information subject to the printing is advantageously made by specifying an object to be embossed-printed by using the gray scale data (H).

To realize it, the system of the first embodiment has a function (the UI screen 40) to execute the embossed printing instruction including an object to be embossed-printed from the embossed print instruction section 210 of the printer driver 20 or the embossed print instruction section 351 of the printer 30.

Using the UI screen 40, the embossed printing instruction is given to extract the object under the embossed printing instruction from the document information subject to the printing, and a control command (embossed print drawing command) needed for the embossed printing of the object is generated.

And, the printer 30 gives the gray scale data (H) to each pixel configuring the object subject to the embossed printing according to the embossed print drawing command, enabling to print the object as an embossed image.

When an embossed printing instruction (hereinafter referred to as embossed printing instruction 1) comprising "embossed printing"+"object subject to embossed printing (referred to as object X for convenience of description)" is executed on the UI screen 40 shown in FIG. 5, an embossed print drawing command indicating "Execute embossed printing of object X", e.g., <embossment P/object X>, is generated. For example, default gray scale data (H) is given to the pixel configuring the object X by the drawing command, and the object X (text, graphics, image, specific symbol in the text, or the like) can be printed as an embossed image having a default height (height after expansion).

When an embossed printing instruction for "height adjustment" is additionally executed at the time of the above-described embossed printing instruction 1, an embossed print drawing command indicating "Apply a designated height adjustment (n %) to the object X and execute embossed printing", e.g., <embossment P/height adjustment (n %)/object X>, is generated, gray scale data (H) capable of increasing or decreasing by (n %) designated by the above-described "height adjustment" with respect to, for example, the default height is given to the pixel configuring the object X in accordance with the drawing command, and the object X can be printed as an embossed image having a height which is increased or decreased by the designated portion (n %) from the default expanded height.

For example, when an embossed printing instruction of "height adjustment=+50%" is executed, an embossed image which has the expandable toner H after the expansion increased its height by 50% as compared with the default value can be printed as indicated by the pixel A in, for example, FIG. 8G.

In this case, the printer 30 needs to have a function to generate gray scale data for increasing or decreasing the height of the expandable toner H after its expansion at a ratio instructed in response to the drawing command instructing the "height adjustment".

When an embossed printing instruction of "overlap designation" is additionally executed at the time of the above-described embossed printing instruction 1, an embossed print drawing command indicating "Apply a designated overlap processing (e.g., reflection of overlap) to object X and execute embossed printing", e.g., <embossment P/overlap processing (reflection of overlap)/object X>, is generated, gray scale data (H) which can reflect the overlapped level designated by the above-described "overlap designation" with respect to for example a default height is given to the pixel configuring the object X by the drawing command, and the object X can be printed as an embossed image having a height reflecting the designated overlapped degree to the default expanded height.

FIG. 9A through FIG. 9D are conceptual diagrams showing the printed results according to the "overlap designation", each showing the printed results corresponding to the individual drawing commands of "designation of overlap=reflection of overlap", "designation of overlap=disregard of overlap", "designation of overlap=not form a relief from overlap", and "designation of overlap=logic operation on overlap". In the drawings, X1, X2 indicate overlapped objects.

Figure 9A:
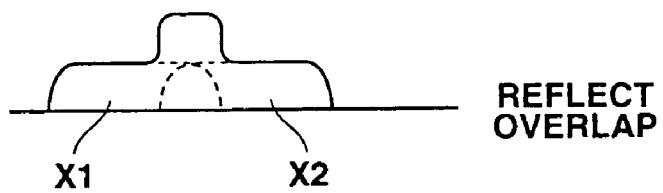
FIG. 9 is a conceptual diagram showing a printed result according to the overlap designation at the time of embossed print setting.

In FIG. 9A, when "designation of overlap=reflection of overlap" is designated, the overlapped portion is the sum of the objects X1, X2 in height (namely, when it is assumed that the number of overlaps is n, the height of the overlapped portion is increased by n times).

Figure 9B:
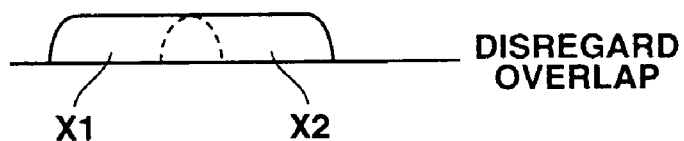

In FIG. 9B, when "designation of overlap=disregard of overlap" is designated, the overlapped portion has a height matching the original height of either the object X1 or X2.

Figure 9C:
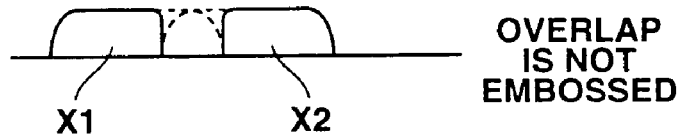

In FIG. 9C, when "designation of overlap=not form a relief from overlap" is designated, the overlapped portion is printed normally (non-embossed printing).

Figure 9D:
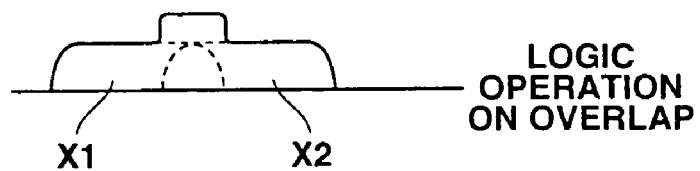

In FIG. 9D, when "designation of overlap=logic operation on overlap" is designated, the overlapped portion has a height which is determined from the heights of the objects X1, X2 by the designated logic operation.

In this case, the printer 30 needs to have a function to adjust the gray scale data (H) enabling to increase or decrease the height of the expanded expandable toner (H) of the overlapped portion in accordance with the instructed overlapped state in response to the drawing command instructing the "designation of overlap".

When an embossed printing instruction of "attribute value-to-height allocation designation" is additionally executed at the time of the above-described embossed printing instruction 1, an embossed print drawing command indicating "Execute embossed printing of the object X according to the designated attribute value-to-height allocation (conversion of brightness into height)", e.g., <embossment P/attribute value-to-height allocation (brightness)/object X>, is generated.

And, for the object X under the embossed printing instruction at this time by this embossed print drawing command, a attribute value (brightness) under the attribute value allocation designation is extracted and converted into height information, and gray scale data (H) corresponding to the height information is further given, and the object can be printed as an embossed image having a height reflecting the above height conversion.

In this case, the printer 30 needs to have a function to extract the brightness, contrast, edge and density of the object under the embossed printing according to the drawing command instructing the "attribute value-to-height allocation designation", to convert the extracted result into height information, and to generate expandable toner gray scale data (H) corresponding to the height information.

Thus, for example, when "attribute value-to-height allocation=conversion of brightness to height" is designated, the gray scale data (H) which is generated in accordance with the brightness of the object subject to embossed printing can be used to form an embossed image having a height corresponding to the brightness.

Similarly, when "attribute value-to-height allocation designation=conversion of contrast to height", "attribute value-to-height allocation designation=conversion of edge to height" and "attribute value-to-height allocation designation=conversion of density into height" are designated, an embossed image having a height corresponding to the contrast, edge and density of the object subject to embossed printing can be formed.

When an embossed printing instruction of "print the embossed image last" is executed for the above-described embossed printing instruction 1, an embossed print drawing command with the addition of a command to reflect the printing order to the object X under the embossed printing instruction is further generated, the default gray scale data (H) described above is given to a pixel configuring the object under the embossed printing instruction by the drawing command, it is controlled to print the expandable toner according to the gray scale data (H) last, and the object can be printed as an embossed image (e.g., an image with the expandable toner H transferred to the bottom layer as the pixel A of FIG. 8G) which has the default expanded height and multi-color images formed thereon by the expansion of the bottom surface. .

Conversely, when an embossing instruction of "Print an embossed image first" is executed at the time of the embossed printing instruction 1, an embossed print drawing command with the addition of a command to reflect the designated printing order is further generated for the object under the embossed printing instruction. The default gray scale data (H) as described above is given to the pixel configuring the object under the embossed printing instruction according to the drawing command, it is controlled to print first the expandable toner according to the gray scale data (H), and the object can be printed as an opaque embossed image which has the default expanded height and the top surface expanded (e.g., an image which has the expandable toner H transferred on the top layer opposite to the pixel A of FIG. 8G).

In this case, the printer 30 needs to have a function to control so that, considering that the overlapped order of the individual toners of Y, M, C, BK, H is reversed by the secondary transfer by the image forming section 33, the exposure/developing processing for the expandable toner (H) is executed after the exposure/developing processing for Y, M, C, BK according to the drawing command instructing "Print embossed image last", and the exposure/developing processing for expandable toner (H) is executed before the exposure/developing processing for Y, M, C, BK according to the drawing command instructing "Print embossed image first".

In addition to the embossed printing for printing the designated object as an embossed image, the print processing system of the first embodiment can execute pseudo embossed printing for printing the designated object as a pseudo embossed image.

To execute the pseudo embossed printing, for example, the printer driver 20 uses each object instruction tool in the embossed print designation field on the UI screen 40 (see FIG. 5) shown on the display section 12 of the PC 10 to designate the object to be subject to the pseudo embossed printing and checks the "pseudo embossed printing" CB to execute the pseudo embossed printing instruction comprising ("pseudo embossed printing"+"object subject to embossed printing").

An embodiment of the pseudo embossed printing function structure of the print processing system of the first embodiment will be described.

Figure 10:
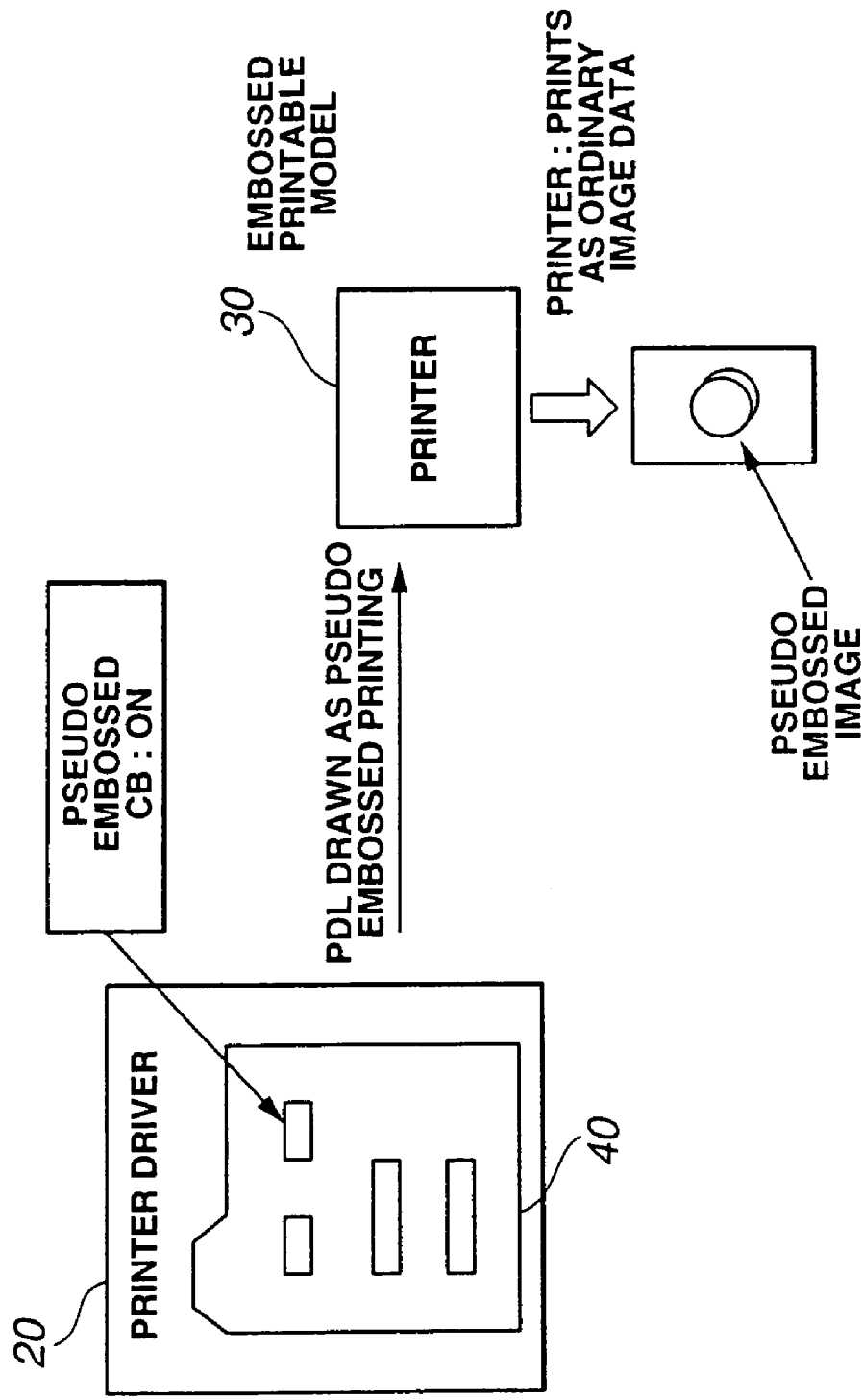
FIG. 10 is a conceptual diagram showing a first modification of the first embodiment of a pseudo embossed printing function structure.

FIG. 10 is a conceptual diagram showing a first modification of the pseudo embossed printing function structure according to the first embodiment.

In this modification, when an pseudo embossed printing instruction (pseudo embossment CB: ON) comprising "pseudo embossed printing"+"object subject to embossed printing" is executed on the UI screen 40 (see FIG. 5) by the printer driver 20, document information subject to printing is analyzed by the print job analyzing section 202, and the object (object subject to embossed printing) subject to the pseudo embossed printing instruction is extracted. And, a pseudo embossed print drawing command for executing the pseudo embossed printing of the object is generated in accordance with the extracted object by the job control command generating section 203 and the PDL command generation section 204, added to the print job and sent to the printer 30.

Here, the pseudo embossed print drawing command is one resulting from the conversion of drawing data (embossed drawing data) corresponding to the object subject to the embossed printing into drawing data (pseudo embossment data) which is expressed as a pseudo embossed image such as enhancement, contour extraction or shadow and corresponds to PDL drawn as pseudo embossed printing in FIG. 10.

In the printer 30, the pseudo embossed print drawing command (PDL drawn as pseudo embossed printing) being sent from the printer driver 20 is sent to a printing unit (image forming section 33), and the printing unit prints the pseudo embossed printing command as ordinary image data. Thus, as a result of the above PDL printing, the object subject to the embossed printing is printed as a pseudo embossed image which is expressed as enhancement, contour extraction or shadow.

Here, the pseudo embossed print drawing command generation processing according to the pseudo embossed printing instruction will be described with reference to FIG. 11.

Figure 11A:
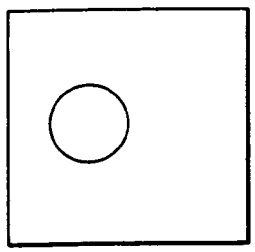
FIG. 11 is a conceptual diagram showing a process of generating a pseudo embossed print drawing instruction according to a pseudo embossed printing instruction.

In this embodiment, it is assumed that a pseudo embossed printing instruction to a ○ figure object is executed for the document information to be printed shown in FIG. 11A.

Figure 11B:
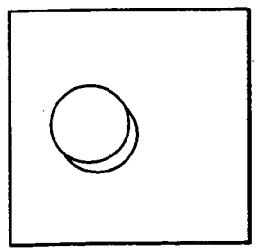

In this case, the printer driver 20 extracts the ○ figure object from the document information subject to printing, generates, from the original data, image data which has the original data displaced in a prescribed direction (e.g., in a lower right direction by several dots) as shown in, for example, FIG. 11B and merges the generated data with the original data to generate print data (pseudo embossed print drawing command: PDL drawn as pseudo embossed printing).

The printer 30 having received the print data prints an image, which shows an image corresponding to the generated data as a shadow with respect to the image corresponding to the original data, according to the print data.

Figure 11C:
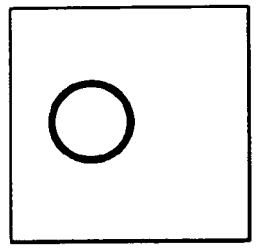

There is another method as shown in FIG. 11C that image data having the entire original data enlarged by several dots is generated from the original data of ○ figure object, and the generated data is merged with the original data to generate the print data.

The printer 30 having received the print data prints an image, which shows an image corresponding to the generated data as a frame (contour enhancement) with respect to the image corresponding to the original data, according to the print data.

As a modification of FIG. 11B, there is a method to generate print data from the original data of ○ figure object by generating data having the original data displaced in a prescribed direction, giving different brightness or chroma (mutually increasing or decreasing) to the generated data and the original data, and merging the generated data with the original data.

The printer 30 having received the print data can print according to the print data an image which shows an image corresponding to the generated data as an enhanced shadow with respect to the image corresponding to the original data.

As a modification of FIG. 11C, there is also a method to generate print data from the original data of ○ figure object by generating data having the entire original data enlarged, giving different brightness or chroma (mutually increased or decreased) to the generated data and the original data, and merging the generated data with the original data.

The printer 30 having received the print data can print according to the print data an image which shows an image corresponding to the generated data with respect to the image corresponding to the original data as an enhanced frame.

Figure 11D:
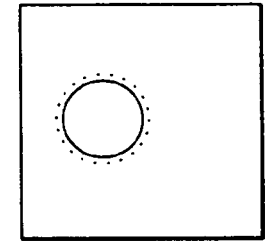

Besides, there is also a method of generating print data from the original data of ○ figure object as shown in FIG. 11D by generating data having the entire original data enlarged, adding gradation to the generated data, and merging the generated data with the original data.

The printer 30 having received the print data can print according to the print data an image which has the image corresponding to the original data with its peripheral image (image corresponding to the generated data) expressed as a shadow by gradation.

Thus, the first modification has a function to execute the pseudo embossed printing instruction containing the designation of the object subject to the pseudo embossed printing and, when the pseudo embossed printing instruction is executed, can print the object as a pseudo embossed image by extracting the designated object from document information subject to printing, and converting the original data (embossed drawing data) of the object into drawing data expressed as a contour or a shadow (see FIG. 11).

Figure 12:
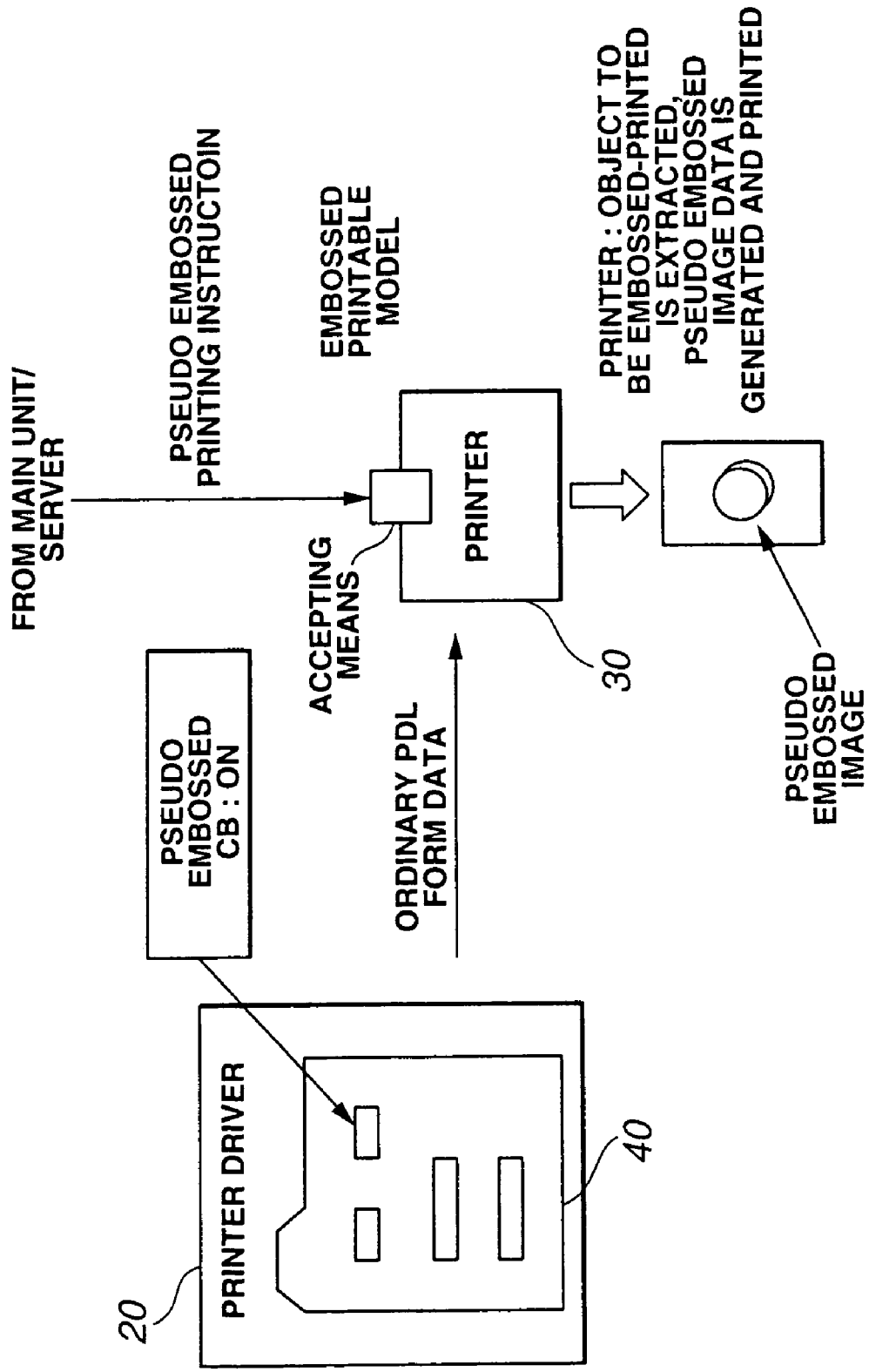
FIG. 12 is a conceptual diagram showing a second modification of the first embodiment of the pseudo embossed printing function structure.

FIG. 12 is a conceptual diagram showing a second modification of the pseudo embossed printing function structure.

The printer driver 20 in this modification is equivalent to the one in the first modification (see FIG. 10). But, this printer driver 20 does not execute the pseudo embossed printing instruction (pseudo embossment CB: OFF).

In the printer driver 20, data in an ordinary PDL form is generated from the document information subject to the printing and sent to the printer 30.

Meanwhile, the printer 30 has an accepting unit that accepts a pseudo embossed printing instruction from a device, for example, the main unit (PC 10) or the server (not shown), other than the printer driver 20.

The pseudo embossed printing instructing method from the PC main unit/server instructs the pseudo embossed printing to a prescribed object by the same manner as the operation made on the UI screen 40 as described above.

When the PDL form print data is received from the printer driver 20 while the pseudo embossed printing instruction from the PC main unit/server is being accepted by the accepting unit, the image processing section 32 in the printer 30 extracts the object subject to the pseudo embossed printing from the print data, generates data corresponding to a shadow, a contour or the like from the original data of the object by various methods as shown in FIG. 11, and merges the generated data with the original data to generate the pseudo embossed drawing data. Then, the image forming section 33 executes the pseudo embossed printing of the object according to the drawing data.

Thus, according to the second modification, even if there is no pseudo embossed printing instruction from the printer driver 20, the pseudo embossed printing is executed according to the instruction when the pseudo embossed printing instruction is output from the main unit/server.

In the first and second modifications, the printer 30 has an embossed printing function, but there is also a model which cannot execute the embossed printing as an object to be driven by the printer driver 20. Accordingly, as a third modification, pseudo embossed print processing for a printer (hereinafter referred to as the printer 30E for convenience of explanation) which is incapable of executing embossed printing is assumed.

Figure 13:
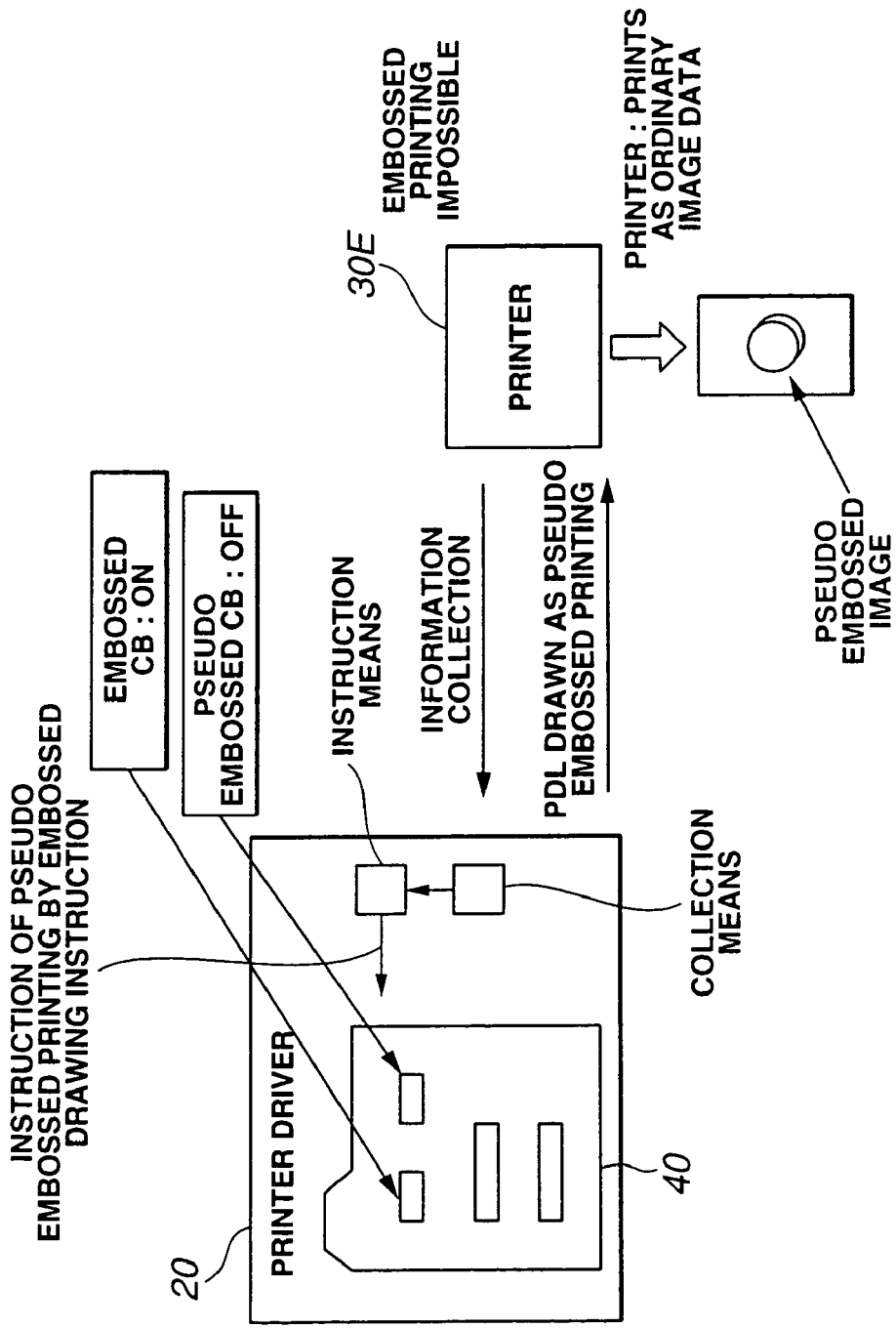
FIG. 13 is a conceptual diagram showing a third modification of the first embodiment of the pseudo embossed printing function structure.

FIG. 13 is a conceptual diagram showing the third modification of the pseudo embossed printing function structure.

In this modification, the printer 30E is incapable of executing embossed printing. The printer 30E incapable of executing the embossed printing includes those originally not having an embossed printing function, having an embossed printing function but out of an expandable (H) toner, and not having an embossed printing option.

Meanwhile, the printer driver 20 has an embossed printing instruction function and a pseudo embossed printing instruction function using the UI screen 40. Besides, the printer driver 20 of this modification is provided with an instruction unit that instructs the pseudo embossed printing according to the embossed print drawing command when it is recognized that the printer 30E cannot execute the embossed printing even if the embossed printing instruction is executed to a prescribed object on the UI screen 40.

In order to recognize that the printer 30E cannot execute the embossed printing, the printer driver 20 is further provided with a collecting unit that collects information on the printing function of the printer 30E.

Generally, when there is an embossed printing instruction (embossed print CB ON) from the UI screen 40, the printer driver 20 generates an embossed print drawing command needed to execute the embossed printing of the object under the embossed printing instruction by the method described above.

In this modification, however, when the embossed printing instruction is executed and it is recognized that the printer 30B cannot execute the embossed printing according to the information collected by the collecting unit, it is instructed by the instruction unit that the embossed drawing command is subjected to the pseudo embossed printing.

According to the instruction, the printer driver 20 generates a drawing command (PDL data) with the object under the embossed print designation drawn as the pseudo embossed printing and sends it as the print job to the printer 30E in the same way as shown in FIG. 11.

Here, PDL data, which is sent from the printer driver 20 to the printer 30E and has the object under the embossed print designation drawn as the pseudo embossed printing, is drawing data generated by generating data corresponding to a shadow or a contour by the various types of methods as shown in FIG. 11B through FIG. 11D from the original data of the object to be embossed-printed as described with reference to FIG. 11A through FIG. 11D and merging the generated data with the original data.

Therefore, the printer 30E having received the PDL data can print a pseudo embossed image having the object subject to the embossed printing expressed as enhancement, contour extraction or shadow according to the PDL data.

In this modification, it is configured that when the function and state of the printer 30E are collected and it is recognized according to the collected information that the printer 30E cannot execute the embossed printing, the pseudo embossed printing of the embossed drawing command is instructed, but if it is previously apparent that the printer 30E cannot execute the embossed printing, the instruction may be executed manually.

Thus, according to this modification configured to have the unit, which designates the pseudo embossed printing of the embossed print drawing command, disposed on the printer driver 20, even if the nearby printer 30E which cannot execute the embossed printing (or the printer which cannot execute the embossed printing because it is out of the expandable toner) is used as an object driven by the printer driver 20, a printout having a mixture of the pseudo embossed print image can be obtained by the printer 30E.

This printout functions as a preview for checking the embossed image before actually executing the embossed printing because the pseudo embossed image is an image reflecting the embossed image (see FIG. 11).

The first embodiment is not limited to the embodiments described above and shown in the drawings but can be implemented with appropriate modifications in a range not departing from the subject matter of the invention.

For example, both the printer driver 20 and the printer 30 in the embodiments described above are provided with the embossed printing instruction unit, but at least either of them may be provided with the embossed printing instruction unit.

The printer driver 20 and the printer 30 using the PDL command are described in the above embodiments, but the scope of the first embodiment is not limited to the system using the PDL command.

In short, it may be a system that the printer driver or the printer has the UI for executing the embossed printing instruction containing the object subject to the embossed printing and can print the object subject to the embossed printing as an embossed image according to the embossed print drawing command by using the UI to execute the embossed printing instruction, extracting the object under the embossed printing instruction from the document information subject to printing, and generating the embossed print drawing command needed for the embossed printing of the object.

In the embodiment described above, the arrangement of the printer driver 20 built in the PC 10 and the printer 30 connected to the printer driver 20 through the network is exemplified, but the system according to the first embodiment is not limited to the above arrangement.

For example, it may also be configured that the print server and the printer are provided with the above-described embossed printing instruction unit in a system that the printer and the print server are disposed in the network, and the print server sends the data subject to printing received from the PC or the like through the network to the printer through the network so to execute the embossed printing.

The embossed printing instruction unit of the printer driver, the print server and the printer is not limited to the use of the input/operation section and the display section which are disposed on each device but may use another UI provided for the system. And, it is also considered configuring the system by incorporating a Web server in the individual devices, inputting the above-described embossed print setting information on the setting screen on the Web browser of an external terminal, and incorporating the input embossed print setting information by a user interface unit through the Web server.

In the above-described embodiment, the printer 30 provided with the image forming section for the expandable toner independent of the image forming section for Y, M, C, BK is exemplified but it is not limitative, and a printer provided with only a Y, M, C, BK image forming section may be used. In this case, the image forming section for BK may be used as the image forming section for the expandable toner, and the image processing method by the printer can be changed to express BK by Y, M and C.

The above-described embodiment was directed to the embossed printing and described about the function of executing the embossed print designation including the printing specifications of the object subject to the embossed printing and the embossed image. And, that function can also be applied for special printing when special print designation including the object subject to the special printing and special image printing specifications is executed. Therefore, the first embodiment can be applied to the general system for special printing which cannot be designated by an ordinary application.

Then, the second embodiment will be described.

First, the print processing by the print processing system of the second embodiment will be described briefly with reference to FIG. 14.

Figure 14:
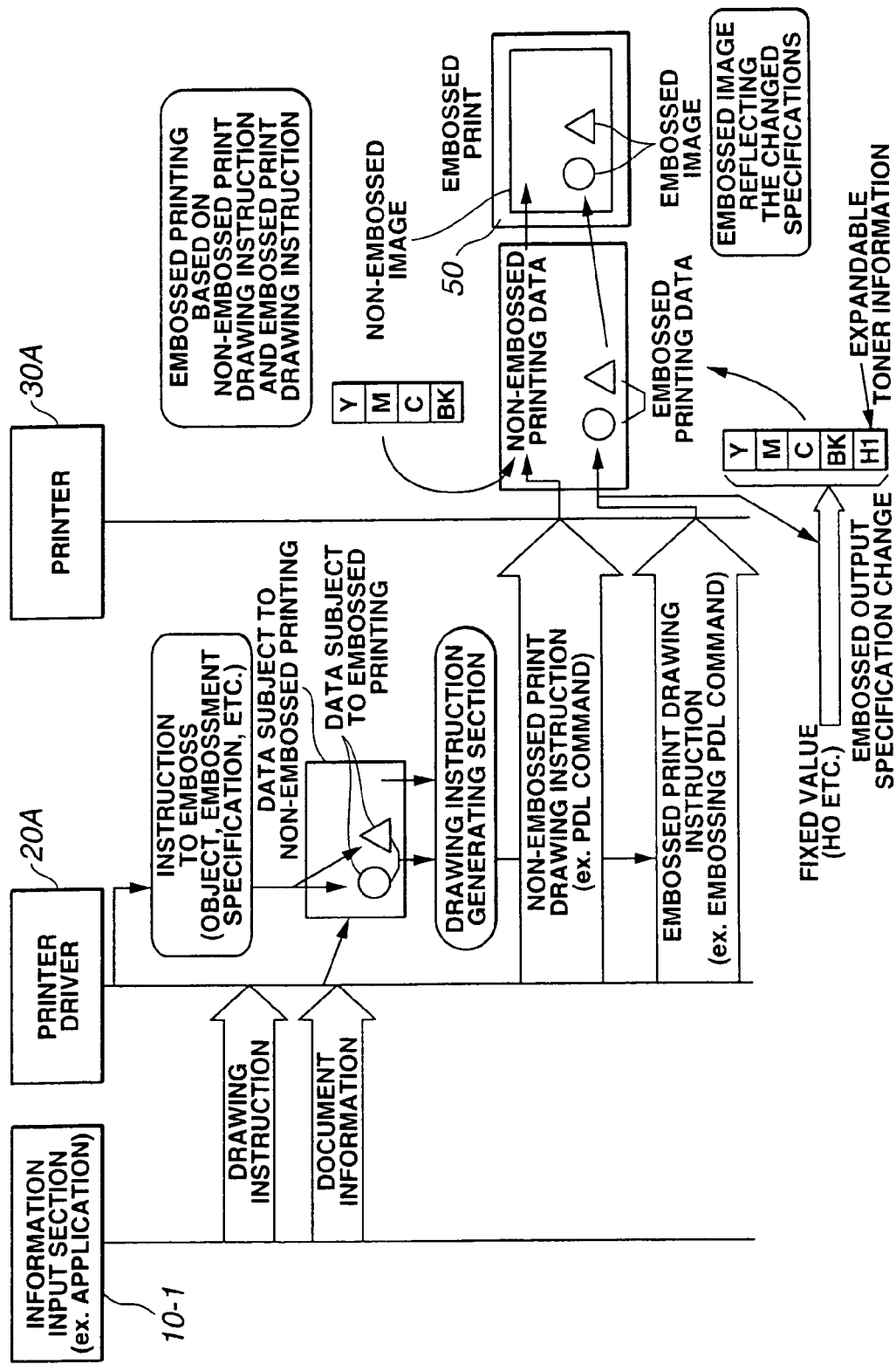
FIG. 14 is a conceptual diagram showing a print processing operation of the print processing system according to a second embodiment of the invention.

As shown in FIG. 14, the print processing system of the second embodiment comprises an information input section 10-1 for inputting document information (e.g., file data or the like generated by a PC (personal computer) or the like) to be printed, a printer driver 20A for generating a print job of document information as an object to be printed and sending it to a printer 30A and the printer 30A for receiving the print job from the printer driver 20A and printing an image according to the print job.

In this system, the printer driver 20A is provided with, for example, an embossed printing instruction unit which instructs embossed print settings such as embossed print specifications about the object (such as text, graphic, or specific symbols in the text) subject to the embossed printing and a way of printing the object with what embossed output specifications (height, relief shape, etc.) as an embossed image.

This embossed printing instruction unit is indicated by UI (user interface) in FIG. 14 and corresponds to a UI screen 41 (see FIG. 17) to be described later.

In FIG. 14, the printer driver 20A executes an embossed printing instruction by the embossed printing instruction unit (UI). In this example, ◯ and Δ (not indicating figures but various types of objects such as text and graphics) are instructed as the object subject to the embossed printing.

The embossed printing instruction unit also instructs embossed output specifications to which the object under the embossed printing is embossed-printed.

Such information about the object under the embossed printing instruction and the embossed output specifications is stored as embossed print setting information in a prescribed storage area.

After the embossed printing instruction is completed, the document information to be printed and its drawing command are input from the information input section 10-1 to the printer driver 20A. The printer driver 20A refers to the embossed print setting information to analyze the document information and extracts the object under the embossed printing instruction.

Then, a drawing command generation section in the printer driver 20A generates an embossed print drawing command (corresponding to an embossing PDL (Page-Description Language) command in the embodiment described later) needed for the embossed printing of the object with the embossed output-specifications instructed by the embossed printing instruction unit in accordance with the extracted object (data subject to embossed printing).

For the object (data subject to non-embossed printing) which is not subjected to the embossed printing instruction, the drawing command generation section generates a non-embossed print drawing command (corresponding to the PDL command in the embodiment described later) needed for the ordinary printing (non-embossed printing) of the object.

Then, the embossed print drawing command is added to the non-embossed print drawing command to generate a print job, which is sent to the printer 30A.

The printer 30A receives the print job from the printer driver 20A, analyzes the non-embossed print drawing command and the embossed print drawing command contained in the print job and executes bitmap development according to the analyzed results to generate data for printing.

At this time, the print data is a mixture of non-embossed print data which can print the object to be drawn under the non-embossed print drawing command as a non-embossed image and embossed print data which can print the object to be drawn under the embossed print drawing command as an embossed image satisfying the embossed output specifications instructed by the embossed printing instruction unit.

Here, the non-embossed print data comprises, for example, multi-color gray scale data of Y (yellow), M (magenta), C (cyan), BK (black) in accordance with the structure of an image forming section (not shown). The embossed print data has gray scale data (H) for the expandable toner for determining an expandable toner amount, namely a height of the expanded embossed image, further added to the multi-color gray scale data of Y, M, C, BK.

To generate the above-described embossed print data, where fixed (default value) embossed output specifications are previously determined for the system in connection with the embossed output specifications, the printer 30A changes the fixed embossed output specifications so to meet the embossed output specifications designated by the embossed printing instruction unit and generates embossed print data conforming to the changed embossed output specifications.

For example, where expandable toner gray scale data (H0) with the height (height of the expandable toner expanded) of an embossed image determined as h0 is set as a default value and when an embossed output specification is designated (height designation) to determine the height of the embossed image to h1, the default value (H0) is changed to expandable toner gray scale data (H1) capable of satisfying the instructed height h1, and the changed expandable toner gray scale data (H1) is used to generate embossed print data for each pixel of the object subject to the pertinent embossed printing.

Then, the image forming section of the printer 30A executes the embossed printing on recording paper 50 according to the print data.

At this time, a multi-color non-embossed image of Y, M, C, BK toners is formed from the non-embossed print data, and an embossed image (image corresponding to ○, △ in the drawing: object under the embossed printing instruction by the UI) which has a multi-color image of Y, M, C, BK placed on a portion embossed by the expansion of the expandable toner (H) is formed from the embossed print data.

Here, the embossed image is embossed-printed in a state satisfying the embossed output specifications (height, relief shape, etc.) instructed by the embossed printing instruction unit.

It is apparent from the above description that the system of the second embodiment is provided with a processing function which executes an embossed printing instruction, including an instruction on an object subject to the embossed printing about which object is subject to embossed printing and an instruction of the embossed output specifications about what embossed output specifications are applied for the embossed printing of the object subject to the embossed printing, by the embossed printing instruction unit disposed on the printer driver 20A, then generates an embossed print drawing command needed to print the object instructed by the embossed printing instruction unit as an embossed image satisfying the embossed print specifications instructed by the embossed printing instruction unit, and prints the object instructed to be embossed-printed according to the embossed drawing command as an embossed image satisfying the embossed output specifications instructed by the embossed printing instruction unit.

By configuring as described above, the object subject to the embossed printing can be printed as an embossed image satisfying the designated embossed output specifications by simply instructing the desired embossed output specifications by the printer driver 20A without using a special application having a function to instruct the object subject to the embossed printing.

Figure 15:
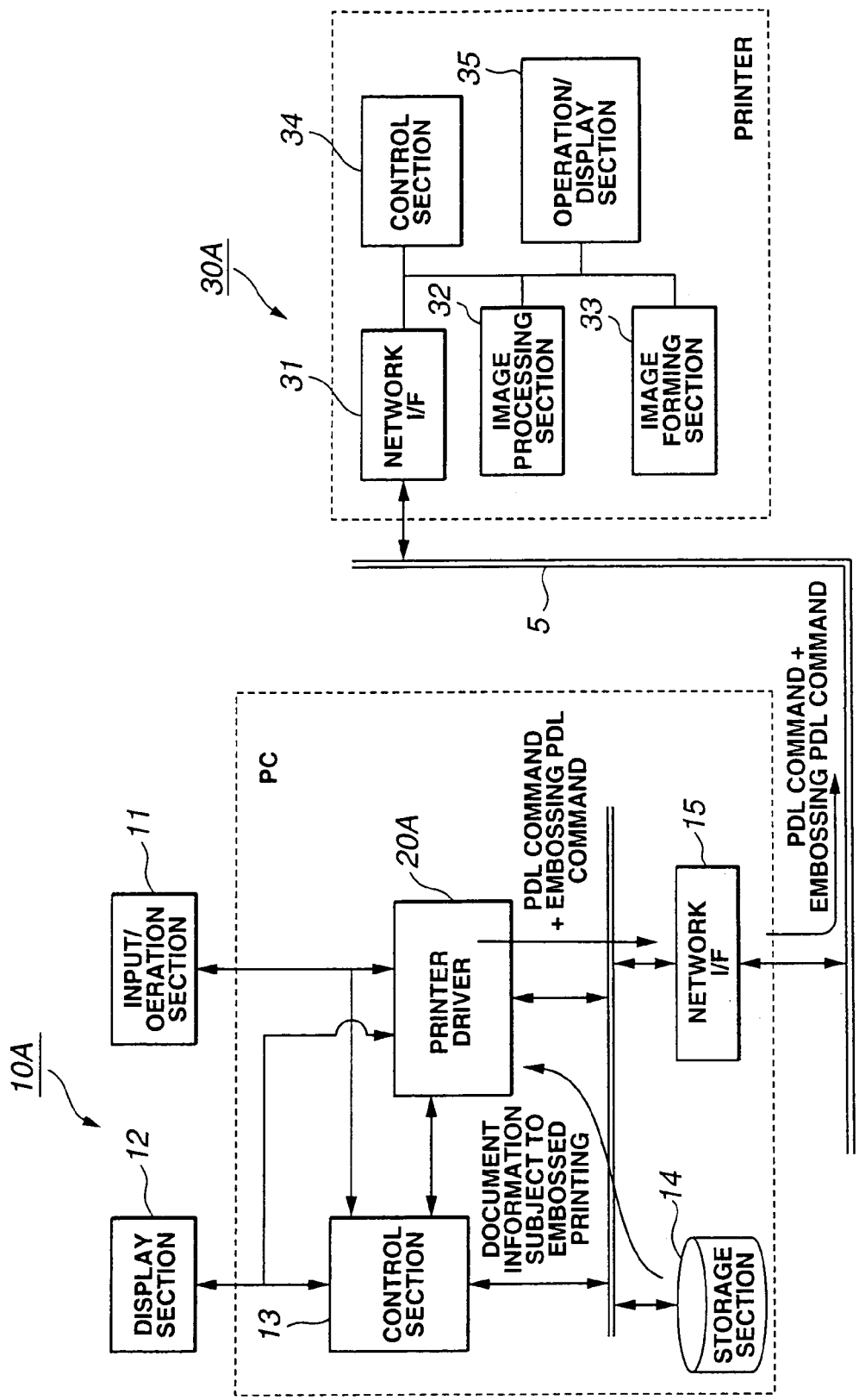
FIG. 15 is a block diagram showing a structure of the print processing system according to the second embodiment.

FIG. 15 is a block diagram showing the structure of the print processing system according to the second embodiment of the invention.

The system of the second embodiment is configured of a PC 10A and the printer 30A connected through the interface 5.

The PC 10A comprises an input/operation section 11 of input devices such as a keyboard, a mouse and the like, a display section 12 for displaying various kinds of information, a control section 13 for controlling the entire device, a storage section 14 for storing various kinds of information, a network interface (NW I/F) 15 for controlling interface with the network 5, and the printer driver 20A for controlling the print operation by sending a print job to the printer 30A.

The printer 30A comprises an NW I/F 31 for controlling the interface with the network 5, an image processing section 32 for executing analysis of PDL command and embossing PDL command and image processing such as bitmap development according to the print job received from the printer driver 20A, an image forming section 33 for forming an image on the recording paper according to the print data (bitmap data) generated by the image processing section 32, a control section 34 for controlling the entire device, and an operation/display section 35 comprising a touch panel or the like.

This system prints out an image according to document information subject to printing by the cooperation between the printer driver 20A built in the PC 10A and the printer 30A which is connected to the PC 10A through the network 5 when a drawing command is given to the document information (file data or the like) generated by various kinds of applications on the PC 10A.

Figure 16:
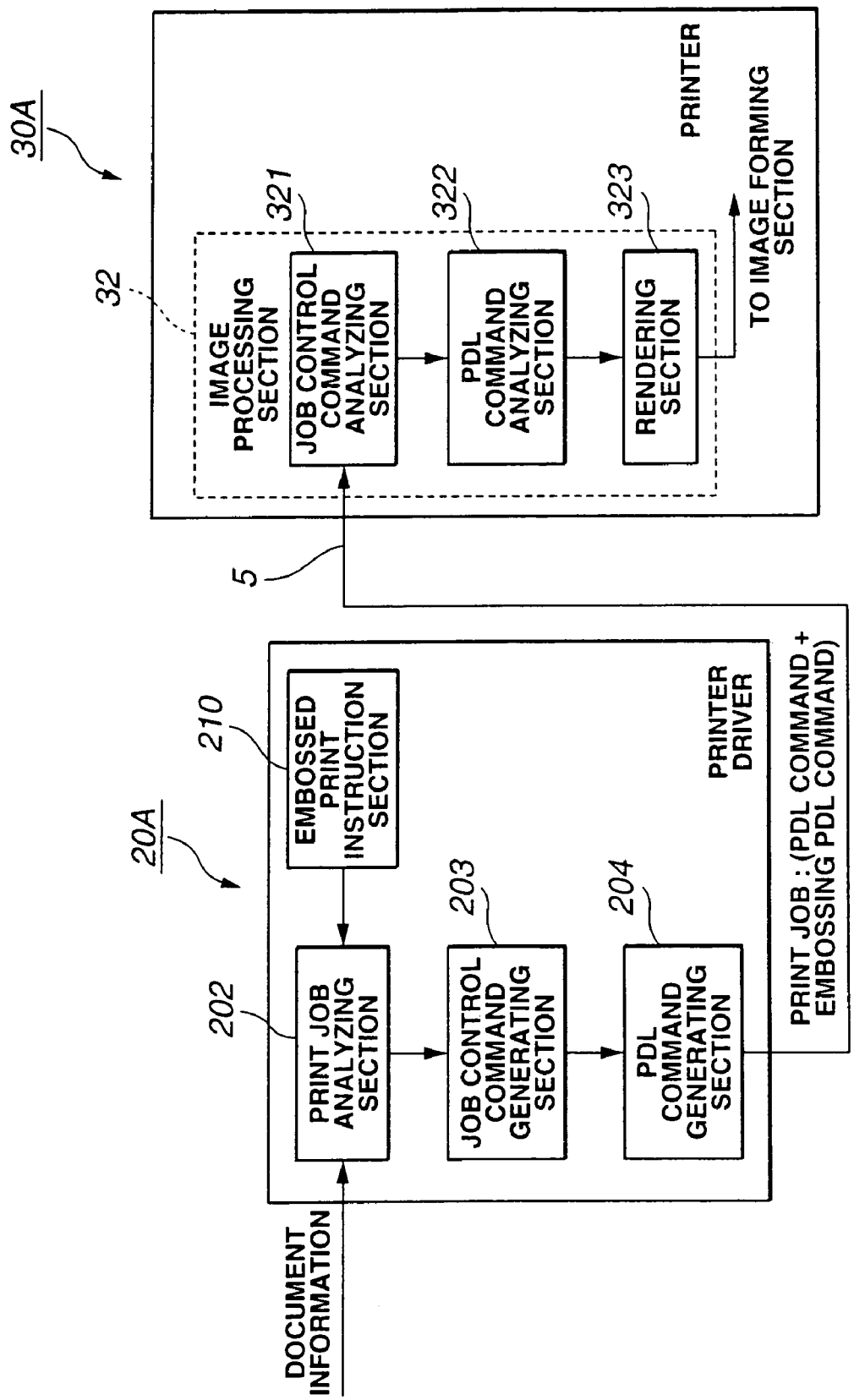
FIG. 16 is a diagram showing a detail structure of the printer driver and the printer in the system shown in FIG. 2.

FIG. 16 is a diagram showing the detail structures of the printer driver 20A and the printer 30A. The components other than the image processing section 32 are omitted from the structure of the printer 30A.

In FIG. 16, the printer driver 20A comprises an embossed print instruction section 210, a print job analyzing section 202, a job control command generating section 203 and a PDL command generating section 204.

The embossed print instruction section 210 of the printer driver 20A executes the embossed printing instruction including, an instruction of the object subject to the embossed printing about which part of the document information to be printed is embossed-printed for each print job given from the various kinds of information of the PC 10A and an instruction on the embossed output specifications about the embossed output specifications to which the embossed image is embossed-printed, and corresponds to the embossed printing instruction unit (UI) shown in FIG. 14.

The embossed print instruction section 210 executes the embossed printing instruction by, for example, the UI screen 41 shown in FIG. 17. Specifically, it is realized by the functions of the input/operation section 11 and the display section 12 of the PC 10A.

Meanwhile, the printer 30A comprises a job control command analyzing section 321, a PDL command analyzing section 322 and a rendering section 323.

Then, embossed printing instruction function of the embossed print instruction section 210 of the printer driver 20A will be described.

The embossed print instruction section 210 of the printer driver 20A supports, for example, the UI screen (embossed print setting screen) 41 configured as shown in FIG. 17 as a user interface (UI) for instructing the object subject to the embossed printing and instructing embossed output specifications (height, relief shape, embossed surface pattern, etc.) of an embossed image.

This UI screen 41 can be shown on the display section 12 by a prescribed operation by the input/operation section 11 and provided with individual embossed print designation fields for embossed print designation, embossment target designation, variation designation, designation of overlap, attribute value-to-height allocation designation.

In the UI screen 41, the embossed print designation function using the individual fields of embossed print designation, embossment target designation, designation of overlap and attribute value-to-height allocation designation is substantially the same as the embossment designation function using the individual corresponding fields on the UI screen 40 (see FIG. 5) according to the first embodiment, and its description is omitted.

The embossed print designation function using the variation designation field particular in the UI screen 41 will be described below.

The variation designation field in the UI screen 41 can be used to selectively designate the embossed output specifications, to which the embossed image is formed, from numerous variations.

As specific embossed output specifications, this field can be used to designate the height of the embossed image (expandable toner image after expansion). This designation is executed by checking the "height" CB to select (or input) a desired height (2 m in this case) from the accompanying CMB.

In this field, the relief shape (shape of the embossed image recorded on paper observed from a horizontal direction) of the embossed image can be designated. This designation is executed by checking the "relief shape" CB to select a desired relief shape (a square, a cone (triangle) shape, a semi-cylindrical shape, a wave shape, etc.) from the accompanying CMB.

When combining with the height designation of the embossed image, the height value to be selected from the accompanying CMB of the "height" CB is determined to be highest of the designated shape.

In this field, it can be designated whether the embossed image is colored, and if yes, its color can be designated. This designation is executed by checking the "color addition" CB to select a desired color from the accompanying CMB.

Colors which can be selected from the accompanying CMB of the "color addition" CB can be a single color, and plural colors can also be used to designate gradation, stripes, checks or the like. As a specific method for color designation, designation may be executed in a form of (R=255, G=0, B=255: magenta) or the like.

In this field, it can be designated whether the size of the embossed image is same as the original data, or whether the size is enlarged or reduced by what times (or what percentage). This designation is executed by checking the "data scaling" CB to select desired scaling times (or scaling percentage) from the accompanying CMB.

To enhance the embossed form of the embossed image in this field, the non-embossed printing can be used to designate whether an enhanced image such as shading or framing is printed. This designation is executed by checking the "embossed appearance enhancement" CB to select a desired enhanced image printing method (shading, a frame, etc.) from the accompanying CMB. At this time, it may be configured to allow setting a color and a thickness to be added to the enhanced printing image.

In this field, it is possible to designate whether a vertical interval is given to the surface (embossed surface) of an embossed image to produce a shade (hatching) effect. Here, plural shade patterns are available. This designation is executed by checking the "embossed surface pattern" CB to select a desired shade pattern from the accompanying CMB.

Then, the print processing operation of the print processing system according to this embodiment will be described.

The print processing operation of the printer driver 20A will be described with reference to the flow chart shown in FIG. 18.

In the system (see FIG. 15) of this embodiment, to execute embossed printing of document information (hereinafter referred to as file data) generated by a prescribed application by the PC 10A, an object to be embossed-printed is determined with reference to an image corresponding to the file data shown on the display section 12, then an embossed printing instruction needed for the embossed printing of the object is executed on the UI screen 41 from the embossed printing instruction section 210 (see FIG. 17) of the printer driver 20A.

Specifically, a checkmark (✓) is placed in the "embossed printing" CB in the embossed print designation field on the UI screen 41, and either the "print embossed image last" OB or the "print embossed image first" OB is selected.

Desired items are selected from the individual items of font, graphics, font modification, color, specific symbol and image in the embossment target designation field to place a checkmark in the CBs of the selected items, and the COBs of the checked items are operated to select desired conditions (e.g., Arial for a font, e.g., a rectangle for graphics, etc.).

If necessary, the variation designation field, the overlap designation field and the attribute value-to-height allocation designation field are also used to designate the embossed output specifications (print output mode) of the object subject to the embossed printing.

A specific method of designating the embossed output specifications includes, for example, "height: 2 mm", "relief shape: semi-cylindrical shape", "color: magenta (R=255, G=0, B=255)", "data scaling: 120% of original data", "enhancement: frame/black with thickness of 1 mm", "output order: print embossed image last", "overlap processing: disregard of overlap", etc.

Thus, after the embossed printing instruction including the object subject to embossed printing and the embossed output specifications is executed from the embossed print instruction section 210 (at this time, the object under the embossed printing instruction and information such as the embossed output specifications are stored as embossed print setting information in, for example, the storage section 14), a print start instruction on the file being shown on the display section 12 is given from the application on the PC 10A, and a print job including the file data and its drawing command is sent to the printer driver 20A.

The printer driver 20A receives the print job from the application (YES in step S501), and the print job analyzing section 202 judges whether there is an embossed printing instruction from the embossed print instruction section 210 (step 502).

For example, this judgment is executed by referring to the embossed print setting information stored in the storage section 14 to check whether the "embossed printing" is set.

Here, if there is not an embossed printing instruction (NO in step S502), the print job analyzing section 202 analyzes the print job (file data) from the application (step 503) and sends the analyzed results (component (character, graphics, image, or the like), its position, size, etc.) to the job control command generating section 203.

The job control command generating section 203 uses the analyzed results of the print job to generate a control command (drawing command) needed to execute the non-embossed printing of the file data (step S504) and gives the control command to the PDL command generating section 204.

The PDL command generating section 204 uses the control command generated by the job control command generating section 203 to generate a PDL command (drawing command for non-embossed printing) which writes which component is printed where and how in a PDL form (ordinary printing=non-embossed printing) (step S505) and sends the PDL command as a print job to the printer 30A (step S506).

Meanwhile, when there is an embossed printing instruction (YES in step S502), the print job analyzing section 202 refers to the embossed print setting information, which is previously designated by the embossed print instruction section 210, to analyze the print job (file data) from the application (step S510).

During the analysis, it is checked whether the object under the analysis is an object subject to the embossed printing instruction (font, graphic, specific symbol or the like instructed in the embossment target designation field of the UI screen 41) (step S511), and when the object under the embossed printing instruction is extracted (YES in step S511), the analyzed results (component (character, graphics, image, or the like), its position, size, etc.) and the embossed output specifications (information of the individual items designated by the variation designation field, overlap designation field and attribute value-to-height allocation designation field of the UI screen 41) are sent to the job control command generating section 203.

The job control command generating section 203 uses the analyzed results to generate an embossment control command (drawing command for embossed printing) needed to execute the embossed printing of the object under the embossed printing instruction according to the designated embossed output specifications (embossed output mode) (step S512) and gives the embossment control command to the PDL command generating section 204.

When the object subject to the analysis is an object not under the embossed printing instruction (NO in step S511), file data to be printed is analyzed by the same method as in the step S503, and the analyzed results are sent to the job control command generating section 203.

The job control command generating section 203 uses the analyzed results to generate a control command (drawing command for non-embossed printing) needed to execute the non-embossed printing of the object (step S513) and gives the control command to the PDL command generating section 204.

The processing from step S510 to S513 is continued until the analysis of all file data is completed.

When the analysis is completed (YES in step S514), the PDL command generating section 204 uses the control command generated by the job control command generating section 203 to generate a PDL command (non-embossed print drawing command) which writes which component is non-embossed-printed where and how in the PDL form and also uses the embossment control command generated by the job control command generation section 203 to generate an embossing PDL command (embossed print drawing command) needed to execute the embossed printing of the object under the embossed print designation under the designated conditions (step S515) and sends the PDL command and the embossing PDL command as the print job to the printer 30A (step S516).

For example, when specific symbol ":X:" is designated as an object subject to embossed printing, the embossing PDL command in the processing described above writes an embossed print drawing command instructing "embossed-print" in correspondence with the ":X:".

And, when the embossed output specifications such as "height: 2 mm", "relief shape: semi-cylindrical shape", etc. are further designated in connection with the specific symbol ":X:", an embossed print drawing command instructing "embossed-print"+"form a relief shape in a semi-cylindrical shape"+"reflect the overlap" is written in correspondence with the ":X:".

Figure 19:
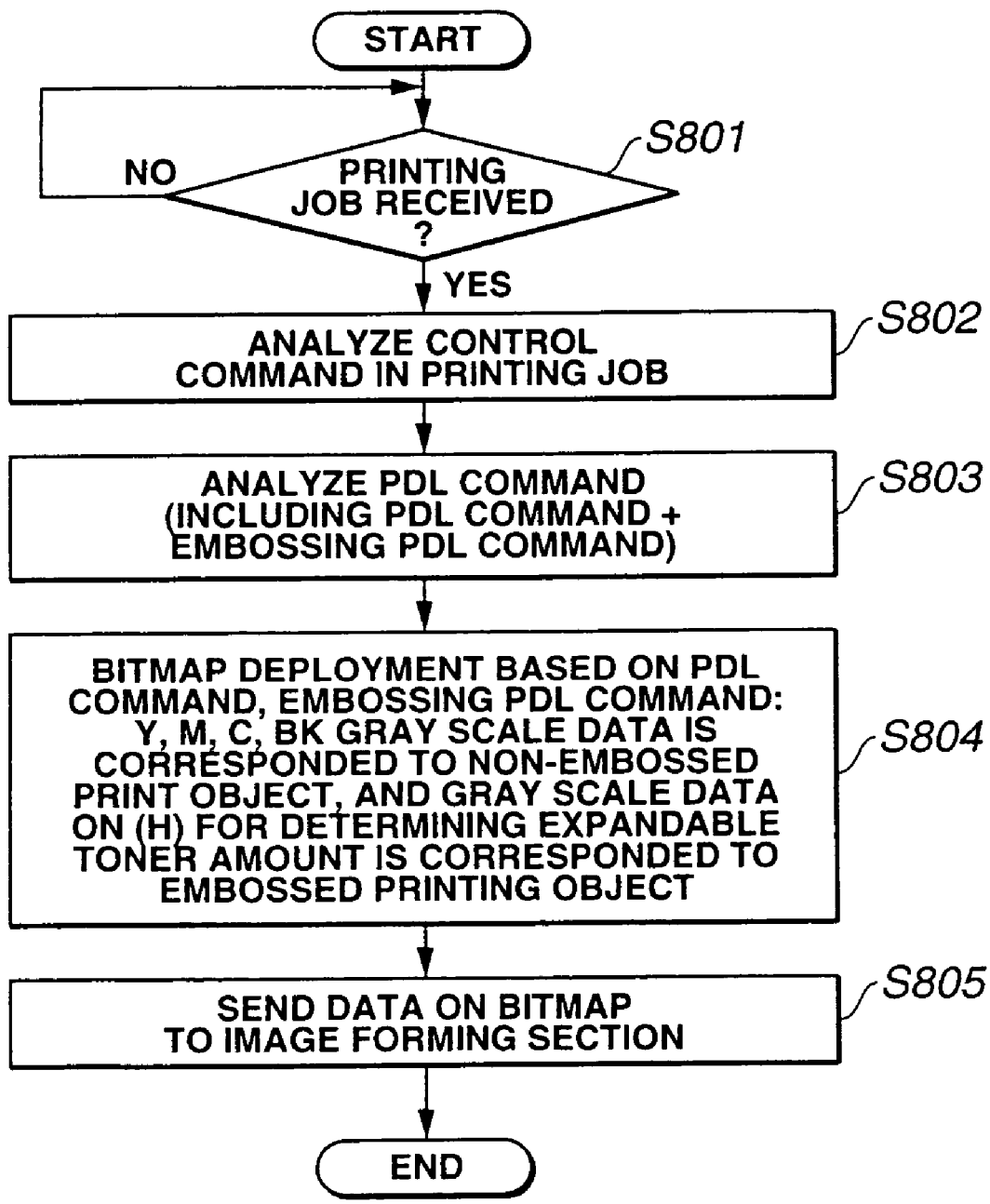
FIG. 19 is a flow chart showing a print processing operation of the printer.

Then, the processing operation of the printer 30A will be described with reference to FIG. 19.

The printer 30A receives the print job (the PDL command only or the PDL command +the embossing PDL command) from the printer driver 20A through the network 5 (YES in step S801), and the job control command analyzing section 321 analyzes the control command in the print job (step S802) and gives the analyzed results to the PDL command analyzing section 322.

The PDL command analyzing section 322 uses the results of analyzing the control command by the job control command analyzing section 321 to analyze the print job (the PDL command only or the PDL command+the embossing PDL command) from the printer driver 20A (step S803) and gives the analyzed results to the rendering section 323.

The rendering section 323 uses the analyzed results of the PDL command analyzing section 322 to execute bitmap development of the PDL command (or the PDL command+ the embossing PDL command) received from the printer driver 20A into a page memory for every page.

At that time, the rendering section 323 refers to the analyzed results by the PDL command analyzing section 322 to associate multi-color gray scale data of, for example, four colors (Y, M, C, B, K: depending on the structure of the image forming section 33) with the pixel corresponding to the object (non-embossed print object) under the drawing command by the PDL command, and to associate gray scale data (H) indicating the expandable toner amount with the pixel corresponding to the object (embossed print object) under the drawing command by the embossing PDL command in addition to the above four-color gray scale data to execute the bitmap development (step S804).

And, every time the bitmap development for every page is completed, gray scale data (Y, M, C, BK, H) of each pixel on the bitmap is sequentially sent to the image forming section 33 (step S805).

The image forming section 33 uses the gray scale data of each pixel being sent from the rendering section 323 to execute scanning of the record and prints out an image on recording paper.

Then, the print operation by the image forming section 33 will be described.

The image forming section 33 is provided with an exposure/developing section which can form images of four-color toners (ordinary toners: non-expandable toners) of, for example, Y, M, C, BK, an exposure/developing section which can form an expandable toner (H) image, an intermediate transfer unit which executes multiple transfer (primary transfer) of the four-color toner images and the expandable toner image formed by the exposure/developing sections for individual colors, a transfer section which transfers (secondary transfer) the toner images multi-transferred on the intermediate transfer unit onto the recording paper, and a fixing section which fixes the toner images on the recording paper where the toner images are transferred by the transfer section.

The multi-color gray scale data of four colors of Y, M, C, BK and the expandable toner gray scale data (H) generated by the rendering section 323 of the image processing section 32 are sent to the corresponding exposure/developing section of the image forming section 33, and the individual color toner images and the expandable toner image are formed for the individual exposure/developing sections.

Then, the individual color toner images and the expandable toner image are transferred in a state sequentially overlaid onto the intermediate transfer unit and further transferred collectively from the intermediate transfer unit onto the recording paper.

Here, when the toner images multi-transferred onto the intermediate transfer unit are then transferred onto the recording paper, the order of the multi-transferred toner images is reversed, and the expandable toner image is transferred as the bottom layer.

Thus, to fix the toner images multi-transferred on the recording paper by the fixing section, the bottom layer expandable toner is expanded by heat applied at that time to form an embossed image. And, the toner images of the individual colors multi-transferred onto the expandable toner embossed by the expansion are fixed as a color image corresponding to the number of toner colors at that time.

As a result, an embossed color image having a color image (color material) formed on the embossed expandable toner (embossing material) is formed on the recording paper.

The transfer and fixing process of the image forming section 33 of the printer 30A will be described with reference to FIG. 8.

FIG. 8A through FIG. 8E show a primary transfer process, FIG. 8F shows a secondary transfer process, and FIG. 8G shows a fixing process. A and B in FIG. 8A each show particular pixels.

In FIG. 8A through FIG. 8G, the pixel A is a pixel corresponding to the object under the embossed printing instruction. This pixel A has toner images of Y, M, C, BK, H sequentially multi-transferred onto the intermediate transfer unit by the primary transfer process (FIG. 8A through FIG. 8E), the multi-transferred toner layers reversely transferred onto the recording paper 50 by the secondary transfer process (FIG. 8F), and the bottom layer expandable toner (H) is expanded and the individual color toners melted and fixed thereon by the fixing process (FIG. 8G) to form the embossed color image.

The pixel B is a pixel corresponding to an object subject to ordinary printing (not under the embossed printing instruction). This pixel B has toner images of Y, M, C, BK sequentially multi-transferred onto the intermediate transfer unit by the primary transfer process (FIG. 8A through FIG. 8E), the multi-transferred toner layers are reversely transferred onto the recording paper by the secondary transfer process (FIG. 8F), and the multi-transferred color toners are melted and fixed by the fixing process (FIG. 8G) to form an ordinary (plane) color image.

It is apparent from the printing process shown in FIG. 8A through FIG. 8G that one with expandable toner gray scale data (H) added in the document information subject to printing is printed as an embossed image.

Addition of gray scale data (H) to which pixel of the document information subject to the printing is advantageously made by specifying an object subject to the embossed printing by using the gray scale data (H).

To realize it, the system of the second embodiment has a UI (the UI screen 41) to execute the embossed printing instruction including an object to be embossed-printed and the embossed output specifications from the embossed print instruction section 210 of the printer driver 20.

Using the UI screen 41, the embossed printing instruction is given to extract the object under the embossed printing instruction from the document information subject to the printing, and a control command (embossed print drawing command) needed for the embossed printing of the object with the embossed output specifications instructed at the same time is generated.

And, the printer 30A gives gray scale data (H), which can apply the designated embossed output specifications, to each pixel configuring the object subject to the embossed printing according to the embossed print drawing command, enabling to print the object as an embossed image satisfying the embossed output specifications.

Then, the embossed printing instruction from the embossed print instruction section 210 and the print processing and embossed image printing mode according to the embossed printing instruction will be described.

On the UI screen 41 shown in FIG. 17, when an embossed printing instruction (hereinafter referred to as embossed printing instruction 1) comprising "embossed printing"+"object subject to embossed printing (referred to as the object X for convenience of explanation)" is executed, an embossed print drawing command indicating "execute embossed printing of object X", e.g., <embossment P/object X>, is generated.

Figure 20:
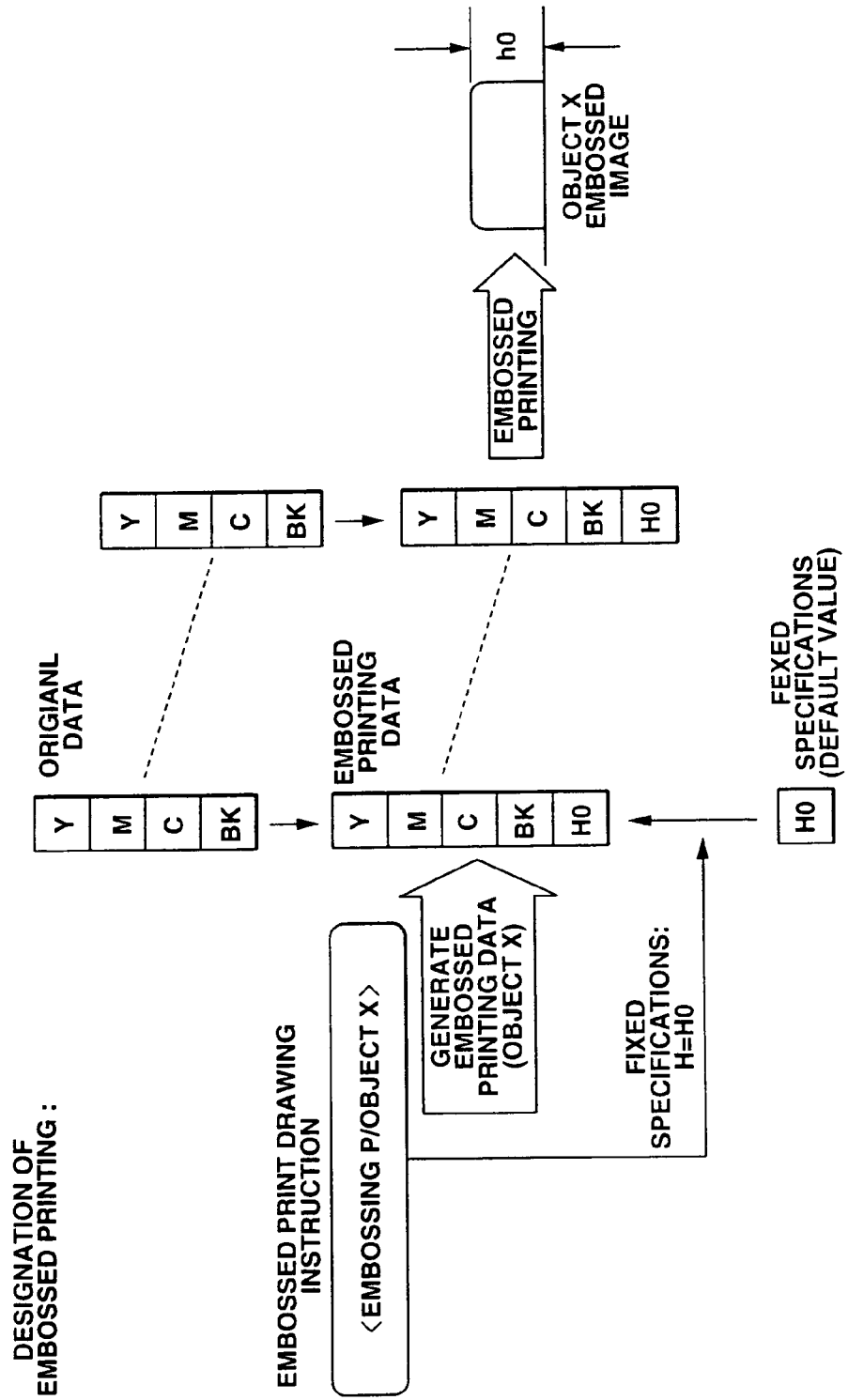
FIG. 20 is a conceptual diagram showing an embossed print processing operation at the time of embossed print designation.

FIG. 20 is a conceptual diagram showing the embossed print processing operation by the printer 30A according to the embossed print drawing command <embossment P/object X>.

In FIG. 20, when the embossed print drawing command <embossment P/object X> is given, the printer 30A generates embossed print data with, for example, default gray scale data (H0) added to the pixel configuring the object X and prints the object X (text, graphics, image, or specific symbol in the text) as an embossed image having default height (h0: height after expansion) and relief shape (square) according to the embossed print data. At this time, the embossed print data reflects the colors of the original data, and the embossed image is colored to have the colors of the original data.

And, when an embossed printing instruction of "height (h1 (e.g., 2 mm))" is further executed at the time of the above-described embossed printing instruction 1, an embossed print drawing command, e.g., <embossment P/height (h1)/object X>, indicating "execute embossed printing of object X with the designated height (h1)" is generated.

Figure 21:
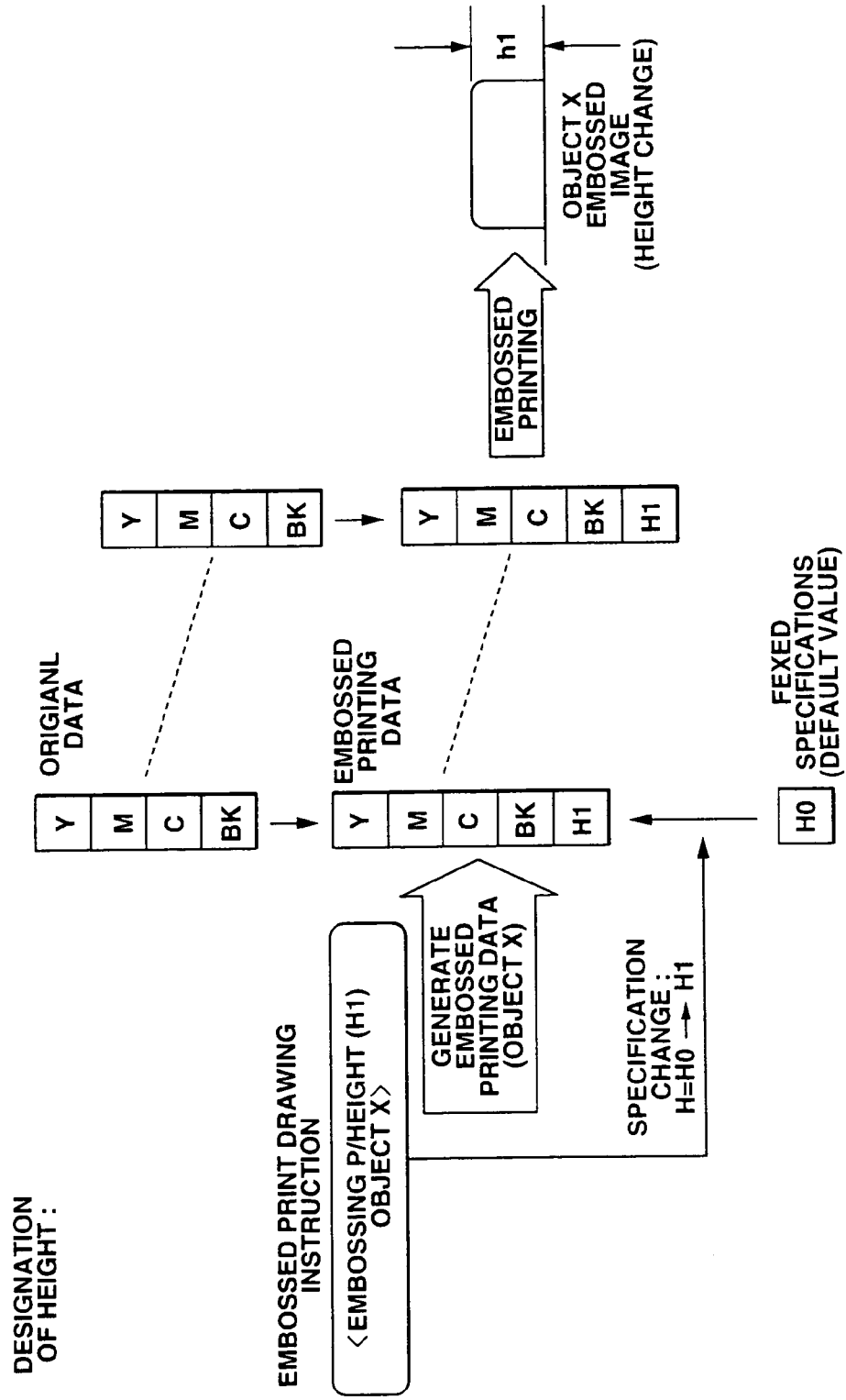
FIG. 21 is a conceptual diagram showing an embossed print processing operation at the time of height designation.

FIG. 21 is a conceptual diagram showing the embossed print processing operation by the printer 30A according to the embossed print drawing command <embossment P/height (h1)/object X>.

In FIG. 21, when the embossed print drawing command <embossment P/height h1/object X> is given, the printer 30A executes a change in the specifications of the default gray scale data (H0) to generate gray scale data (H1) corresponding to the designated height (h1) and adds the gray scale data (H1) to the pixel configuring the object X to generate the embossed print data.

And, according to the embossed print data, the printer 30A prints the object X as an embossed image which has the designated height (h1) and the default relief shape. At this time, the embossed print data reflects the colors of the original data, and the embossed image has colors same as those of the original data.

When an embossed printing instruction of a "relief shape (e.g., semi-cylindrical shape)" is further executed at the time of the above-described embossed printing instruction 1, an embossed print drawing command, e.g., <embossment P/relief shape (semi-cylindrical shape)/object X>, indicating "Execute embossed printing of object X to have a designated relief shape (semi-cylindrical shape)" is generated.

Figure 22:
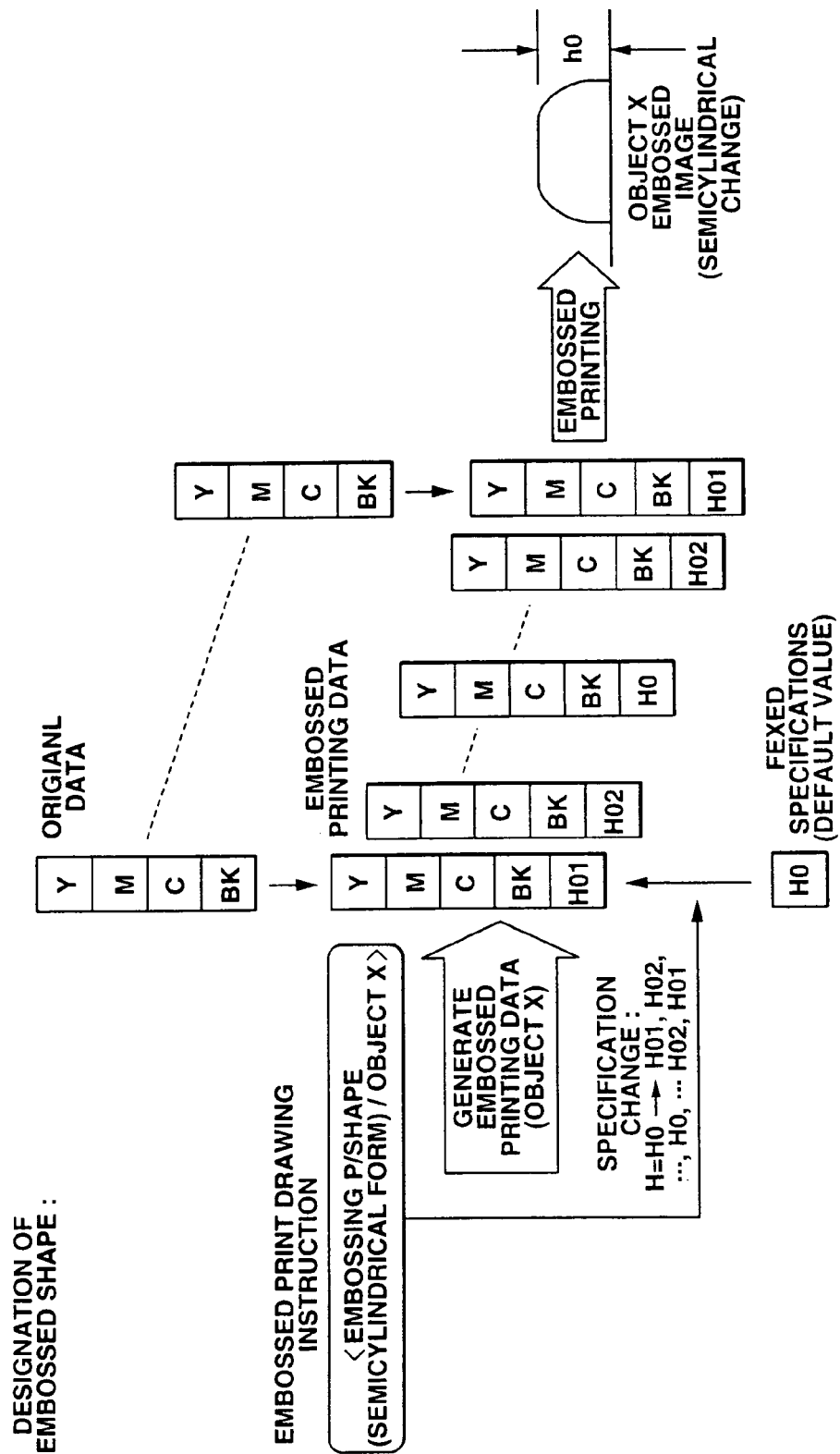
FIG. 22 is a conceptual diagram showing an embossed print processing operation at the time of relief shape designation.

FIG. 22 is a conceptual diagram showing the embossed print processing operation by the printer 30A according to the embossed print drawing command <embossment P/relief shape (semi-cylindrical shape)/object X>.

In FIG. 22, when the embossed print drawing command <embossment P/relief shape (semi-cylindrical shape)/object X> is given, the printer 30A executes a change in the specifications of the default gray scale data (H0) if necessary to generate gray scale data (H01), (H02), (H0), . . . corresponding to the designated relief shape (semi-cylindrical shape), and gives the gray scale data (H01, H02, H0, . . . ) to the individual pixels configuring the object X (e.g., disposing H0 at the center of the embossed image, and disposing H01, H02 so to become low in a semi-cylindrical shape toward the short portion) to generate embossed print data.

And, according to the embossed print data, the printer 30A prints the object X as an embossed image having the designated relief shape (semi-cylindrical shape). At this time, the embossed print data reflects the colors of the original data, and the embossed image has the colors of the original data.

Even if another shape (triangle shape, corrugated shape, or the like) is designated as the relief shape, the object X can be printed as an embossed image having the designated relief shape through the generation of gray scale data (H01, H02, H0, . . . ) corresponding to the shape and the arrangement processing to the individual pixels configuring the object X.

And, when an embossed printing instruction of "color (e.g., gradation)" is further executed at the time of the above-described embossed printing instruction 1, an embossed print drawing command indicating "Execute embossed printing of object X with the designated colors (gradation)", e.g., <embossment P/colors (gradation)/object X>, is generated.

Figure 23:
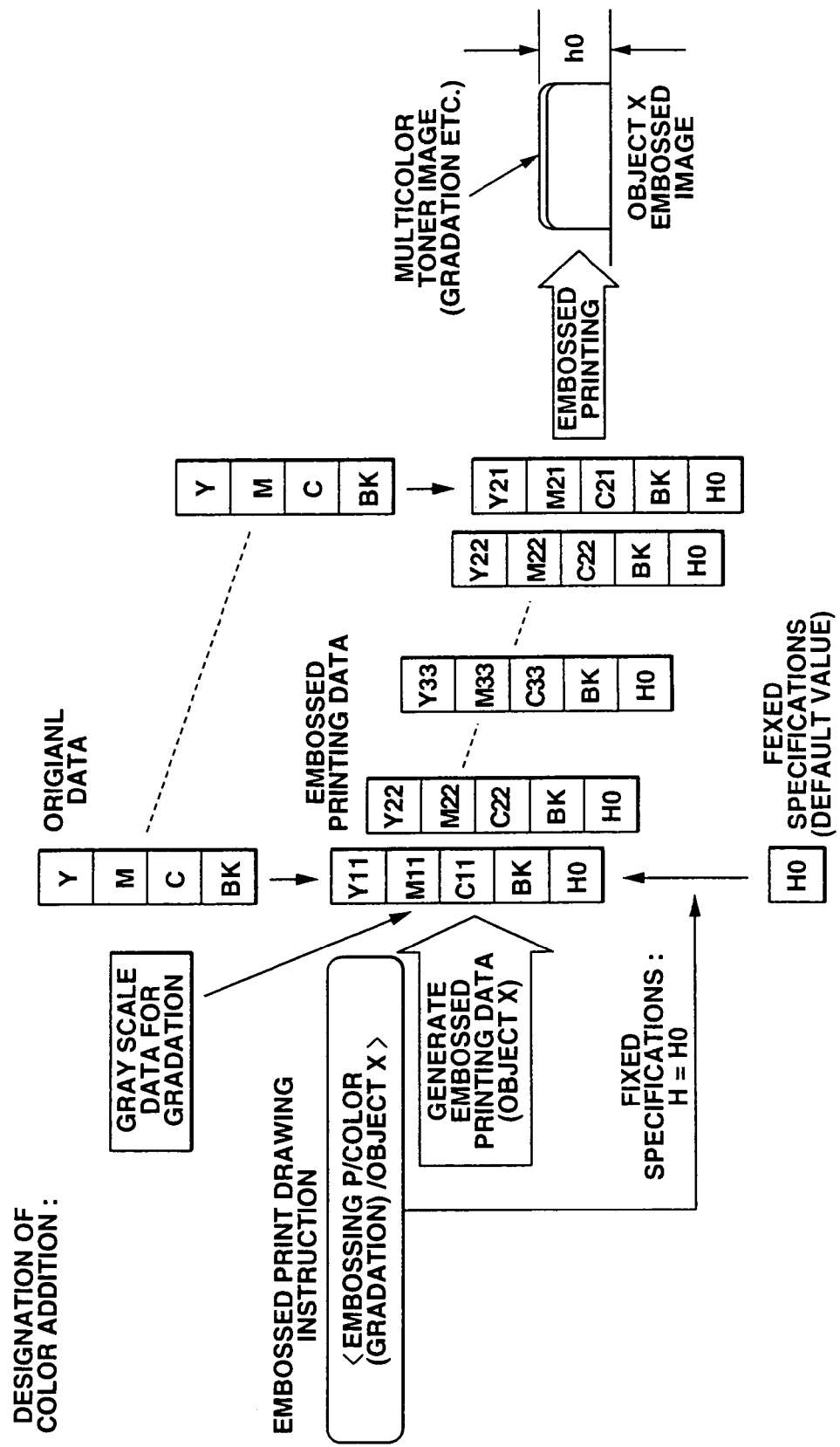
FIG. 23 is a conceptual diagram showing an embossed print processing operation at the time of color addition designation.

FIG. 23 is a conceptual diagram showing the embossed print processing operation by the printer 30A according to the embossed print drawing command <embossment P/colors (gradation)/object X>.

In FIG. 23, when the embossed print drawing command <embossment P/colors (gradation)/object X> is given to the printer 30A, for example, the default gray scale data (H0) is given to the pixels configuring the object X, and the multi-color gray scale data (Y11, M11, C11, etc.: previously provided according to the gradation pattern) corresponding to the designated color (gradation) is given to the individual pixels configuring the object X to generate embossed print data.

And, according to the embossed print data, the object X is printed as an embossed image which has a default height (h0) and has the multi-color toner image corresponding to the designated colors (gradation) placed thereon. At this time, the embossed print data does not reflect the colors of the original data, and the colors of the embossed image become the designated colors.

When other colors (single color, various kinds of gradations) are designated as the colors of the embossed image, the object X can be printed as an embossed image having the designated colors through the generation of the gray scale data (Y11, M11, C11, etc.) corresponding to the above colors and the placing processing on the individual pixels configuring the object X.

And, when an embossed printing instruction of "data scaling (e.g., n %)" is further executed at the time of the above-described embossed printing instruction 1, an embossed print drawing command indicating "Apply designated data scaling (n %: enlarged in this case) to object X and execute embossed printing", e.g., <embossment P/data enlargement (n %)/object X>, is generated.

Figure 24:
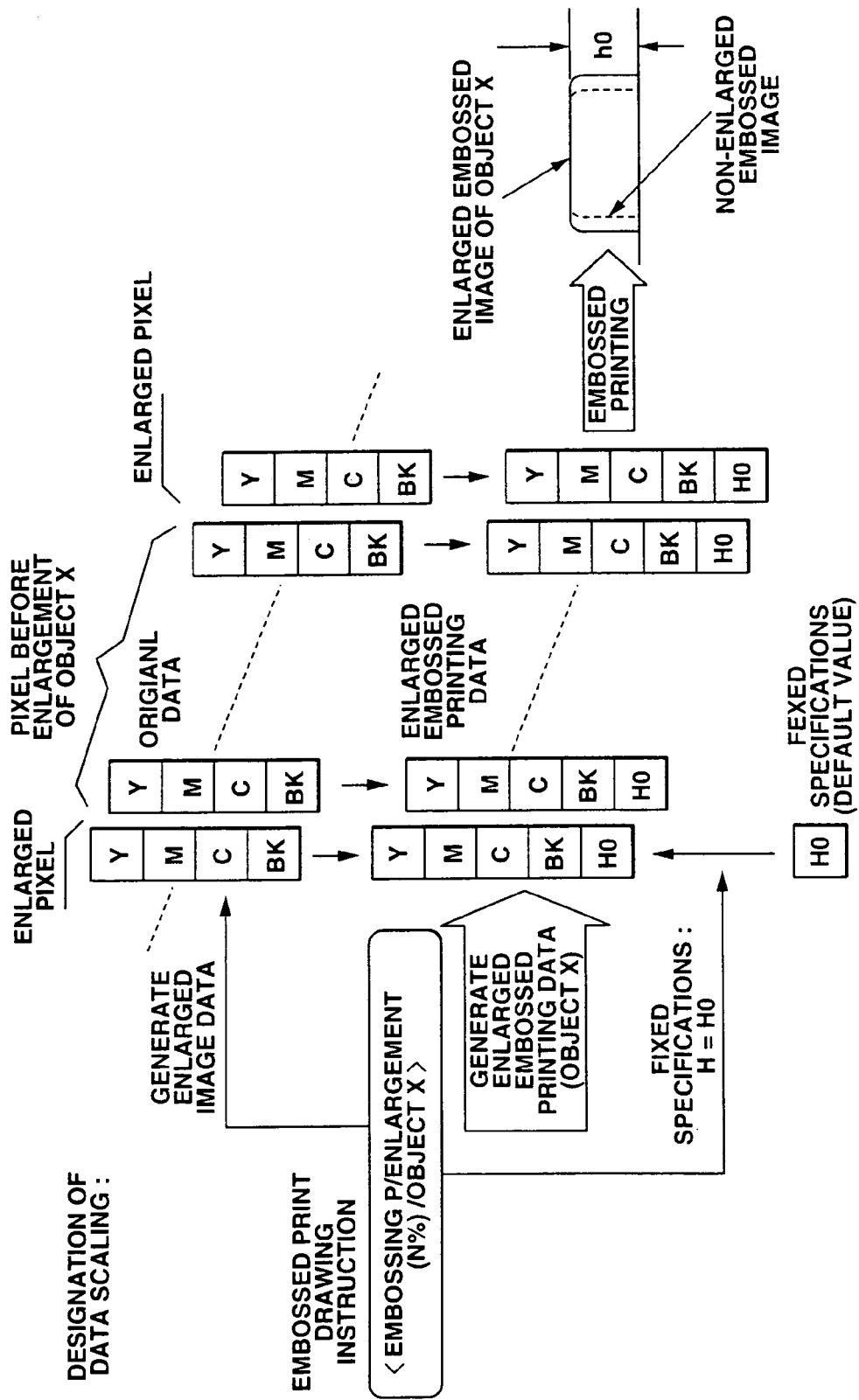
FIG. 24 is a conceptual diagram showing an embossed print processing operation at the time of data scaling designation.

FIG. 24 is a conceptual diagram showing an embossed print processing operation by the printer 30A according to the embossed print drawing command <embossment P/data enlargement (n %)/object X>.

In FIG. 24, when the embossed print drawing command <embossment P/data enlargement (n %)/object X> is given to the printer 30A, the original data configuring the object X is first enlarged at the designated ratio to generate the enlarged image data. Then, for example, the default gray scale data (H0) and the multi-color gray scale data of the original data are given to the pixels configuring the enlarged image data to generate enlarged embossed print data.

And, according to the enlarged embossed print data, the object X is printed as an embossed image (in this case, the enlarged embossed image) having the default height (h0) and the size scaled at the designated scaling ratio. At this time, the enlarged embossed print data reflects the colors of the original data, and the enlarged embossed image has the colors of the original data.

When data reduction is designated in connection with the scaling of the data, an embossed image reduced at the designated ratio can be printed by reducing the original data at the designated ratio to generate the reduced image data and generating reduced print data with gray scale data (H) and multi-color gray scale data added to the individual pixels of the reduced image data.

When an embossed printing instruction of "embossed appearance enhancement (e.g., frame)" is further executed at the time of the embossed printing instruction 1, an embossed print drawing command indicating "Apply the designated embossed appearance enhancement (frame) to object X and execute embossed printing", e.g., <embossment P/embossed appearance enhancement (frame)/object X>, is generated.

Figure 25:
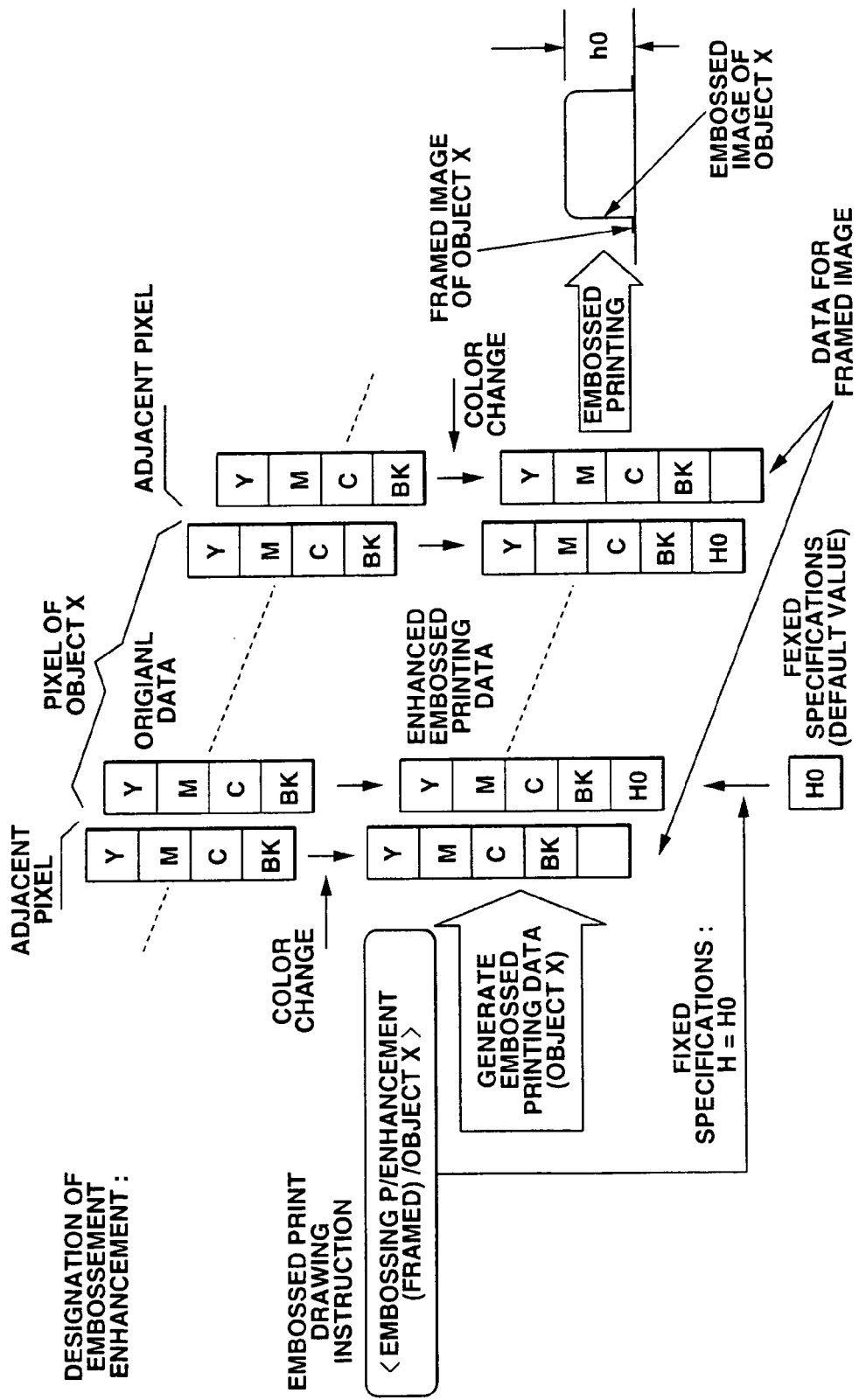
FIG. 25 is a conceptual diagram showing an embossed print processing operation at the time of embossed appearance enhancement designation.

FIG. 25 is a conceptual diagram showing the embossed print processing operation of the printer 30A according to the embossed print drawing command <embossment P/embossed appearance enhancement (frame)/object X>.

In FIG. 25, when the embossed print drawing command <embossed appearance enhancement (frame)//object X> is given, the printer 30A executes a specification change (color change) of the multi-color gray scale data corresponding to pixels adjacent to the pixels configuring the object X to generate gray scale data for a frame image appropriate to the designated embossed appearance enhancement (frame) and give it to the individual pixels, and also gives the multi-color gray scale data of the original data and the default gray scale data (H0) to the pixels configuring the object X to generate the embossed appearance enhancement print data.

And, according to the embossed appearance enhancement print data, the object X is printed as an embossed image (framed embossed image in this case: but, the frame image is non-embossed-printed) having a default height (h0) and having been subjected to the designated embossed appearance enhancement.

When another enhancing method (shading, or the like) is designated as the embossed appearance enhancement, image data for the embossed appearance enhancement is generated from pixels adjacent to the individual pixels configuring the object X, and the image data for the embossed appearance enhancement can be used to execute the non-embossed printing of the enhancement image next to the embossed image of the object X.

When an embossed printing instruction of "embossed surface pattern (e.g., shade 1)" is further executed at the time of the above-described embossed printing instruction 1, an embossed print drawing command indicating "Execute embossed printing of object X in the designated embossed surface pattern (shade 1)", e.g., <embossment P/embossed surface pattern (shade 1)/object X>, is generated.

Figure 26:
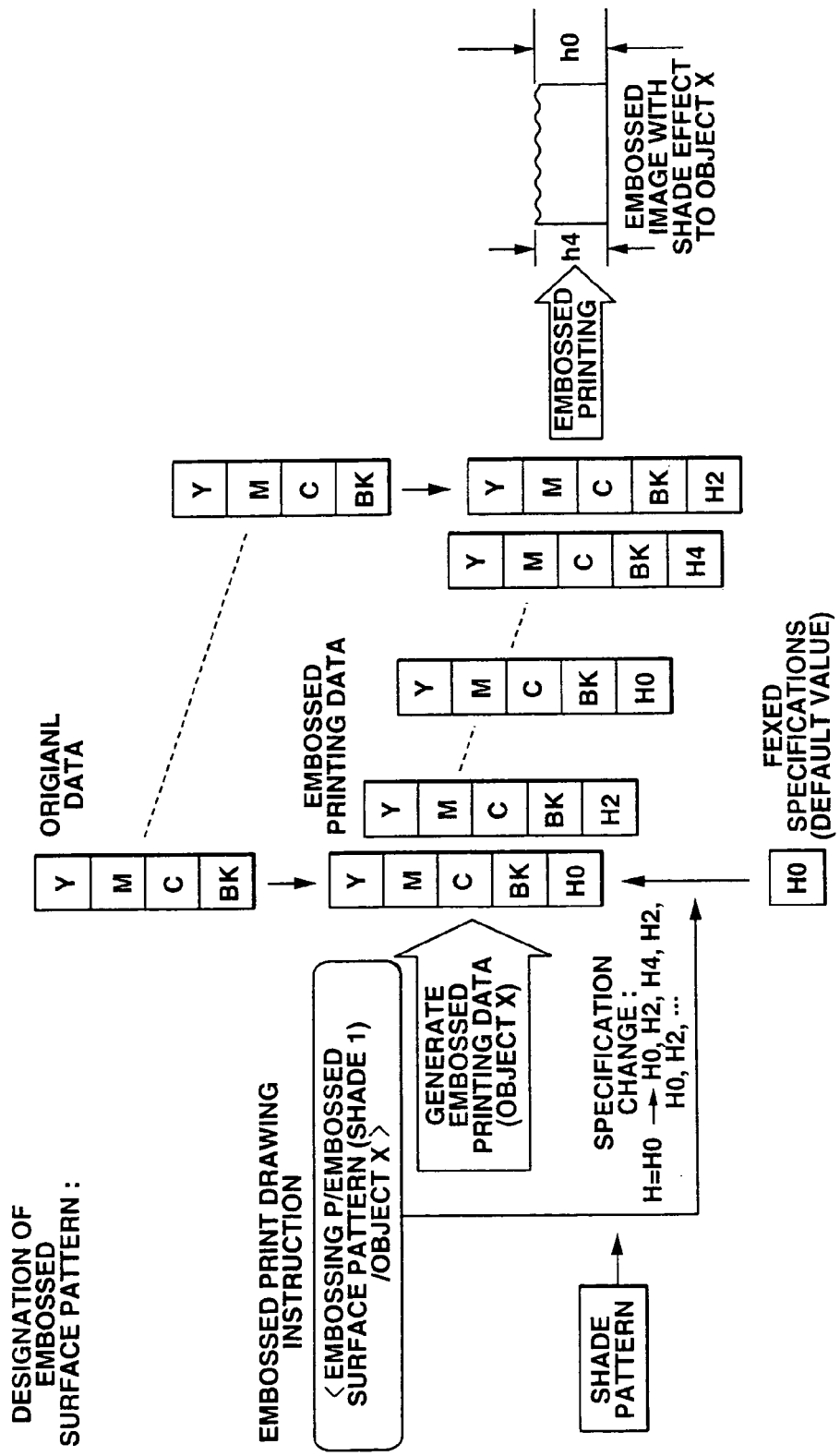
FIG. 26 is a conceptual diagram showing an embossed print processing operation at the time of embossed surface pattern designation.

FIG. 26 is a conceptual diagram showing the embossed print processing operation of the printer 30A according to the embossed print drawing command <embossment P/embossed surface pattern (shade 1)/object X>.

In FIG. 26, when the embossed print drawing command <embossment P/embossed surface pattern (shade 1)/object X> is given, the printer 30A reads gray scale data (H) for expandable toner which is previously provided in accordance with the designated embossed surface pattern (shade 1) to execute a specification change of the default gray scale data (H0), generates gray scale data (H0), (H2), (H4), . . . appropriate to the designated embossed surface pattern (shade 1), and gives the gray scale data (H01, H02, H4, . . . ) to the individual pixels configuring the object X (e.g., H01, H02, H4, are arranged to have a vertical interval (irregularity) on the embossed surface) to generate embossed print data.

And, according to the embossed print data, the printer 30A prints the object X as an embossed image with the embossed surface forming the designated embossed surface pattern (in this case, shade 1: height h4 portion and height h0 portion are mixed to have irregularity on the embossed surface). At this time, the embossed print data reflects the colors of the original data, and the embossed image has colors reflecting those of the original data.

The embossed surface pattern can be provided in plural, and the embossed image surface can be provided with various patterns of halftone effects by printing the embossed image using a desired embossed surface pattern.

When an embossed printing instruction of "overlap designation (e.g., reflection of overlap, etc.)" is further executed at the time of the above-described embossed printing instruction 1, an embossed print drawing command indicating "Apply the designated overlap processing (reflection of the overlap) to the object X and execute embossed printing", e.g., <embossment P/overlap processing (reflection of the overlap)/object X>, is generated.

When the <embossment P/overlap processing (reflection of the overlap)/object X> is given, and if there is an object (e.g., X1) which overlaps the object X, the printer 30A adds, for example, the default gray scale data (H0) to the pixels configuring the objects X and X1 and also adds gray scale data (Hn), which is appropriate to the designated overlap processing (in this case, increasing the height of the overlap area by n (n=the number of overlaps) times), to the pixels in the area where both objects overlap to generate embossed print data, and uses the embossed print data to print an embossed image which has the objects X and X1 embossed and the designated overlap processing (increasing the height of overlap area by n times) applied to the area where the objects X, X1 overlap.

The printed results according to the "overlap designation" by the system of this embodiment will be described with reference to FIG. 9A through FIG. 9D.

FIG. 9A through FIG. 9D each show the printed results corresponding to the individual embossed print drawing commands of "designation of overlap=reflection of overlap", "designation of overlap=disregard of overlap", "designation of overlap=not form a relief from overlap" and "designation of overlap=logic operation on overlap". In the drawings, X1, X2 indicate objects having the overlapped area.

In FIG. 9A, when "designation of overlap=reflection of overlap" is designated, the overlapped portion is the sum of the objects X1, X2 in height (namely when it is assumed that the number of overlaps is n, the height of the overlapped portion is increased by n times).

In FIG. 9B, when "designation of overlap=disregard of overlap" is designated, the overlapped portion has a height matching the height of either object X1 or X2.

In FIG. 9C, when "designation of overlap=not form a relief from overlap" is designated, the overlapped portion is printed normally (non-embossed printing).

In FIG. 9D, when "designation of overlap=logic operation on overlap" is designated, the overlapped portion has a height which is changed from the heights of the objects X1, X 2 to a height determined by the designated logic operation.

For example, when an embossed printing instruction of "print embossed image last" is executed at the time of the above-described embossed printing instruction 1, an embossed print drawing command which has a command for reflecting the printing order further added to the object X under the embossed printing instruction is generated, the default gray scale data (H0) is given to the pixels configuring the object X according to the drawing command to control so to print the expandable toner last according to the gray scale data (H0), and the object X can be printed as an embossed image (e.g., an image having the expandable toner H transferred as the bottom layer shown as pixel A in FIG. 8G) which has the default expanded height (h0) and the multi-color image formed on the expanded bottom surface.

Conversely, when an embossing instruction of "print embossed image first" is executed at the time of the above-described embossed printing instruction 1, an embossed print drawing command which has a command of reflecting the designated printing order added to the object X is generated, the default gray scale data (H0) is given to the pixels configuring the object X according to the drawing command as described above to control so as to print the expandable toner first according to the gray scale data (H0), and the object can be printed as an opaque embossed image (e.g., an image having the expandable toner H transferred as the top layer opposite from the pixel A of FIG. 8G) which has the default expanded height (h0) and the top surface expanded.

In this case, the printer 30A needs to have a function to control, based on the fact that the overlap order of the individual toners Y, M, C, BK, H is reversed by the secondary transfer by the image forming section 33, so that the exposure/developing processing for the expandable toner (H) is executed after the exposure/developing processing for Y, M, C, BK in response to the drawing command instructing "print embossed image last", and the exposure/developing processing for the expandable toner (H) is executed before the exposure/developing processing for Y, M, C, BK in response to the drawing command instructing "print embossed image first".

On the UI screen 41 shown in FIG. 17, when an embossed printing instruction of "embossed printing"+"attribute value-to-height allocation designation (e.g., conversion of brightness into height)" is executed, an embossed print drawing command indicating "Execute embossed printing of document information subject to printing according to the designated attribute value-to-height allocation (conversion of brightness into height)", e.g., <embossment P/attribute value-to-height allocation (brightness)>, is generated.

Figure 27:
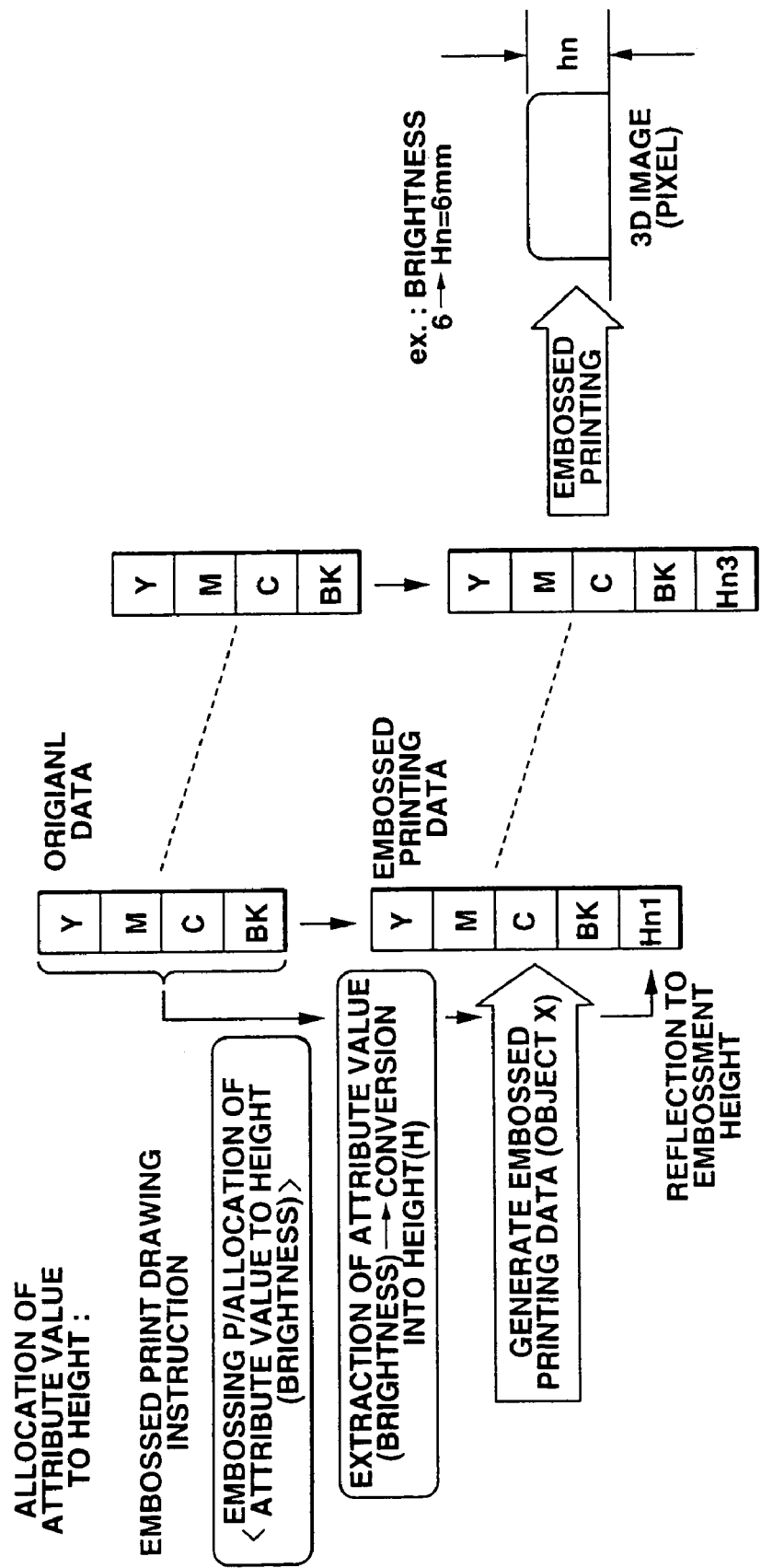
FIG. 27 is a conceptual diagram showing an embossed print processing operation at the time of attribute value-to-height allocation designation.

FIG. 27 is a conceptual diagram showing the embossed print processing operation by the printer 30A according to the embossed print drawing command <embossment P/attribute value-to-height allocation (brightness)>.

In FIG. 27, when the embossed print drawing command <embossment P/attribute value-to-height allocation (brightness)> is given, the printer 30A extracts a attribute value (brightness) under the designated attribute value allocation with respect to all the objects in the document information subject to the printing and converts the attribute value into height information.

Then, the printer 30A generates gray scale data (Hn1, Hn2, . . . ) for the expandable toner corresponding to the extracted height and adds the gray scale data (Hn1, Hn2, . . . ) to the individual pixels to generate the embossed print data.

And, according to the embossed print data, the individual objects in the document information to be printed are printed as an embossed image having a height corresponding to the attribute value (brightness in this case) of the original data for the object.

Thus, when the "conversion of brightness into height" is designated by the designation of attribute value-to-height allocation, the individual objects in the document information subject to the embossed printing is printed as an embossed image having a height corresponding to the brightness of the original data for the individual objects.

FIG. 27 shows an example that an object of which original data has brightness 6 is printed as an embossed image having a height of 6 mm corresponding to the brightness 6 according to an embossed print drawing command <embossment P/attribute value-to-height allocation (brightness)>.

Similarly, when "conversion of a chroma into height", "conversion of a hue into height" and "conversion of density into height" are designated, the individual objects in the document information subject to the embossed printing are printed as an embossed image having a height corresponding to the chroma, hue and density of the original data for the individual objects.

In the print processing for the embossed printing according to the designation of attribute value-to-height conversion, the attribute value can be automatically converted into a value of output specifications (height) by, for example, a predetermined expression. And, instruction unit may be provided to enable to change at a desired ratio the value of output specifications obtained by the automatic conversion.

As the unit conversion method to convert the attribute value into the value of output specifications, there is a method of converting from the Munsell Color System into height (mm) or from L*a*b* color system into height (mm).

To designate the embossed output specifications using the UI screen 41, it is not limited to the combinations of the embossed output specifications described with reference to FIG. 20 through FIG. 27, but the designation can also be made by combining desired embossed output specifications in a range without involving any trouble.

Thus, the print processing system of the second embodiment has a function to instruct embossed output specifications not only about which object is printed as an embossed image but also specifications (height, relief shape, embossed surface pattern, etc.) to which an embossed image is printed out.

By configuring as described above, the user can designate desired embossed output specifications from various embossed output specifications to obtain an embossed print output having a mixture of embossed images closer to the user's image.

When the embossed output specifications which can be designated are provided with numerous variations, an embossed image can be expressed effectively with the embossed output specifications having rich variations, and the value of embossed printing can be enhanced.

By the print processing system of the second embodiment, pseudo embossed printing for printing the designated object as a pseudo embossed image can also be executed in addition to the embossed printing for printing the designated object as an embossed image and.

To execute the pseudo embossed printing, the printer driver 20A uses the individual object instruction tools of the embossed print designation field to designate an object subject to the pseudo embossed printing on the UI screen 41 (see FIG. 17) shown on the display section 12 of the PC 10A and checks the "pseudo embossed-print" CB to execute the pseudo embossed printing instruction of ("pseudo embossed-print"+"object subject to embossed printing").

Embodiments of the pseudo embossed printing function structure by the print processing system of the second embodiment will be described.

Figure 28:
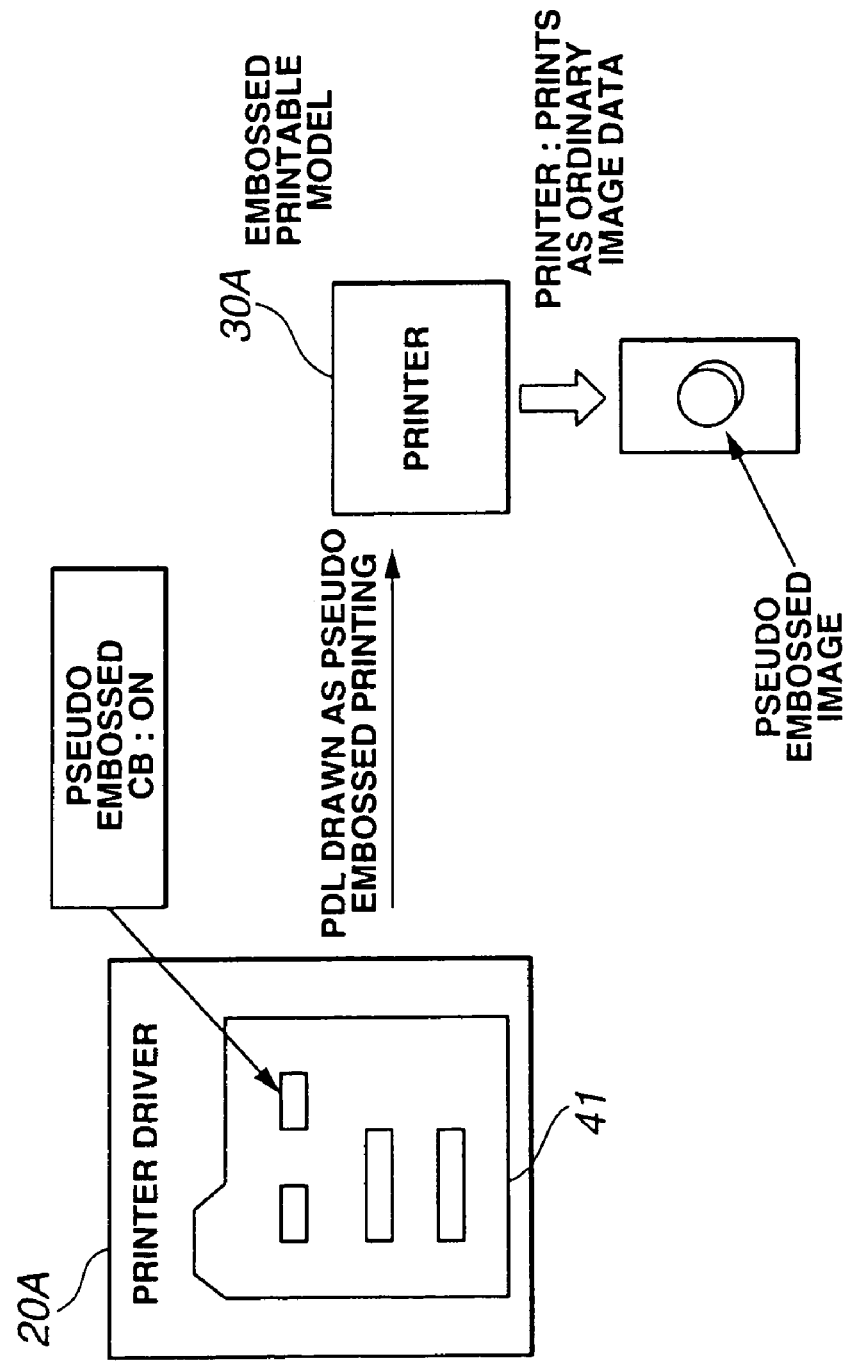
FIG. 28 is a conceptual diagram showing a first modification of the pseudo embossed printing function structure.

FIG. 28 is a conceptual diagram showing a first modification in the pseudo embossed printing function structure according to the second embodiment.

In this modification, when a pseudo embossed printing instruction (pseudo embossment CB: ON) of "pseudo embossed printing"+"object subject to embossed printing" is executed by the printer driver 20A on the UI screen 41 (see FIG. 17), document information subject to printing is analyzed, the object (object subject to embossed printing) subject to the pseudo embossed printing instruction is extracted, and a pseudo embossed print drawing command for executing the pseudo embossed printing of the object is generated according to the extracted object, added to the print job and sent to the printer 30A.

Here, the pseudo embossed print drawing command converts drawing data (embossed drawing data) corresponding to the object subject to embossed printing into drawing data (pseudo embossment data), which is expressed as a pseudo embossed image like enhancement, contour extraction or shadow, and corresponds to the PDL drawn as the pseudo embossed printing in FIG. 28.

The printer 30A sends the pseudo embossed print drawing command (PDL drawn as pseudo embossed printing) being sent from the printer driver 20A to the printing unit (image forming section), and the printing unit prints the pseudo embossed print command as ordinary image data. As the above PDL printed result, the object subject to the embossed printing is printed as a pseudo embossed image which is expressed as enhancement, contour extraction or shadow.

Here, the process of generating the pseudo embossed print drawing command according to the pseudo embossed printing instruction will be described with reference to FIG. 11 A through FIG. 11D.

In this example, it is assumed that a pseudo embossed printing instruction is executed on the ◯ figure object with respect to the document information subject to printing as shown in FIG. 11A.

In this case, the printer driver 20A extracts the of ◯ figure object from the document information subject to printing, generates from the original data image data having the original data displaced in a prescribed direction (e.g., in the lower right direction by several dots) as shown in FIG. 11B and merges the generated data with the original data to generate print data (pseudo embossed print drawing command: PDL drawn as pseudo embossed printing).

In this case, the printer 30A having received the print data prints according to the print data an image which has an image corresponding to the generated data seen as a shadow with respect to the image corresponding to the original data.

There is also another method of generating the print data by generating image data having the entire original data enlarged by several dots from the original data of the ○ figure object and merging the generated data with the original data as shown in FIG. 11C.

In this case, the printer 30A having received the print data prints according to the print data an image having an image corresponding to the generated data seen as a frame (contour enhancement) with respect to an image corresponding to the original data.

As a modification of FIG. 11B, there is a method of generating print data by generating data having the original data displaced in a prescribed direction from the original data of the○ figure object, adding different brightness or chroma (mutually increased or decreased) to the generated data and the original data and merging the generated data with the original data.

In this case, the printer 30A having received the print data can print according to the print data an image having an image corresponding to the generated data seen as an enhanced shadow with respect to the image corresponding to the original data.

As a modification of FIG. 11C, there is a method of generating print data by generating data having the entire original data enlarged from the original data of the ○ figure object, adding different brightness or chroma (mutually increased or decreased) to the generated data and the original data and merging the generated data with the original data.

In this case, the printer 30A having received the print data can print according to the print data an image having an image corresponding to the generated data seen as an enhanced frame with respect to the image according to the original data.

Besides, there is also a method of generating print data by generating data with the entire original data enlarged from the original data of the ○ figure object, adding gradation to the generated data and merging the generated data with the original data as shown in FIG. 11D.

In this case, the printer 30A having received the print data can print according to the print data an image having the peripheral image (image corresponding to the generated data) of the image corresponding to the original data expressed as a shadow by gradation.

Thus, the first modification has a function of executing a pseudo embossed printing instruction including the designation of the object subject to the pseudo embossed printing and, when the pseudo embossed printing instruction is executed, can print the object as the pseudo embossed image by extracting the designated object from the document information subject to the printing and converting the original data (embossed drawing data) of the object into drawing data expressed as a contour or a shadow (see FIG. 11).

Figure 29:
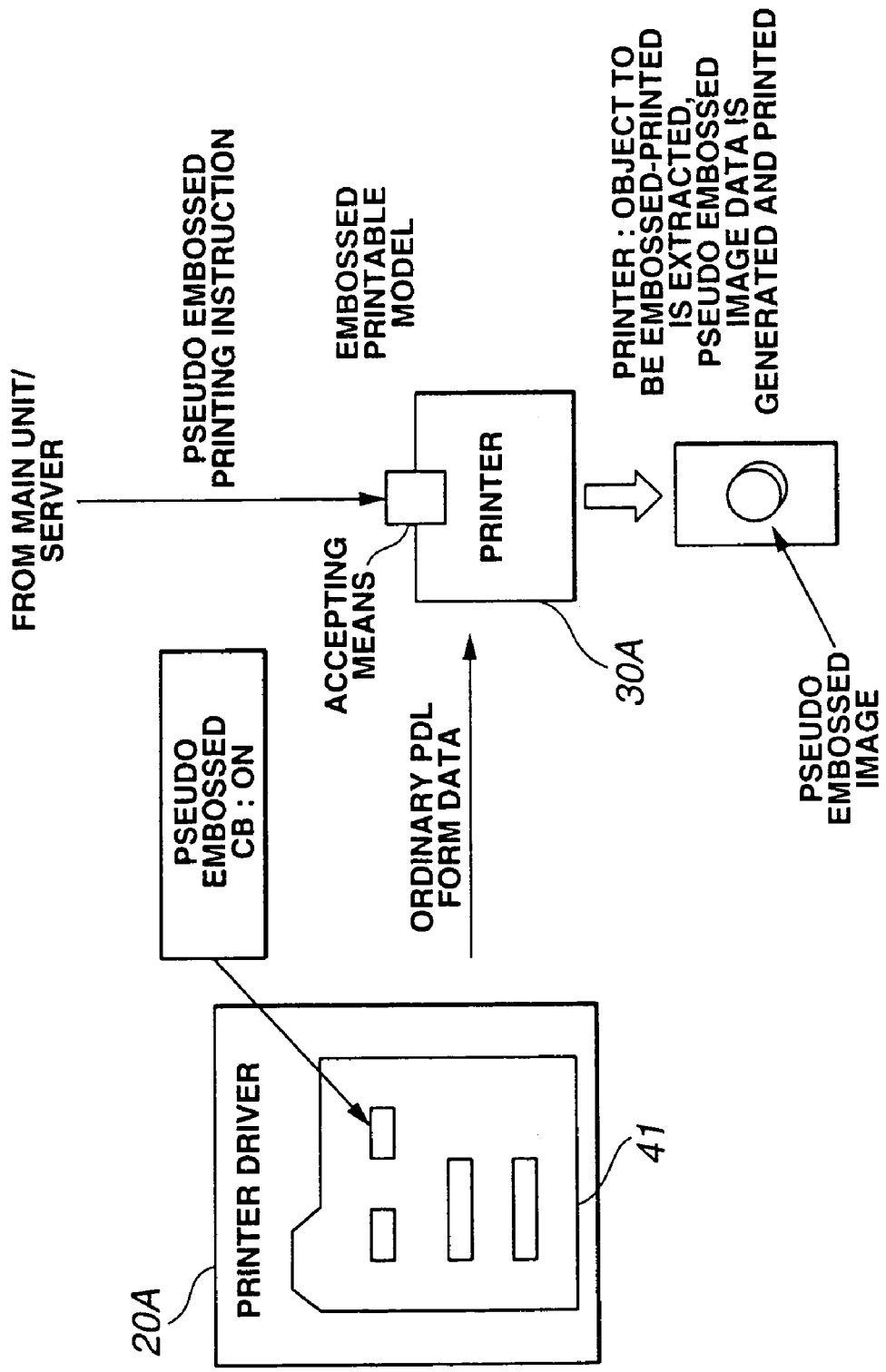
FIG. 29 is a conceptual diagram showing a second modification of the pseudo embossed printing function structure.

FIG. 29 is a conceptual diagram showing a second modification of the pseudo embossed printing function structure.

In this modification, the printer driver 20A is equivalent to that of the first modification (see FIG. 28). But, the printer driver 20A of this modification does not execute a pseudo embossed printing instruction (pseudo embossment CB: OFF).

In this case, the printer driver 20A generates data in an ordinary PDL form from the document information subject to the printing and sends it to the printer 30A.

Meanwhile, the printer 30A has an accepting unit that accepts the pseudo embossed printing instruction from a device other than the printer driver 20A, such as the main unit (PC 10A) or a server (not shown).

The pseudo embossed printing instruction method from the PC main unit/server instructs the pseudo embossed printing of a prescribed object by the same operation as that on the above-described UI screen 41.

When the PDL form print data is received from the printer driver 20A while the pseudo embossed printing instruction from the PC main unit/server is being accepted by the accepting unit, the printer 30A extracts the object subject to the pseudo embossed printing from the print data, generates data corresponding to a shadow or a contour from the original data of the object by the various methods shown in FIG. 11, merging the generated data with the original data to generate the pseudo embossed drawing data, and executes the pseudo embossed printing of the object according to the drawing data.

Thus, according to the second modification, even when there is no pseudo embossed printing instruction from the printer driver 20A, the pseudo embossed printing is executed according to the instruction if the pseudo embossed printing instruction is output from the main unit/server.

The printer 30 of the first and second modification has the embossed printing function, but there is also a model incapable of executing the embossed printing as the subject to be driven by the printer driver 20A. Therefore, a third modification will be described on pseudo embossed print processing using a printer (hereinafter referred to as the printer 30E for convenience of description) which is incapable of executing the embossed printing.

Figure 30:
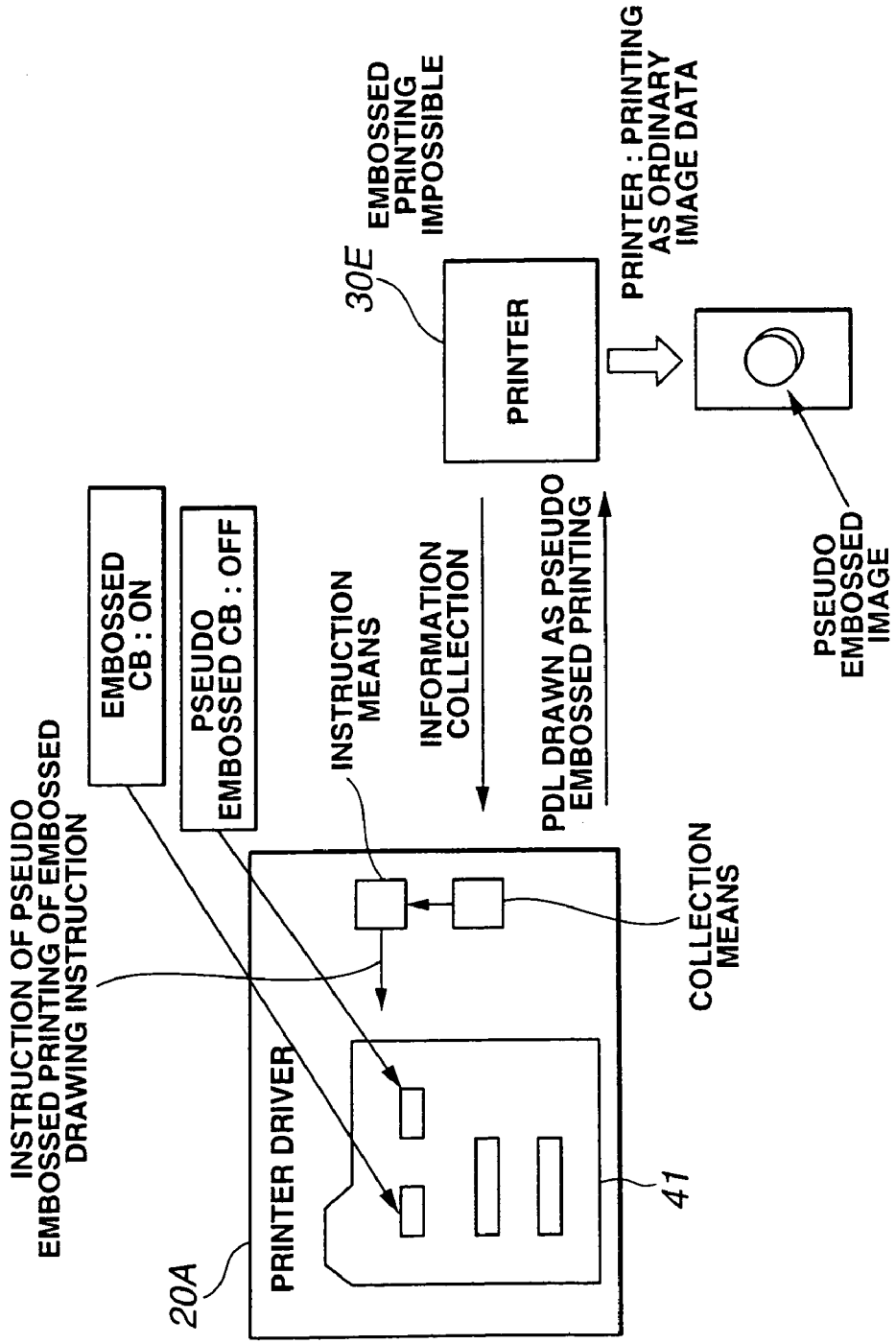
FIG. 30 is a conceptual diagram showing a third modification of the pseudo embossed printing function structure.

FIG. 30 is a conceptual diagram showing the third modification of the pseudo embossed printing function structure.

The printer 30E of this modification cannot execute the embossed printing. The printer 30E incapable of executing the embossed printing includes one inherently not having the embossed printing function, having the embossed printing function but being out of the expansion (H) toner or not having an embossed printing option.

Meanwhile, the printer driver 20A has an embossed printing instruction function and a pseudo embossed printing instruction function using the UI screen 41. The printer driver 20A of this modification is provided with an instruction unit which instructs the pseudo embossed printing of the embossed print drawing command when the embossed printing instruction is executed on a prescribed object by the UI screen 41 and it is recognized that the printer 30E cannot execute the embossed printing.

To recognize that the printer 30E is incapable of executing the embossed printing, the printer driver 20A is also provided with a collection unit that collects information about the printing function of the printer 30E.

Generally, when the printer driver 20A receives an embossed printing instruction (embossed printing CB ON) from the UI screen 41, an embossed print drawing command needed for the embossed printing of the object subjected to the embossed printing instruction is generated by the method described above.

But, in this modification, when the embossed printing instruction is executed and it is recognized that the printer 30E is incapable of executing the embossed printing according to the collected information by the collecting unit, it is instructed by the instruction unit to execute the pseudo embossed printing of the embossed drawing command.

According to the instruction, the printer driver 20A generates a drawing command (PDL data) having the object under the embossed print designation drawn as a pseudo embossed printing and sends it as a print job to the printer 30E in the same way as in FIG. 28.

Figure 18:
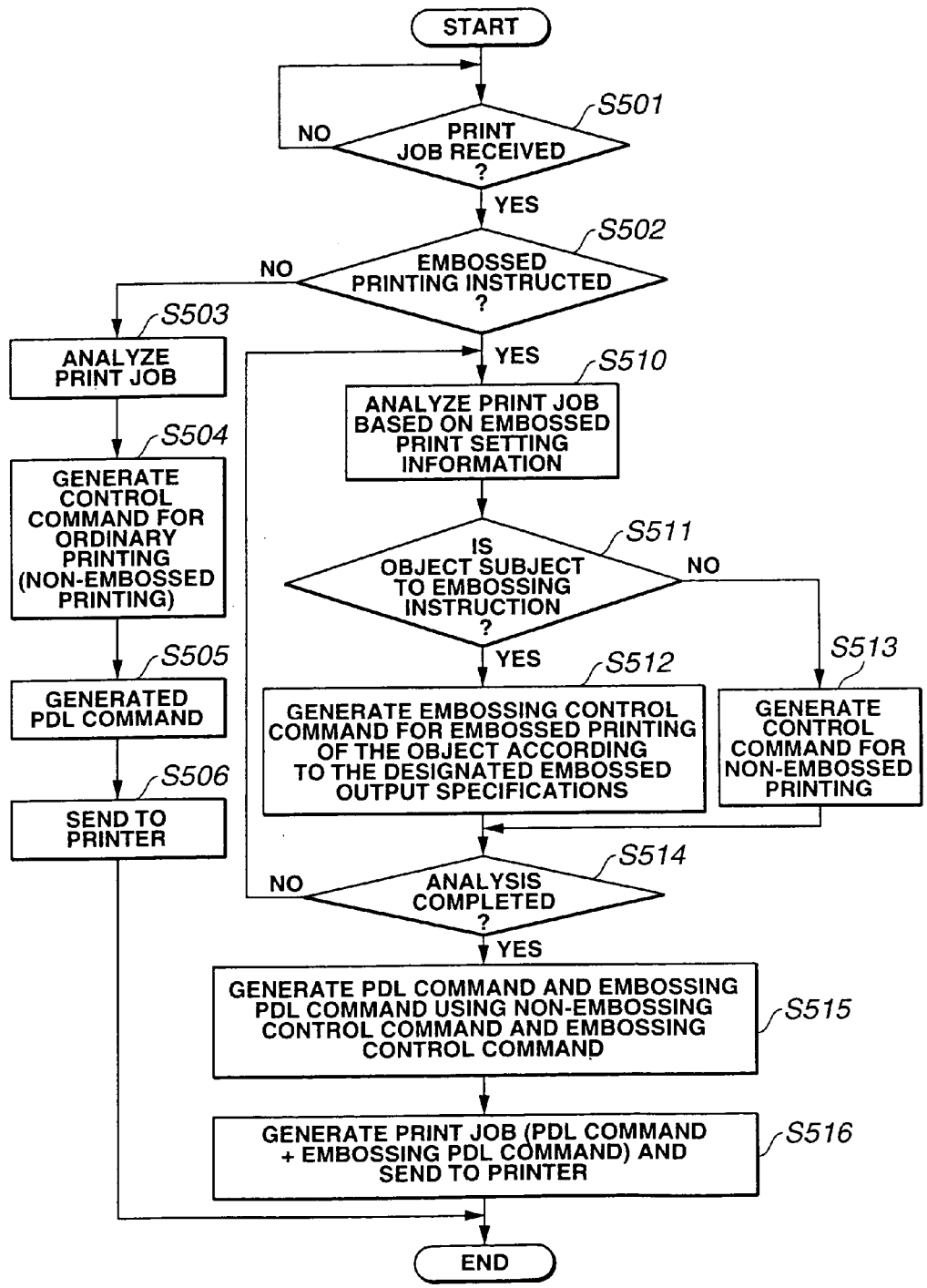
FIG. 18 is a flow chart showing a print processing operation of the printer driver.

Here, the PDL data having the object under the embossed print designation drawn as the pseudo embossed printing, which is sent from the printer driver 20A to the printer 30E, is drawing data generated by generating data corresponding to a shadow or a contour from the original data of the object to be embossed-printed by various methods as shown in FIG. 18B through FIG. 18D and merging the generated data with the original data as described with reference to FIG. 18.

Therefore, the printer 30E having received the PDL data can print according to the PDL data as a pseudo embossed image with the object subject to the embossed printing expressed as enhancement, contour extraction or shadow.

In this modification is configured to collect the function and state of the printer 30E and, when it is recognized according to the collected information that the printer 30E is incapable of executing the embossed printing, to instruct the pseudo embossed printing of the embossed drawing command. But, when it is previously known that the printer 30E is incapable of executing the embossed printing, the instruction may be executed manually.

Thus, according to the structure of this modification in that the printer driver 20A is provided with the unit that designating the pseudo embossed printing of the embossed print drawing command, a printout having a pseudo embossed print image mixed can be obtained by the printer 30E even when the familiar printer 30E incapable of executing the embossed printing (or the printer which cannot execute the embossed printing because it is out of the expandable toner) is used as the subject to be driven by the printer driver 20A.

This printout provides a function as a preview for checking the embossed image before actually executing the embossed printing because the pseudo embossed image reflects the image of the embossed image (see FIG. 18).

Besides, the second embodiment is not limited to the above embodiments described and shown in the drawings but can be modified appropriately without departing from the scope of the subject matter.

For example, the system using the PDL command is described in the above embodiment, but the scope of the second embodiment is not limited to the system using the PDL command.

The system comprising the printer driver 20A built in the PC 10A and the printer 30A connected to the printer driver 20A through the network was described in the above embodiment, but the system may be configured to have the printer driver and the printer integrated. And, the information input section is not limited to the PC.

In short, the system may be any type if the UI such as the printer driver UI is used to execute the embossed printing instruction including the embossed print output specifications, the embossed print drawing command is generated according to the embossed printing instruction from the UI, and an embossed image having the designated embossed output specifications can be printed out according to the embossed print drawing command.

The UI as the embossed printing instruction unit is not limited to one using the input/operation section and the display section, but another UI possessed by the system may be used. It may also be configured of a user interface unit by building a Web server in the system, executing the same embossed printing instruction as that using the UI screen 41 on a setting screen on the Web browser of an external terminal, and taking the embossed print setting information input by the embossed printing instruction through the Web server.

The printer provided with the image forming section for the expandable toner is used independent of the image forming section for Y, M, C, BK in the above embodiment, and the printer provided with only the image forming section of Y, M, C, BK may also be used. In this case, the image forming section for BK is used as the image forming section for the expandable toner, and for the BK, the image processing method by the printer can be changed to express by Y, M, C.

In the above embodiment, the function to execute the embossed print designation including the embossed output specifications of the object subject to embossed printing and the embossed image for the embossed printing was described. This function can also be applied to special printing to execute the special print designation including special print specifications of an object subject to special printing and a special image. Therefore, the second embodiment can be applied to systems in general which execute special printing which cannot be designated by an ordinary application.

Then, a third embodiment of the invention will be described.

Figure 31:
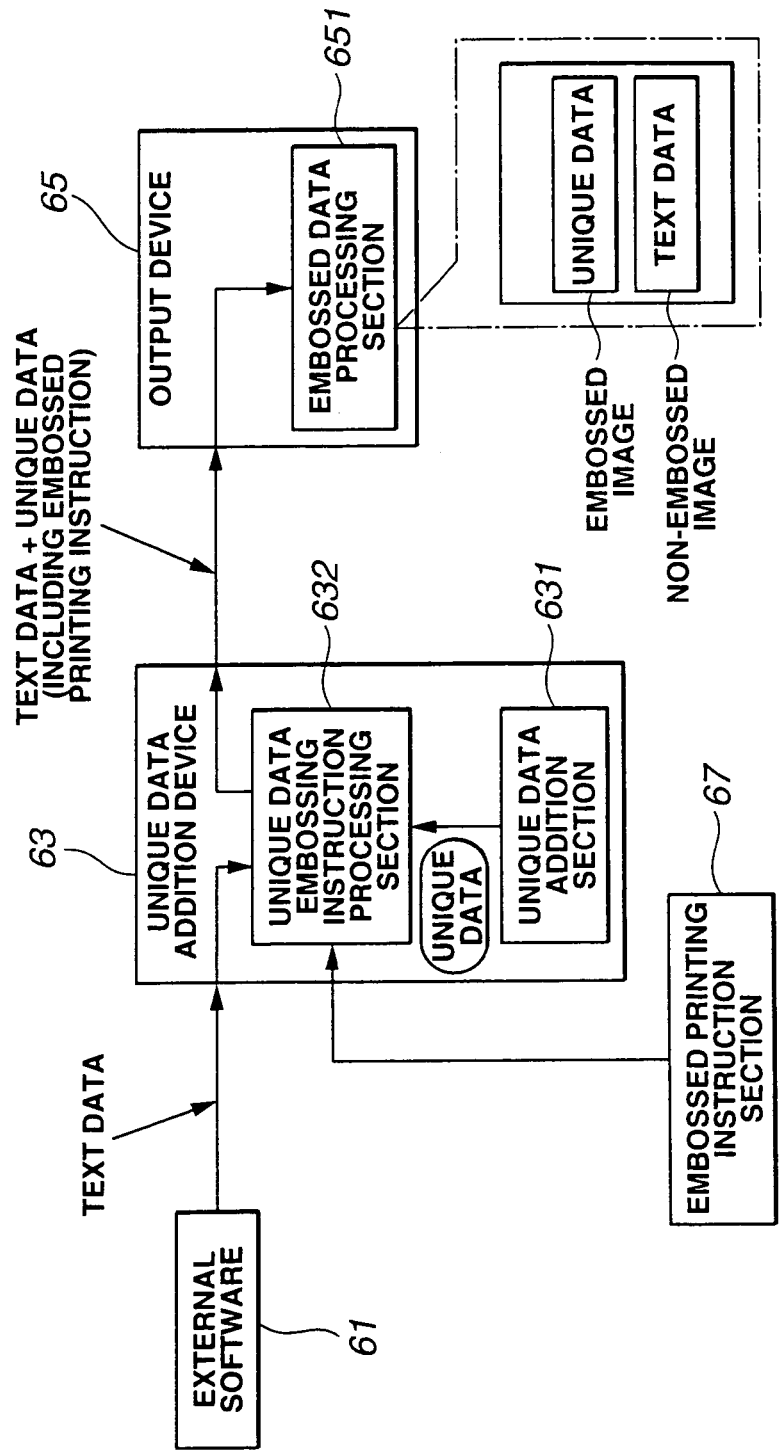
FIG. 31 is a diagram showing a conceptual structure of a print processing system according to the present invention.

FIG. 31 is a diagram showing a conceptual structure of the print processing system according to the invention.

This print processing system comprises a unique data adding device 63 which receives text data subject to printing from external software 61, adds unique data (some data to be printed together with text data) to the text data and sends it, and an output device 65 which executes image print output processing according to the data (text data+unique data) subject to printing received from the unique data adding device 63.

The unique data adding device 63 is provided with a unique data addition section 631 and a unique data embossing instruction processing section 632.

The unique data addition section 631 processes to add unique data (data such as "X" Attention" to be described later) generated in it to the text data input from the external software 61.

When it is instructed by an embossed print instruction section 67 to be described later to execute the embossed printing of the unique data, the unique data embossing instruction processing section 632 executes unique data embossing instruction processing to add unique data to the text data and to send it as embossing instruction reflection data including embossed printing instruction to the unique data to the output device 65.

The unique data adding device 63 is provided with the embossed print instruction section 67 which instructs whether the unique data to be added to the text data is embossed-printed or not.

The embossed print instruction section 67 can be achieved by a prescribed UI (user interface) such as the display section, the input device (keyboard, mouse, etc.) attached to the unique data addition device 63.

Figure 6:
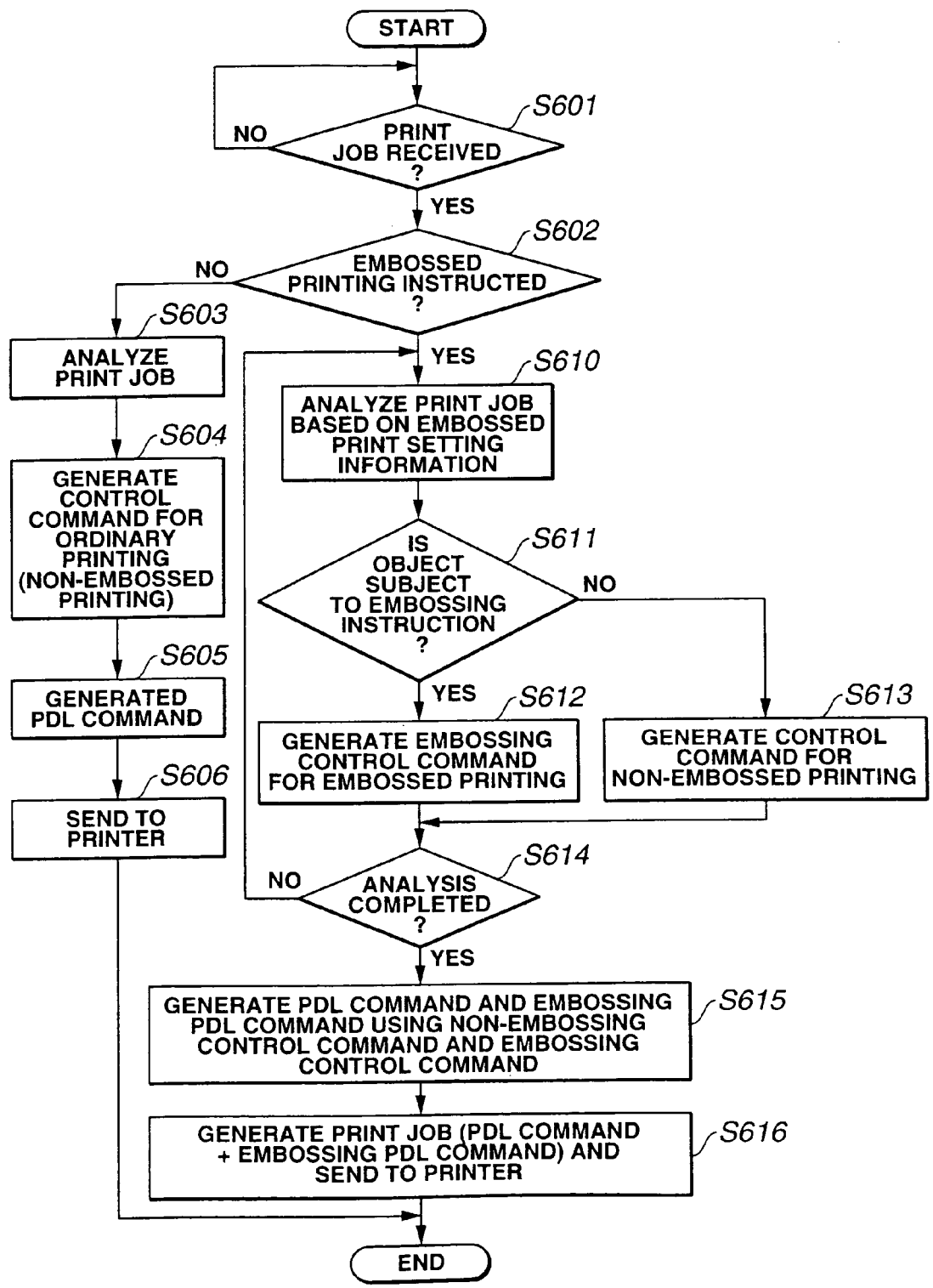
FIG. 6 is a flow chart showing a print processing operation of the printer driver.

The user can instruct from the embossed print instruction section 67 whether unique data is embossed-printed (e.g., using the expandable toner to print as an embossed image as indicated by the pixel A shown in FIG. 6) or not (printing as an ordinary non-embossed image as indicated by the pixel B shown in FIG. 6) by using, for example, the UI screen shown on the display section.

In the system configured as described above, it is assumed that the text data is input from the external software 61 in the state that the embossed printing of the unique data is instructed from the embossed print instruction section 67.

In the unique data addition device 63 of this case, the unique data embossing instruction processing section 632 adds the unique data, which is given from the unique data addition section 631, to the text data being input from the external software 61 and also generates embossing instruction reflection data including the instruction (unique data embossed printing instruction) about the embossed printing of the unique data and sends the embossing instruction reflection data to the output device 65.

Meanwhile, the output device 65 receives the embossing instruction reflection data sent from the unique data embossing instruction processing section 632 and transfers it to the embossment data processing section 651.

The embossment data processing section 15 analyzes the embossing instruction reflection data received from the unique data adding device 63, recognizes as embossment data to be embossed-printed the unique data in the received data based on the unique data embossed printing instruction contained in the received data, and processes to output the unique data recognized as the embossment data and the text data not recognized as the embossment data as an embossed image and an ordinary image, respectively.

As a final printout result through the processing by the embossment data processing section 651, the text data as an ordinary image (non-embossed image) and the unique data added during the processing as an embossed image are printed out together.

Then, various structure examples of the system of FIG. 31 will be described.

Figure 32:
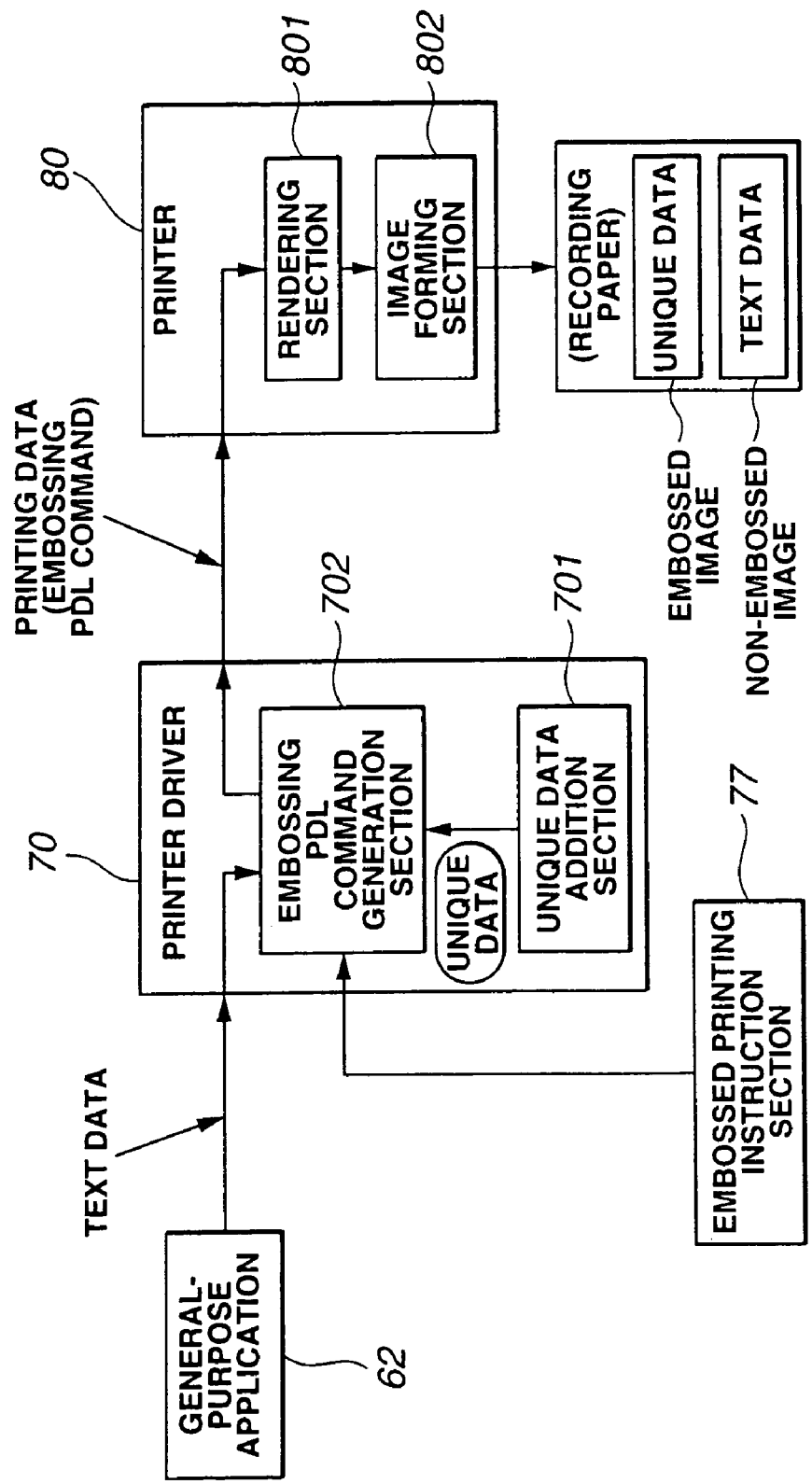
FIG. 32 is a conceptual diagram showing a structure of the system according to a first embodiment.

FIG. 32 is a diagram showing a first structure example of the system according to the third embodiment.

This system comprises a printer driver 70 which generates print data by adding unique data generated by the printer driver to the text data input from a general-purpose application 62 corresponding to the external software 61 of FIG. 31 and sends the print data to a printer 80, and the printer 80 which receives the print data being sent from the printer driver 70 and prints out an image according to the print data.

In this system, the printer driver 70 which functions as a printing instruction device to execute the printing instruction to the printer 80 comprises an embossed print instruction section 77 which corresponds to the embossed print instruction section 67 of the unique data adding device 63 in FIG. 31, a unique data addition section 701 which corresponds to the unique data addition section 631 of FIG. 31, and an embossing PDL command generating section 702 which corresponds to the unique data embossing instruction processing section 632 of FIG. 31.

The embossed print instruction section 77 and the unique data addition section 701 function in the same way as the embossed print instruction section 67 and the unique data addition section 631 of FIG. 31.

The embossing PDL command generating section 702 generates an embossing PDL command which comprises a PDL command for instructing that the text data being input from the general-purpose application 62 is drawn normally (as a non-embossed image) and an embossing instruction PDL command for instructing that unique data to be added to the text data by the unique data addition section 701 is subjected to embossed drawing (printed as an embossed image), and sends the embossing PDL command as print data to the printer 80.

Meanwhile, the printer 80 comprises a rendering section 801 and an image forming section 802 which correspond to the embossment data processing section 651 of the output device 65 in FIG. 31.

The rendering section 801 processes to execute bitmap development of unique data and text data, which are controlled by the embossing instruction PDL command and the PDL command in the embossing PDL command received from the printer driver 70, as embossed image data and non-embossed image data, respectively.

The image forming section 802 prints out according to the bitmap data which is developed on a bitmap memory by the rendering section 801 an image having an embossed image corresponding to the embossed image data and a non-embossed image corresponding to the non-embossed image data together on a recording medium (recording paper).

Then, a flow of the specific print processing operation by the system according to a first embodiment will be described with reference to FIG. 33.

Figure 33:
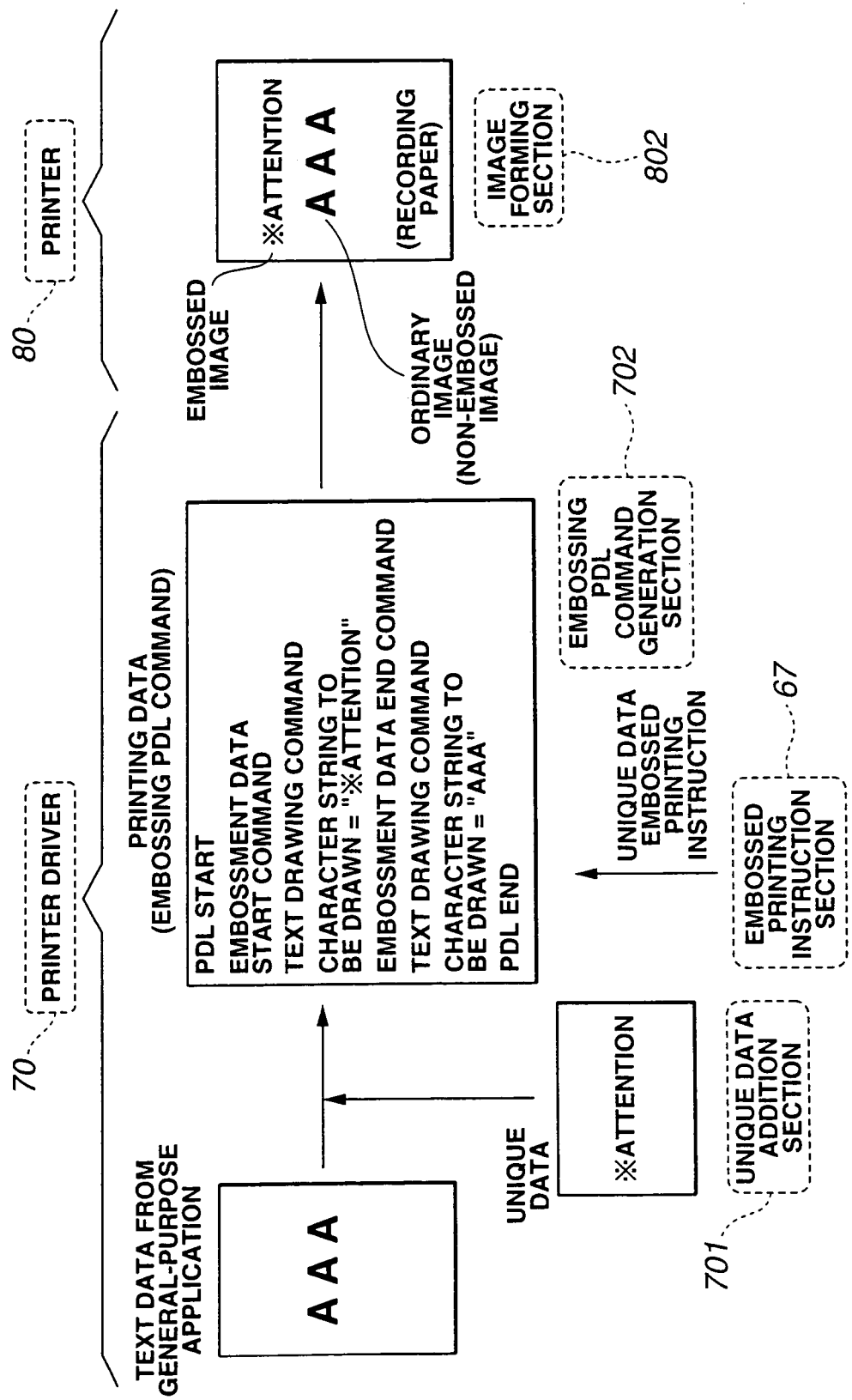
FIG. 33 is a diagram showing a flow of a print processing operation of the system according to the first embodiment.

In FIG. 33, when text data (text data "AAA") is input from the general-purpose application 62 to the printer driver 70, unique data (text data "X̶ Attention") is added by the unique data addition section 701, and the embossing PDL command (print data) generation process is started by the embossing PDL command generating section 702 according to the instruction to execute the embossed printing of the unique data from the embossed print instruction section 77.

In this case, the embossing PDL command generating section 702 generates an embossing PDL command having the contents as follows:

"1 (numeral indicates the number of lines, and the same is applied below): PDL start/2: embossment data start command/3: text drawing command/4: character string to be drawn="X̶ Attention"/5: embossment data end command/6: text drawing command/7: character string to be drawn="AAA"/8: PDL end" as shown in FIG. 33.

In this embossing PDL command, the sixth and seventh lines are commands instructing to normally draw the text data "AAA" being input from the general-purpose application 62, and the second to fifth lines are commands instructing to embossed printing the unique data "X̶ Attention" to be added to the text data "AAA".

Especially, the commands of the second to fifth lines are in a form describing a PDL command to draw unique data "X̶ Attention" subject to the embossed drawing between the start command (embossment data start command) and the end command (embossment data end command) for the embossed drawing and can be said as embossing instruction PDL commands which instruct unique data "X̶ Attention" to be added to the text data as the object under the embossed drawing.

The embossing PDL command generated by the embossing PDL command generating section 702 is sent to the printer 80 and input to the rendering section 801.

The rendering section 801 analyzes the embossing PDL command to be input and processes to execute bitmap development of unique data and text data to be controlled by the embossing instruction PDL command and the PDL command in it as embossed image data and non-embossed image data, respectively.

The rendering section 801 analyzes the embossing PDL command to be input, refers to embossing instruction PDL commands (second to fifth lines) and PDL commands (sixth and seventh lines) in it, distinguishes between the unique data "X̶ Attention" and the text data "AAA" which are controlled by the above commands, and executes bitmap development of them as embossed image data and non-embossed image data on the page memory.

In other words, the rendering section 801 recognizes the subject to be drawn (in this case, the subject to be drawn (unique data "X̶ Attention") of the PDL command described between "embossment data start command" and "embossment data end command") by the embossing instruction PDL command in the embossing PDL command as embossment data and develops as embossed image data.

Then, according to the bitmap data developed on the page memory by the rendering section 801, the image forming section 802 prints out an image having the embossed image corresponding to the embossed image data and the non-embossed image corresponding to the non-embossed image data together on recording paper.

In this case, the text data "AAA" is developed as non-embossed image data and the unique data "✖ Attention" is developed as embossed image data, and a mixed image of the non-embossed image from the text data "AAA" and the embossed image from the unique data is printed out on recording paper according to the bitmap data.

Figure 34:
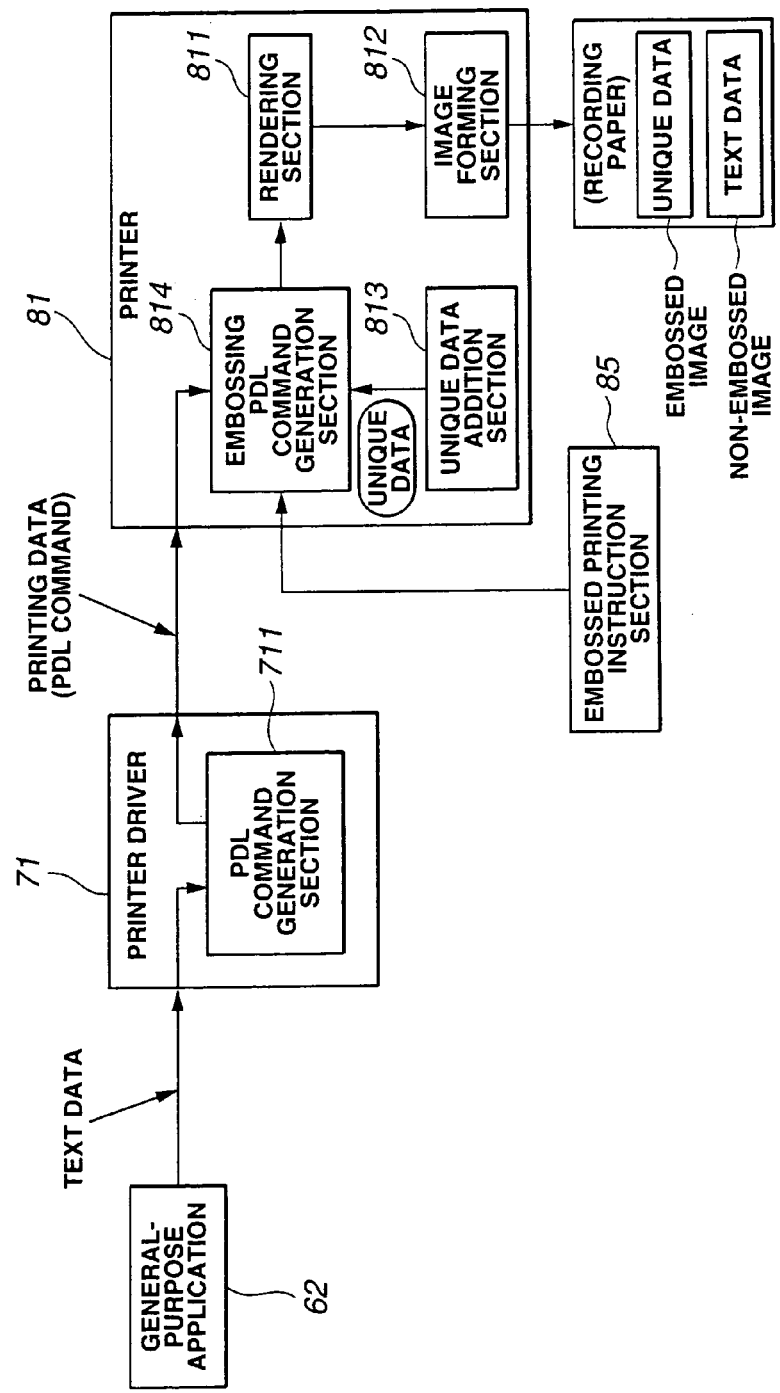
FIG. 34 is a conceptual diagram showing a structure of the system according to a second embodiment.

FIG. 34 is a conceptual diagram showing the structure of the system according to the second embodiment.

This system is same as that of the first embodiment on the point that it includes the printer driver and the printer.

But, in the system of the first embodiment, the printer driver 70 has the unique data adding function and the printer 80 has the embossment data processing function, while the system of the second embodiment is different from that of the first embodiment on the point that a printer driver 71 is configured to have an ordinary function, and a printer 81 has a unique data adding function and an embossment data processing function.

Specifically, the printer driver 71 of this system has a PDL command generating section 711 which generates ordinary print data (PDL command) according to the text data input from the general-purpose application 62.

Meanwhile, the printer 81 is provided with an embossed print instruction section 85 equivalent to the embossed print instruction section 67 of the unique data adding device 63 in FIG. 31, a unique data addition section 813 equivalent to the unique data addition section 631 of FIG. 31, and an embossing PDL command generating section 814 equivalent to the unique data embossing instruction processing section 632 of FIG. 31 as components realizing the unique data adding function.

The printer 81 is also provided with a rendering section 811 and an image forming section 812, which have the same functions as those of the rendering section 801 and the image forming section 802 in the first embodiment, as components realizing the embossment data processing function.

The embossed print instruction section 85 and the unique data addition section 813 provide the same functions as those of the embossed print instruction section 67 and the unique data addition section 631 in FIG. 31.

And, when print data (PDL command) of text data is input from the printer driver 71 and the embossed printing of the unique data is instructed from the embossed print instruction section 85, the embossing PDL command generating section 814 adds an embossing instruction PDL command, which instructs embossed drawing (printing as an embossed image) of the unique data to be added to the text data by the unique data addition section 813, to the input PDL command and sends to the rendering section 811.

Thus, the same embossing PDL command (comprising PDL command which instructs drawing of the text data and embossing instruction PDL command instructing the unique data to be added to the text data as an object subject to embossed drawing) as that of the first embodiment is input to the rendering section 811.

Then, a flow of the specific print processing operation by the system according to the second embodiment will be described with reference to FIG. 35.

Figure 35:
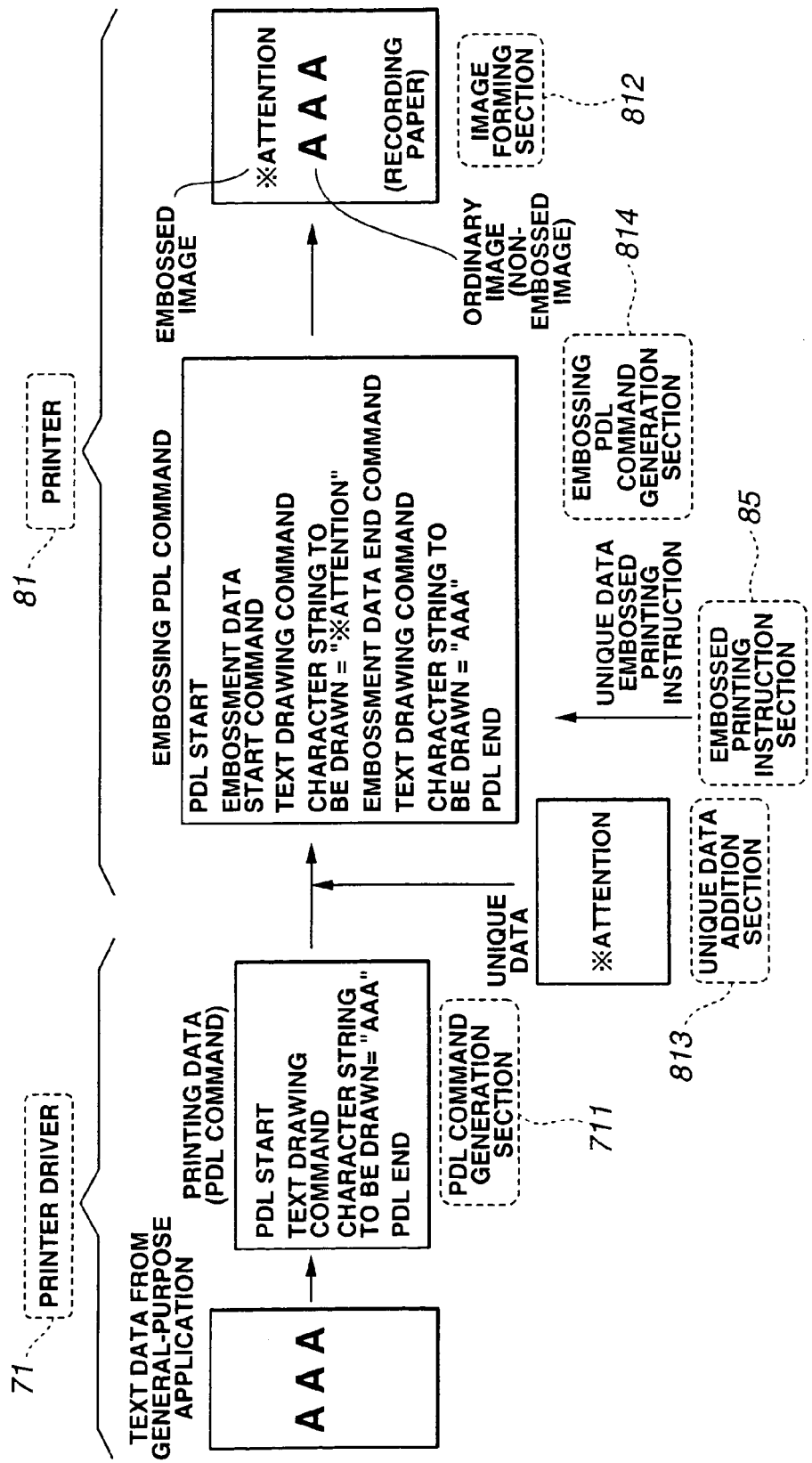
FIG. 35 is a diagram showing a flow of a print processing operation of the system according to the second embodiment.

In the printer driver 71 of FIG. 35, when the text data "AAA" is input from the general-purpose application 62, the PDL command generating section 711 generates a PDL command (print data) and sends the PDL command to the printer 81.

This PDL command is an ordinary command instructing ordinary drawing of the text data "AAA".

Meanwhile, when a PDL command for the text data "AAA" drawing is input from the printer driver 71 to the printer 81, a unique data addition section 813 processes to add unique data "✖ Attention".

At this time, when an instruction for embossed printing of the unique data is output from the embossed print instruction section 85, an embossing PDL command generating section 814 generates an embossing PDL command by adding an embossing instruction PDL command, which instructs embossed drawing (printing as an embossed image) of the unique data "✖ Attention" to be added by the unique data addition section 813, to the input PDL command according to the instruction and sends the embossing PDL command to the rendering section 811.

The embossing PDL command at this time has the same content as that generated by, for example, the printer driver 70 in FIG. 33.

Subsequently, the rendering section 811 and the image forming section 812 execute the same embossment data processing as in the first embodiment to conduct the embossed image printout processing according to the embossing PDL command.

Specifically, the rendering section 811 analyzes the input embossing PDL command, refers to the embossing instruction PDL commands (second to fifth lines) and the PDL commands (sixth and seventh lines) in the input commend to distinguish between the unique data "✖ Attention" and the text data "AAA" which are to be controlled, and executes bitmap development of them as embossed image data and non-embossed image data on the page memory.

Then, according to the bitmap data developed on the page memory by the rendering section 811, the image forming section 812 prints out the unique data "✖ Attention" corresponding to the embossed image data as an embossed image and the text data "AAA" corresponding to the non-embossed image data as a non-embossed image on the recording paper.

For example, the embossed printing according to the embossing PDL command by the printer 81 (the same is applied to the printer 80) can be achieved as described below.

Specifically, the rendering section 811 (801) executes bitmap development of the embossing PDL command being input from the embossing command generating section 814 (702) for every page on the page memory. At this time, the bitmap development is executed by, for example, associating gray scale data of four colors (Y, M, C, BK: depending on the structure of the image forming section) with the pixel corresponding to the data (text data in this case) under the drawing command by the PDL command and associating gray scale data(H) for the expandable toner with the pixel corresponding to data (unique data in this case) under the drawing command by the embossing PDL command in addition to the gray scale data of four colors.

And, gray scale data (Y, M, C, BK, H) of each pixel on the bitmap is sequentially sent to the image forming section every time the bitmap development for one page is completed.

The image forming section 812 (corresponding to the image forming section 802 according to the first embodiment) has exposure/developing section capable of forming four-color toner (ordinary toner: non-expandable toner) images of, for example, Y, M, C, BK and an exposure/developing section capable of forming an expandable toner (H) image, and also an intermediate transfer unit for multiple transfer (primary transfer) of the four-color toner images and the expandable toner image formed by the exposure/developing sections for the individual colors, a transfer section for transfer (secondary transfer) of the toner images multiple transferred by the intermediate transfer unit onto recording paper, and a fixing section for fixing the toner images which are transferred onto the recording paper by the transfer section.

The color material gray scale data of four colors Y, M, C, BK and expandable toner gray scale data (H) generated by the rendering section 811 (801) are sent to the pertinent exposure/developing sections of the image forming section 812 (802), and the individual color toner images and the expandable toner image are formed by the individual exposure/developing sections.

Then, the individual color toner images and the expandable toner image are transferred in the state sequentially overlaid onto the intermediate transfer unit and further transferred collectively from the intermediate transfer unit onto the recording paper.

Here, when the toner images multiple transferred onto the intermediate transfer unit are then transferred onto the recording paper, the order of the multi-transferred toner images is reversed, and the expandable toner image is transferred as the bottom layer.

Thus, when the toner images multi-transferred onto the recording paper are to be fixed by the fixing section, the bottom layer expandable toner is expanded by heat applied at that time to become embossed. And, the toner images of the individual colors multi-transferred onto the expandable toner, which is embossed by the expansion, are fixed as color images corresponding to the number of toner colors at that time.

As a result, the embossed color image having color image (color material) formed on the embossing expandable toner (embossing material) is formed on the recording paper.

The transfer and fixing process by the image forming section 812 of the printer 81 has been described above with reference to FIG. 8.

As the printout results by the printers 80, 31 (see FIG. 33 and FIG. 35) according to the first and second embodiments as described above, the unique data ":X: Attention" added to the text data "AAA" from the general-purpose application 62 during the processing is printed out as the embossed image through the process corresponding to the pixel A of FIG. 8A, while the text data "AAA" is normally printed as the non-embossed image through the process corresponding to the pixel B of FIG. 8A and printed out in a mode apparently different from the unique data ":X: Attention" formed of the embossed image.

Therefore, when the user knows that unique data is printed as an embossed image by the execution of the embossed printing instruction for the unique data from the embossed print instruction sections 77, 35 by the systems of the first and second embodiments, it is easily judged from the later printout that the ":X: Attention" printed as the embossed image at that time is the unique data added during the processing.

At that time, the embossed image ":X: Attention" and the non-embossed image "AAA" can be distinguished by appearance, but the distinction becomes more secure by making sure by the feel.

Figure 36:
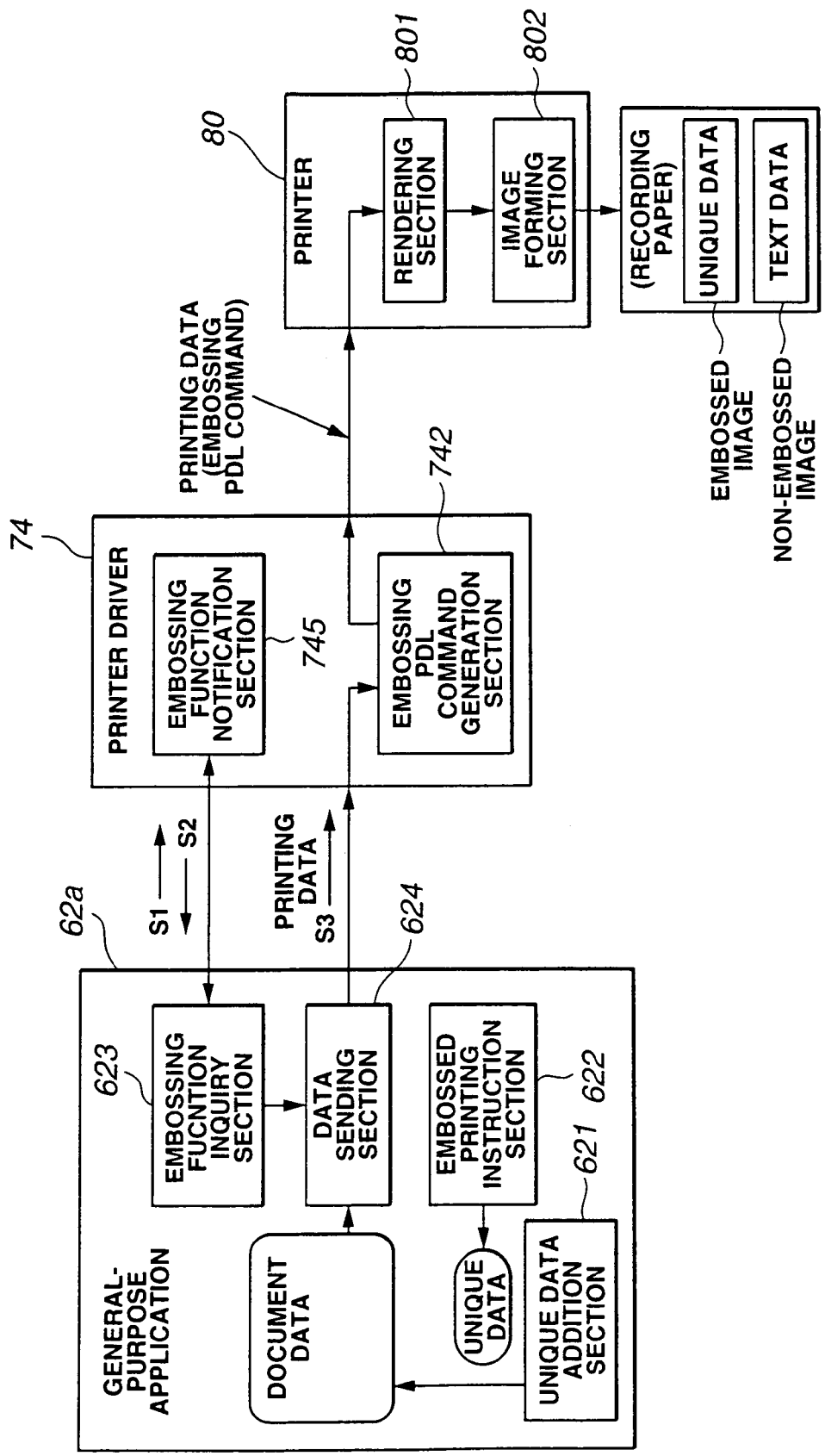
FIG. 36 is a conceptual diagram showing a structure of the system according to a third embodiment.

FIG. 36 is a conceptual diagram showing a structure of the system according to a third embodiment.

The system of this embodiment comprises a general-purpose application 62a which has an annotation function to add unique data such as a tag or a stamp to document data (text data) generated by its document production function, a printer driver 74 which receives data subject to printing (data having the unique data added to the text data) to be sent from the general-purpose application 62a and executes a printing instruction of the print data to a printer 80, and the printer 80 which prints according to the printing instruction from the printer driver 74.

The general-purpose application 62a has as a component element relevant to the annotation function a unique data addition section 621 which adds the unique data such as a tag or a stamp to the text data.

The general-purpose application 62a comprises an embossed print instruction section 622 which instructs embossed printing of the unique data added to the text data, an embossing function inquiry section 623 which inquires of the printer driver 74 whether there is the embossed print processing function and obtains information (hereinafter referred to as embossment identifying information) which enables to distinguish embossed print data in the embossed print processing function of the printer driver 74, particularly in the data subject to printing being sent from the printer driver 74, and a data sending section 624 which generates data for causing embossed printing of the unique data when it is instructed to execute embossed printing of the unique data added to the text data, generates data subject to printing having that data added to the text data and sends it to the printer driver 74.

The printer driver 74 comprises an embossing function notification section 745 which notifies, in response to the inquiry from the embossing function inquiry section 623, the embossed print processing function thereof, and particularly the above-described embossing function notification section 745 notifying embossment identifying information, and an embossing PDL command generating section 742 which analyzes the data subject to printing being sent from the general-purpose application 62a to discriminate embossed print data and generates an embossing PDL command containing an embossed drawing command (embossing PDL) needed for embossed printing of the embossed print data.

FIG. 37 is a diagram showing a structure of an embossed print setting screen (hereinafter referred to as the UI screen) 42 corresponding to the embossed print instruction section 622 of the general-purpose application 62a.

For example, the UI screen 42 can be shown on the display section of a PC (personal computer) by a prescribed operation through the input/operation section of the PC with the general-purpose application 62a installed and is provided with individual embossed print designation fields of embossed print designation, embossment target designation, variation designation, overlap designation, and attribute value-to-height allocation designation.

In the embossed print designation fields on the UI screen 42, a printing mode about whether document information subject to printing is embossed-printed or pseudo embossed-printed, or the like, can be designated.

Specifically, it is possible to designate whether the embossed printing is executed or not by checking the "embossed printing" check box (hereinafter abbreviated as CB) of the same field.

Here, when the execution of the embossed printing is designated, a "print embossed image last" or "print embossed image first" option button (hereinafter abbreviated as OB) can be further used to designate whether the embossed image is printed last (printing mode by which the expandable toner becomes the bottom layer after the printout) or first (printing mode by which the expandable toner becomes the top layer after the printout).

When the "pseudo embossed-print" CB is checked in this field, a mode (test printing mode) to execute the pseudo embossed printing without using the expandable toner can be set.

And, the object subject to embossed printing can be designated in the embossment target designation field on the UI screen 42.

As the objects which can be designated, there are drawing objects such as text, graphics and image. Such a drawing object is designated by checking the pertinent drawing object CB ("graphic" CB, "image" CB or the like).

As an item capable of more finely designating in this field, particular characters such as ":X:", "☆" in the text configuring the document information subject to printing can be designated. This designation is made by checking the "specific symbol" CB and inputting a desired special character in the accompanying combo box (hereinafter abbreviated as CMB).

And, a particular font, for example, "Arial" or the like in the text can be designated. This designation is made by checking the "font" CB and selecting a desired font from the accompanying CMB.

Similarly, a special font in the text can be designated. When there is a virtual font, for example, an embossment font, as such a special font, that virtual font is assumed.

A particular modification command such as bold, italics or the like in the text can be designated. This designation is made by checking the "font modification" CB and selecting a desired font modification from the accompanying CMB.

And, when the "graphic" CB is checked in this field to designate a graphic as the object subject to embossed printing, all the graphic objects in the document information subject to the printing at the time can be embossed-printed.

When the graphic is designated, the accompanying CMB of the "graphic" CB can be used to designate (select) a particular shape, for example, a rectangle, a circle or a triangle.

In this field, a particular color of the drawing object (both text and graphics) can be designated. This designation is made by checking the "color" CB and selecting a desired color from the accompanying CMB.

In this field, unique data such as a tag or a stamp to be added to the text data generated by the general-purpose application 62a can be designated as the object subject to embossed printing. For example, the "other" CB in the same field is checked and a type of the unique data such as a tag or a stamp to be added this time is selected from the CMB menu opened after the checking is made.

In the variation designation field on the UI screen 42, the embossed output specifications of the embossed image can be selectively designated from numerous variations (height, relief shape, color addition, data enlargement/reduction, embossed appearance enhancement, embossed surface pattern, etc.).

In the overlap designation field on the UI screen 42, when there is an area where the objects subject to embossed printing overlap, it is allowed to designate that the overlapped area has its height increased by n times (n=the number of overlaps) (reflection of overlap), the area of the overlapped objects subject to expansion printing does not have its height increased by n times (disregard of overlap), or the area of the overlapped objects subject to expansion printing is not expanded (overlap is not embossed-printed), or it is decided by a logic operation whether the area of the overlapped objects subject to expansion printing is expanded (logic operation on overlap).

And, in the attribute value-to-height allocation designation field on the UI screen 42, a parameter to be used for the height conversion of the expandable toner can be designated in order to execute the embossed printing by extracting the attribute value of various parameters (brightness, chroma, hue, density, etc.) from the document information to be printed and converting (assigning) the attribute value into the height of the expandable toner.

In the system of this embodiment, the general-purpose application 62a can use the UI screen 42 to instruct the embossed printing of the unique data to be added when the unique data is added to the text data generated by the application per se.

For example, when the unique data such as a tag or a stamp is added and subjected to the embossed printing, the "other" CB of the embossment target designation field on the UI screen 42 is checked, a type of the unique data such as a tag or a stamp to be added this time is selected from the CMB menu opened after the check is made, and the "embossed printing" CB in the embossed print designation field may be checked.

By operating on the UI screen 42 as described above, the embossed printing of the unique data is designated, then a data transmission start operation is made, and the general-purpose application 62a prepares to send the data subject to printing.

As a processing to prepare for the transmission, the general-purpose application 62a makes an inquiry from the embossing function inquiry section 623 to the printer driver 74 if it has an embossed print processing function (Step S1 in FIG. 36).

Here, an example of the inquiry about the embossed print processing function by the general-purpose application 62a before the data subject to printing is sent to the printer driver 74 was described. But, it is not limitative and, for example, when the general-purpose application is started, an inquiry about the embossed print processing function may be made to the printer driver 74.

In response to the inquiry about the embossed print processing function by the embossing function inquiry section 623, the embossing function notification section 745 responds on the side of the printer driver 74 being inquired, and when the printer driver has the embossed print processing function, the printer driver notifies a character string or a command (private escape command: hereinafter referred to as the ESC) which enables to identify that the embossed print data is different from ordinary print data to the embossing function inquiry section 623 (step S2 in FIG. 36).

Thus, the embossing function inquiry section 623 is provided with embossment identifying information (the character string, ESC, etc.) to be used for recognizing embossed print data as distinguished from the ordinary print data by the embossed print processing function of the printer driver 74.

Subsequently, the data sending section 624 of the general-purpose application 62a uses the embossment identifying information obtained from the printer driver 74 to add data (data for embossed printing), which describes the embossed printing of the unique data being instructed to be embossed-printed from the UI screen 42, to the test data, and sends it as data subject to printing to the printer driver 74 (step S3 in FIG. 36).

As a first method of sending the data subject to printing from the data sending section 624, for example, the document data (text data) subjected to ordinary printing and the data subjected to the embossed printing are sent in an independent form.

As a second method, data describing the execution of embossed printing is embedded in the text data subject to ordinary printing and sent.

FIG. 38A shows an example of a mode for sending the data subject to printing according to the first method, and FIG. 38B shows an example of a mode for sending the data subject to printing according to the second method.

According to the first method as shown in FIG. 38A, for example, test data "AAA" and data (ESC obtained as embossment identifying information is used to describe that "※ Attention" is embossed-printed) causing the embossed printing of unique data "※ Attention" added to the text data "AAA" are independently formed and sent to the printer driver 74.

According to the second method as shown in FIG. 38B, for example, data (character string such as bbb or ddd obtained as embossment identifying information is used to described that "※ Attention" is embossed-printed) causing the embossed printing of unique data "※ Attention" to be added to the text data "AAA" is embedded in the text data "AAA" and sent to the printer driver 74.

Meanwhile, the printer driver 74 receives the data subject to printing being sent from the general-purpose application 62a and takes it into the embossing PDL command generating section 742.

The embossing PDL command generating section 742 analyzes the received data subject to printing and distinguishes for identification between document data subject to ordinary printing and data subject to embossed printing with the embossment identifying information corresponding to the embossed print processing function of the printer driver 74 used as a key.

And, for the document data for causing the ordinary printing, PDL for the ordinary printing (non-embossed printing) is generated, data describing the execution of the embossed printing by ESC or the like is recognized as embossed print data, and embossing PDL for executing embossed printing is generated.

An embossing PDL command having a mixture of PDL and embossing PDL generated by the embossing PDL command generating section 742 is then sent to the printer 80.

The printer 80 receives the embossing PDL command being sent from the printer driver 74 and gives it to the rendering section 801.

The rendering section 801 processes to execute bitmap development of the text data and the unique data which are under control by the PDL and the embossing PDL in the embossing PDL command received from the printer driver 74 as non-embossed image data and embossed image data, respectively.

The image forming section 802 prints out an image having a non-embossed image corresponding to the non-embossed image data and an embossed image corresponding to the embossed image data mixed onto recording paper according to the bitmap data developed on the bitmap memory by the rendering section 801.

Then, a flow of a specific print processing operation by the system according to a third embodiment will be described with reference to FIG. 39.

In the general-purpose application 62a of FIG. 39, for example, unique data (text data "※ Attention") is added by the unique data addition section 621 to the text data (text data "AAA") generated by the document production function, and an instruction to embossed print the unique data is input from the embossed print instruction section 122 (the UI screen 42: see FIG. 37) to start a processing of generating data subject to printing by the data sending section 624.

In this case, the data sending section 624 generates text data "AAA" and data (described by ESC) causing the embossed printing of unique data "※ Attention" added to the text data "AAA" in an independent form according to the above-described first method and sends as data subject to printing to the printer driver 74 as shown in FIG. 39.

When the printer driver 74 receives the data subject to printing from the general-purpose application 62a, the embossing PDL command generating section 742 analyzes the data subject to printing and, when it is ordinary document data "AAA", generates PDL for ordinary printing, and when it is data described by ESC, recognizes it as embossed print data and generates embossing PDL for embossed printing of the data, and generates an embossing PDL command containing the PDL and the embossing PDL.

Specifically, the embossing PDL command generating section 742 of this case generates the embossing PDL command having the following contents as shown in FIG. 39:

"1 (numeral indicates the number of lines, and the same is applied below): PDL start/2: embossment data start command/3: text drawing command/4: character string to be drawn="※ Attention"/5: embossment data end command/6: text drawing command/7: character string to be drawn="AAA"/8: PDL end".

In this embossing PDL command, the sixth and seventh lines are commands instructing to normally draw the text data "AAA" being input from the general-purpose application 62, and the second to fifth lines are commands instructing to embossed printing the unique data "※ Attention" to be added to the text data "AAA" by the annotation function of the general-purpose application 62a.

In this case, the embossing PDL command generated by the embossing PDL command generating section 742 has substantially the same contents as those of the command generated by the printer driver 70 (see FIG. 33) according to the first embodiment.

Thus, the embossing PDL command generated by embossing PDL command generating section 742 in this embodiment is then sent to the printer 80 and printed through the processing described in the first embodiment.

Specifically, in the rendering section 801, the text data "AAA" is subjected to bitmap development as non-embossed image data, and the unique data "※ Attention" is subjected to bitmap development as embossed image data, then in the image forming section 802, a mixed image, which has the text data "AAA" as the non-embossed image and the unique data as the embossed image, is printed out on recording paper according to the bitmap data.

Figure 40:
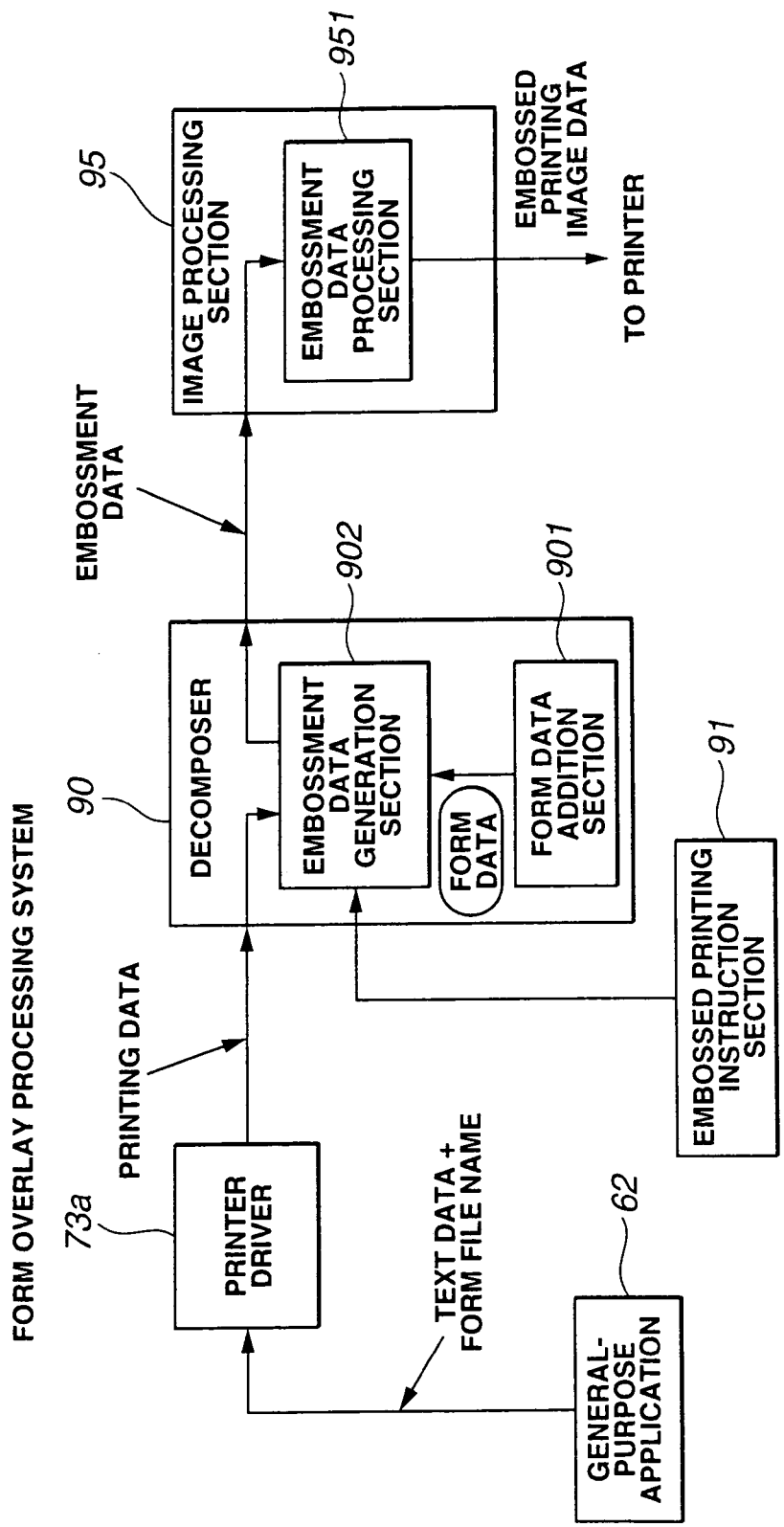
FIG. 40 is a conceptual diagram showing a structure of the system according to a fourth embodiment.

FIG. 40 is a conceptual diagram showing a structure of the system according to a fourth embodiment.

The system according to this embodiment is an example of application to a form overlay processing system which executes print processing with form data such as a table, ruled lines or the like added to the text data input from the general-purpose application 62 during the processing.

As shown in FIG. 40, this system comprises a printer driver 73a which generates and sends print data (e.g., a PDL command) according to the text data being input from the general-purpose application 62, a decomposer 90 which previously stores form data, and when print data for drawing the print data is input from the printer driver 73a, reads form data corresponding to a form file name (added by the general-purpose application 62 when the text data is sent) contained in the print data from a storage section (not shown) and adds it to the print data (text data) and sends out and an image processing section 95 which processes to give data (embossment data: text data+form data (form embossed print data)) being sent from the decomposer 90 to a printer (not shown).

In this system, the decomposer 90 comprises an embossed print instruction section 91 corresponding to the embossed print instruction section 67 of the unique data adding device 63 of FIG. 31, a form data addition section 901 corresponding to the unique data addition section 631 of FIG. 31, and an embossment data generation section 902 corresponding to the unique data embossing instruction processing section 632 of FIG. 31.

The embossed print instruction section 91 has the same function as that of the embossed print instruction section 67 of FIG. 31, and the form data addition section 901 has the same function as that of the unique data addition section 631 of FIG. 31 except that the data (unique data) being processed is form data.

The embossment data generation section 902 generates embossment data (data for embossed printing) comprising print data (PDL command) for the text data drawing being input from the printer driver 73a and form embossed print data enabling to execute the embossed printing of the form data being added to the text data by the form data addition section 901 and sends it to the image processing section 95.

The image processing section 95 is provided with an embossment data processing section 951 (equivalent to the embossment data processing section 651 of FIG. 31) for image processing to receive the embossment data sent from the decomposer 90 and to print as an embossed image the form embossed print data contained in it according to the embossment data.

Then, a flow of a specific print processing operation by the system according to the fourth embodiment will be described with reference to FIG. 41.

It is assumed in this print processing operation that to print text data "AAA, BBB" using prescribed form data (image data corresponding to the double-column rectangular frame in this case), data (document data) having the form file name of the form data added to the text data "AAA, BBB" is input from the general-purpose application 62 to the printer driver 73a.

In this case, the printer driver 73a generates print data (PDL command), which has a command (PDL) instructing to draw text data "AAA, BBB" and a command (PDL) instructing to draw form data to be added to the text data mixed, according to document data (text data "AAA, BBB"+form data file name) being input from the general-purpose application 62 and sends it to the decomposer 90.

In the PDL command (see FIG. 41) generated by the printer driver 73a, the first line indicates the start of PDL, and the last line indicates the end of PDL.

And, the third to sixth lines are PDL instructing to draw the text data.

The second line "form overlay start command" and the seventh line "form overlay end command" are PDL instructing to draw the form data, and a form file name corresponding to the form data for printing the text data "AAA, BBB" is added as a parameter to the former.

Meanwhile, when the decomposer 90 receives the PDL command being sent from the printer driver 73a, the form data addition section 901 reads from the storage section the form data corresponding to the form file name written in the second line of the received PDL and adds it to the text data.

At this time, when embossed printing of unique data (form data in this case) is instructed from the embossed print instruction section 91, embossment data generation processing is started by the embossment data generation section 902 according to the instruction.

Figure 41:
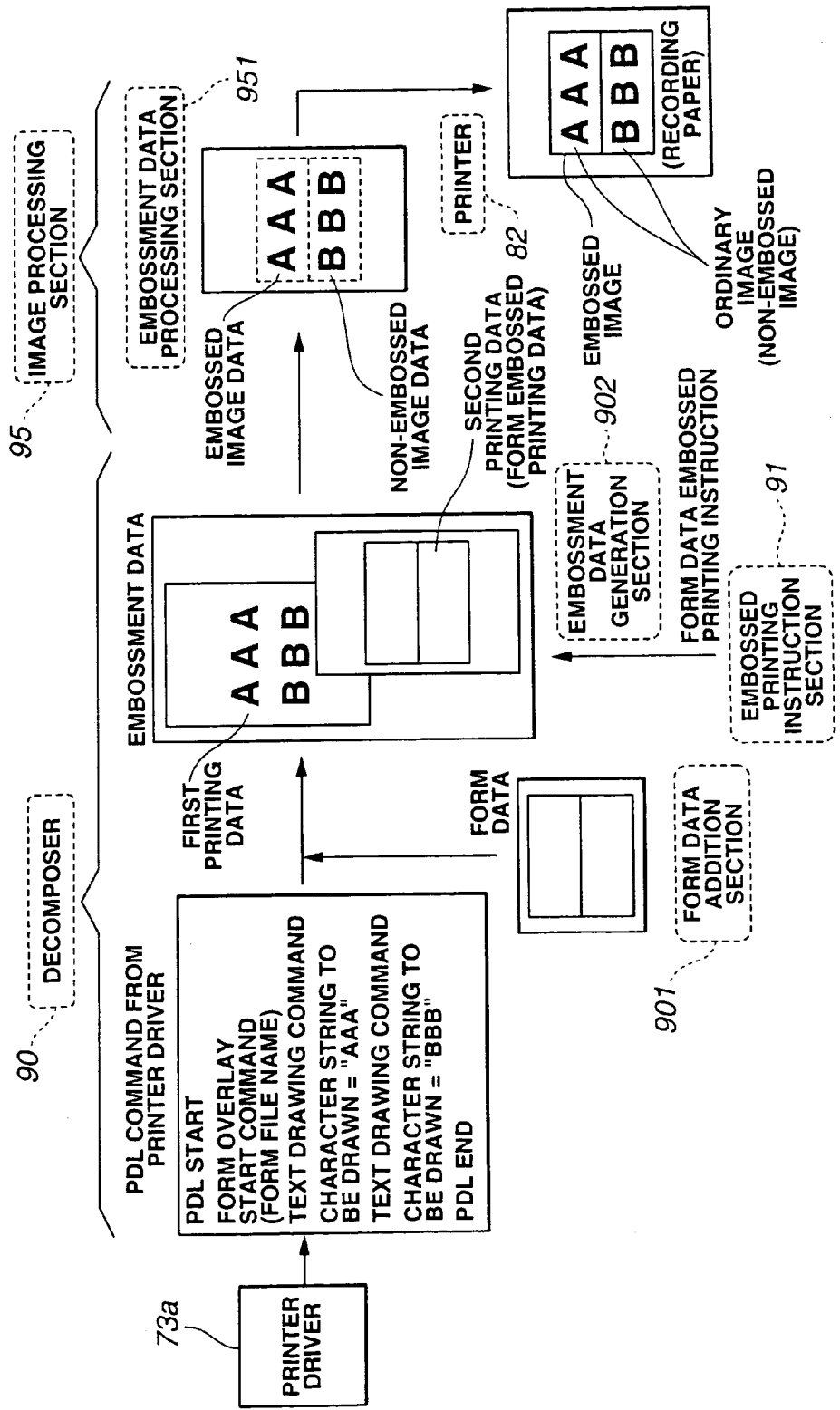
FIG. 41 is a diagram showing a flow of a print processing operation of the system according to the fourth embodiment.

In this case, as shown in FIG. 41, the embossment data generation section 902 analyzes the PDL command received from the printer driver 73a to generate print data (first print data) for drawing text data "AAA, BBB" and also processes the form data, which is added by the form data addition section 901, according to the embossed printing instruction from the embossed print instruction section.91 to generate form embossed print data (second print data) enabling to execute the embossed printing of the form data, combines the first and second print data to generate embossment data and sends it to the image processing section 951.

The embossment data generated by the embossment data generation section 902 is sent to the image processing section 95 and input to the embossment data processing section 951.

The embossment data processing section 951 generates embossed print image data, which has non-embossed image data corresponding to the first print data and embossed image data corresponding to the second print data mixed, from the input embossment data.

In the generated embossed print image data, the non-embossed image data is generated from the first print data and used for ordinary printing of the text data "AAA, BBB".

Meanwhile, the embossed image data is data generated from the second print data (form embossed print data) and enables to execute embossed printing of the form data (rectangular frame) to be added to the text data "AAA, BBB".

Therefore, the embossed print image data comprising the non-embossed image data and the embossed image data is sent to the printer 82 having a printing function corresponding to the image processing function (embossment data processing section 951) of the image processing section 95, and the printer 82 prints the text data "AAA, BBB" as a non-embossed image and, at the same time, prints the form data, which is a rectangular frame surrounding the text data, as an embossed image.

Thus, according to the fourth embodiment, the decomposer 90 is provided with the embossed print instruction section 91, and embossed printing of the unique data (form data) is instructed from the embossed print instruction section 91, so that the unique data (form data) which is added to the text data to be input from the general-purpose application 62 via the printer driver 73a during the processing (decomposer 90) can be printed out as an embossed image which can be distinguished in appearance from the output image (non-embossed image) of the text data.

Figure 42:
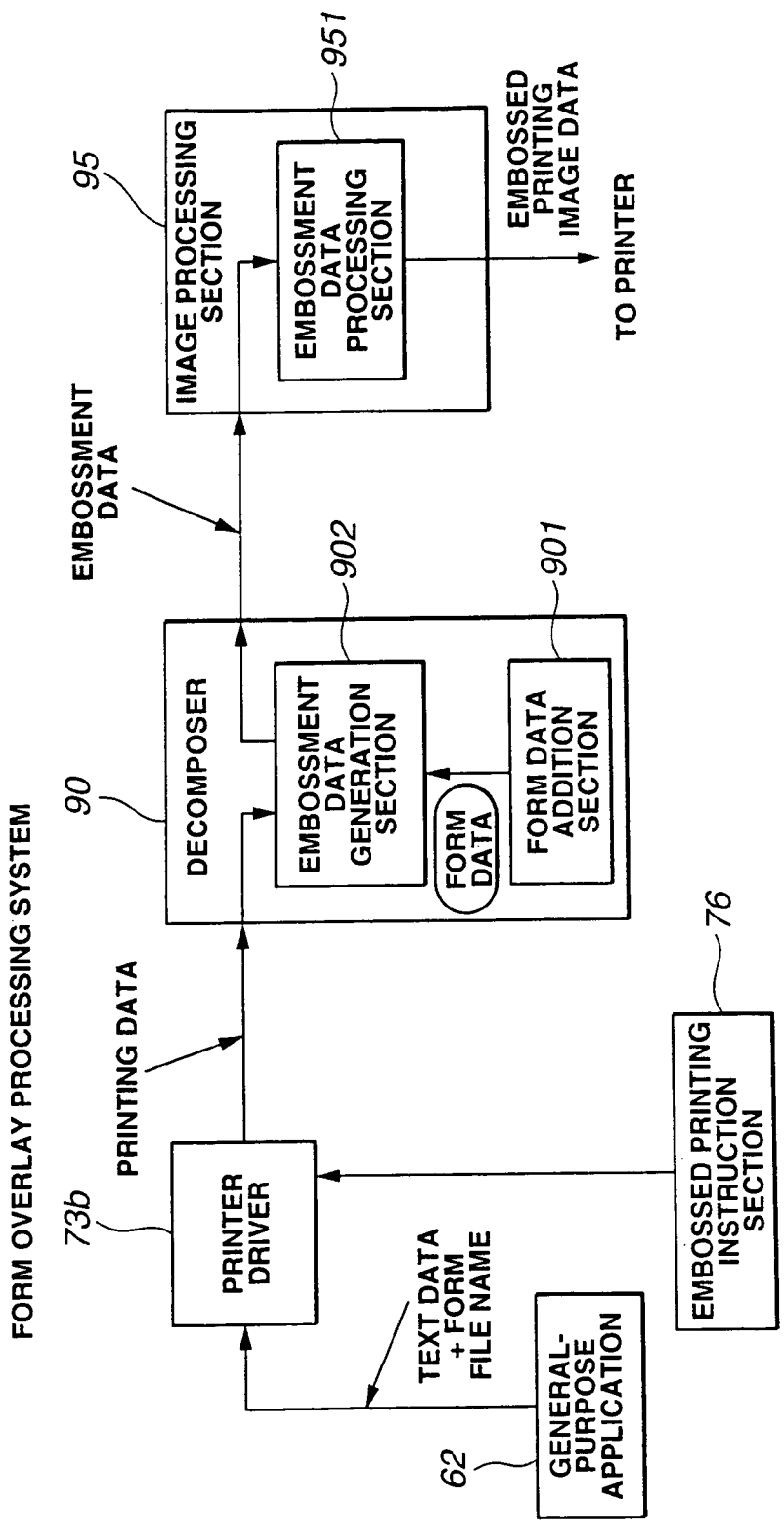
FIG. 42 is a conceptual diagram showing a structure of the system according to a fifth embodiment.

FIG. 42 is a conceptual diagram showing s structure of the system according to a fifth embodiment.

The system of this embodiment is also an example of applying to a form overlay processing system as in the case of the fourth embodiment (see FIG. 40), and same numerals are used to denote parts having the same functions as those of the system according to the fourth embodiment.

Differences in structure between the system of this embodiment and the system of the fourth embodiment are that the system of the fourth embodiment has the decomposer 90 provided with the embossed print instruction section 91, while the system of this embodiment has the printer driver 73b provided with the embossed print instruction section 76 (having the same function as the embossed print instruction section 91 of the fourth embodiment).

Then, a flow of a specific print processing operation of the system of the fifth embodiment will be described with reference to FIG. 43.

Here, it is assumed that to print text data "AAA, BBB" using prescribed form data (image data corresponding to the rectangular frame in this case), data (document data) having the file name of the form data added to the text data "AAA, BBB" is input from the general-purpose application 62 to the printer driver 73b.

In this case, the printer driver 73b generates print data (PDL command), which has a command (PDL) instructing to draw the text data "AAA, BBB" and a command (PDL) instructing to draw the form data to be added to the text data mixed, according to document data (text data "AAA, BBB"+ form data fine name) being input from the general-purpose application 62.

At that time, when embossed printing of unique data (form data in this case) is being instructed from the embossed print instruction section 76, the printer driver 73b further adds a command (PDL) to instruct embossed printing (drawing as an embossed image) of the form data to be added to the text data, generates print data (PDL command) which has a mixture of PDL instructing to draw the text data, PDL instructing to draw the form data to be added to the text data and PDL instructing to execute embossed printing of the form data, and sends it to the decomposer 90.

In the PDL commands (see FIG. 43) generated by the printer driver 73b, the first line indicates the start of PDL, and the last line indicates the end of PDL.

The sixth to ninth lines are PDL indicating the execution of drawing the text data.

The second line "form overlay start command" and the eleventh line "form overlay end command" are PDLs instructing to draw the form data, and a form file name corresponding to the form data for printing the text data "AAA, BBB" is added as a parameter to the former.

The third line "embossment data start command", the fourth line "form drawing command", the fifth line "drawing form=rectangular frame" and the tenth line "embossment data end command" are PDLs instructing the execution of embossed printing of the form data.

Among the PDLs instructing the embossed printing of the form data, the fourth line "form drawing command" and the fifth line "drawing form=rectangle command" instruct the use of double-column rectangular frame data as form data for embossed printing.

Meanwhile, when the decomposer 90 receives the PDL command being sent from the printer driver 73b, the form data addition section 901 reads, from the storage section, form data corresponding to the form file name written in the second line of the received PDL and adds it to the text data.

At that time, when the received PDL is analyzed and there is a command instructing the embossed printing (the third to fifth lines and the tenth line have a command group instructing the embossed printing in this case), embossment data generation processing by the embossment data generation section 902 is started according to the command.

Figure 43:
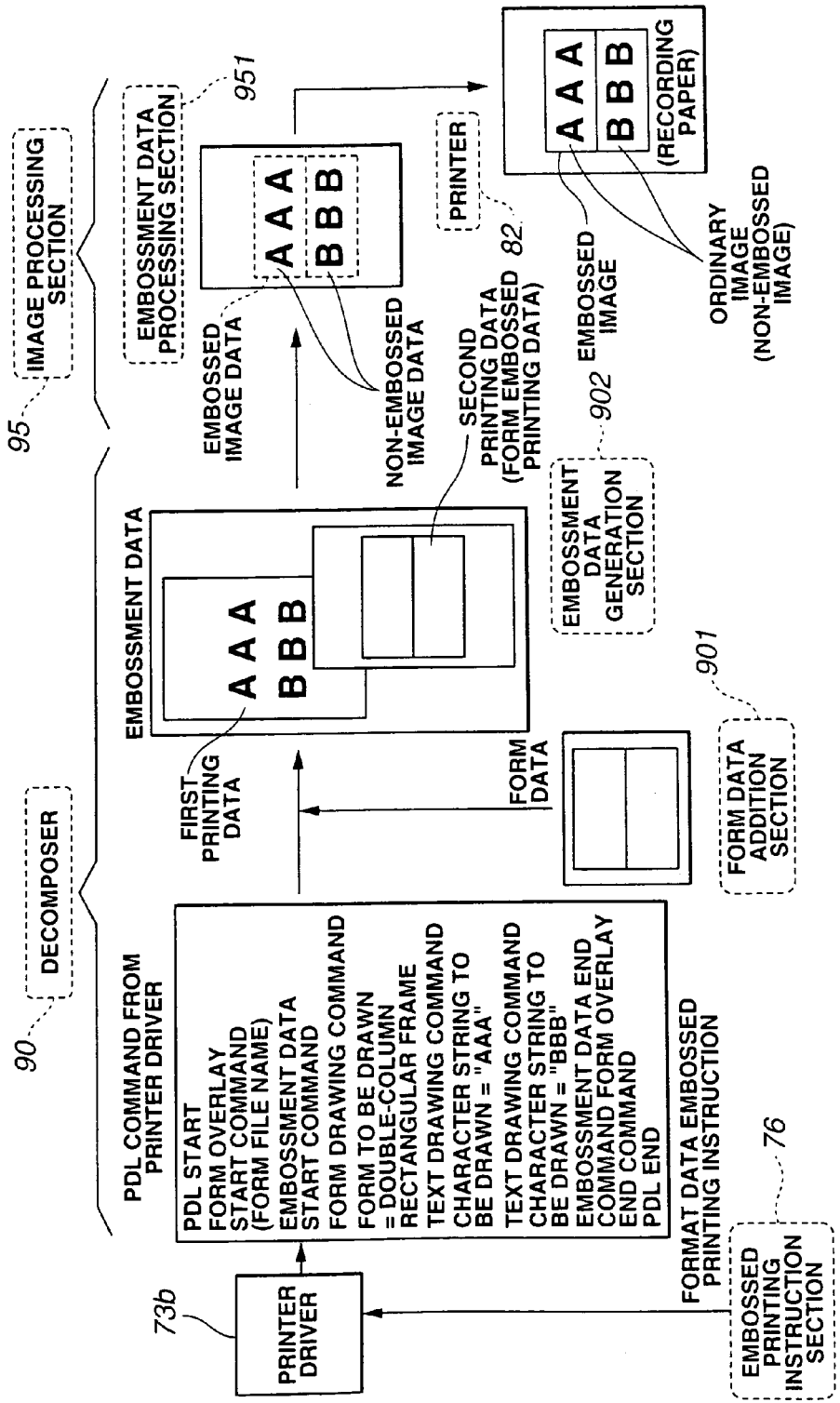
FIG. 43 is a diagram showing a flow of a print processing operation of the system according to the fifth embodiment.
Figure 44:
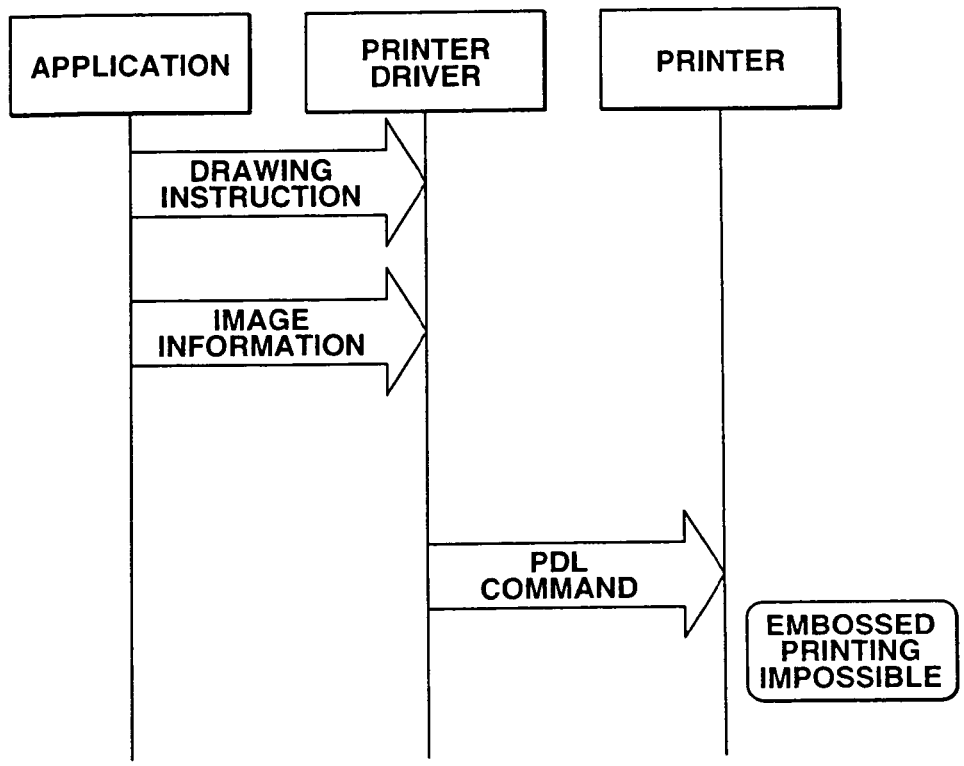
FIG. 44 is a conceptual diagram showing a flow of information at the time of print processing by a conventional system.
Figure 45:
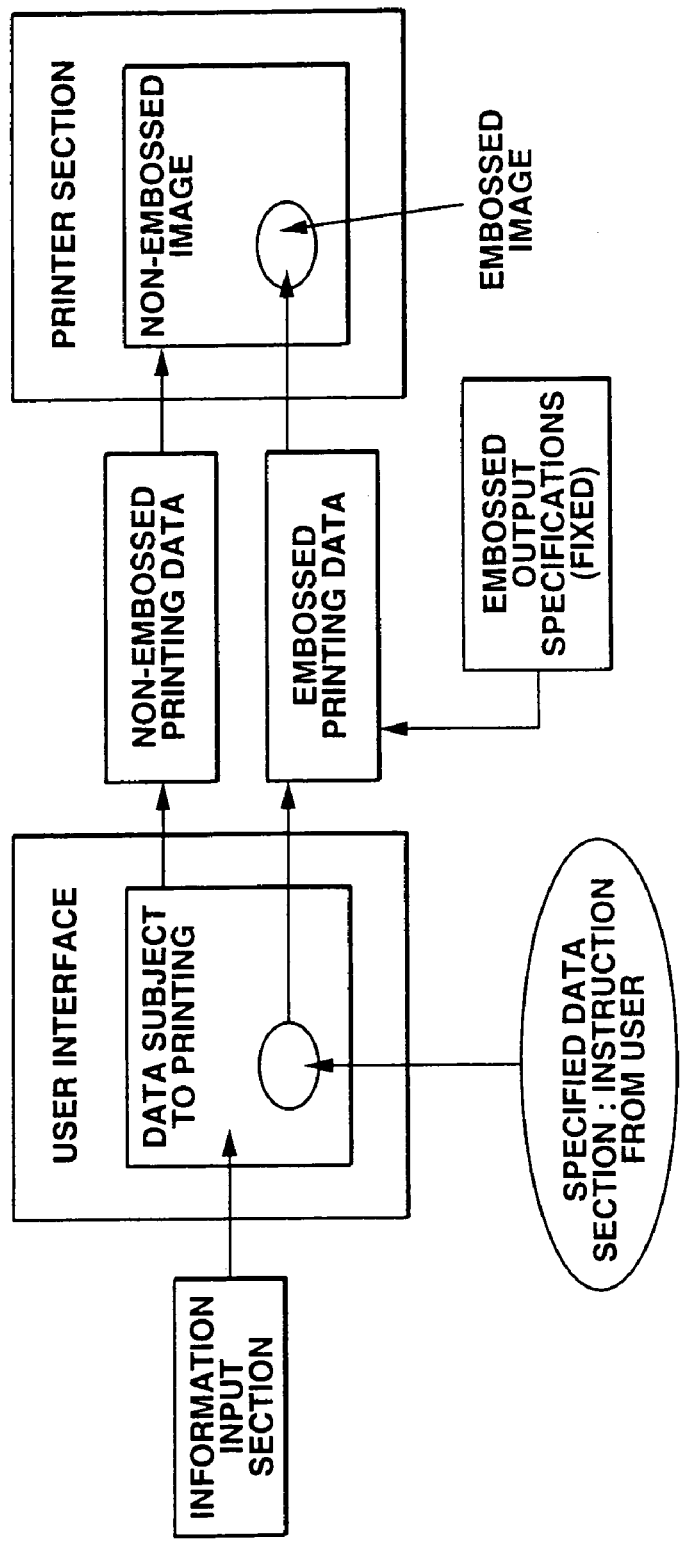
FIG. 45 is a conceptual diagram showing a structure of a conventional print processing system.
Figure 46:
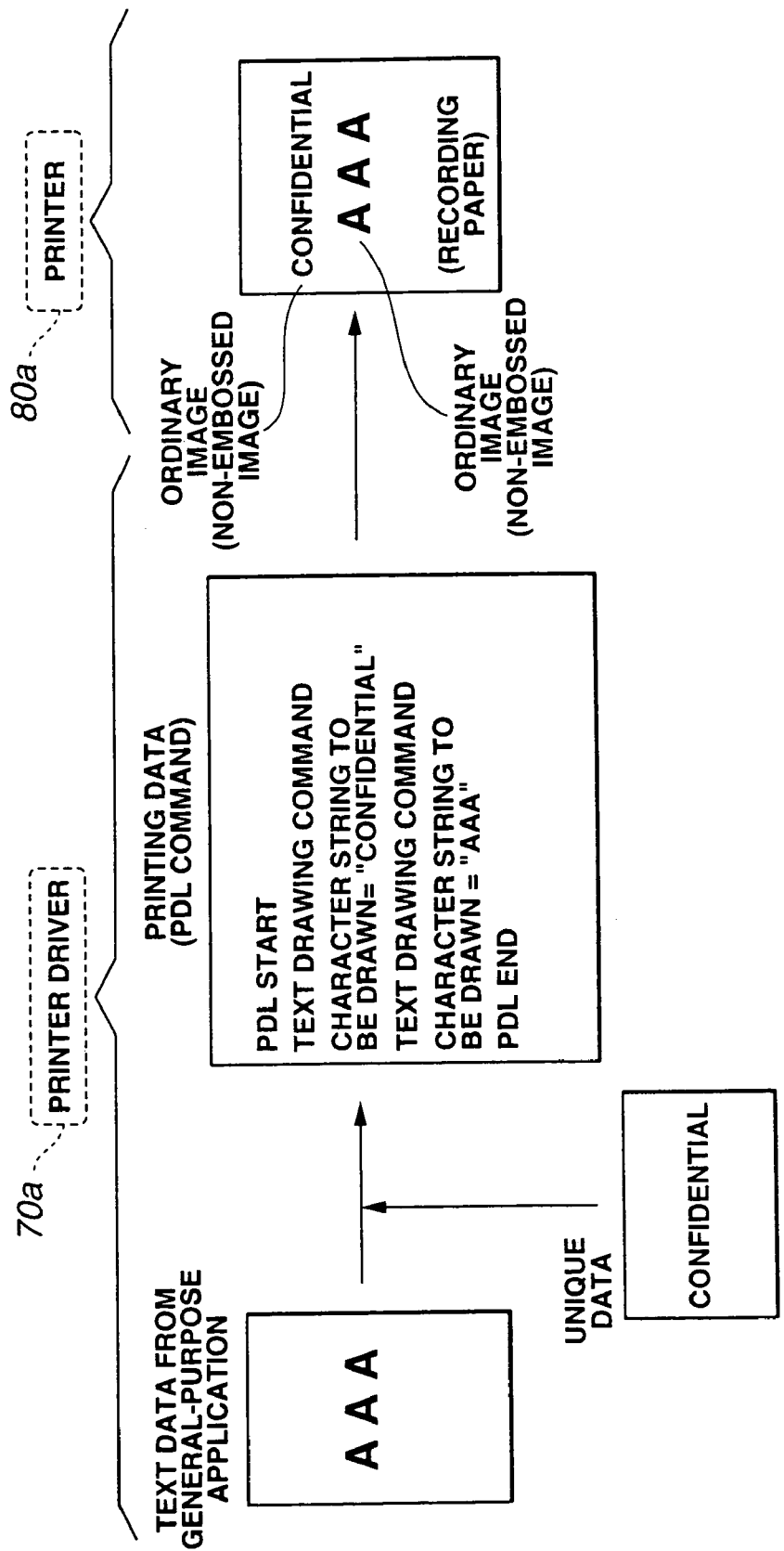
FIG. 46 is a conceptual diagram showing a flow of a print processing of a conventional system.

In this case, as shown in FIG. 43, the embossment data generation section 902 analyzes the PDL command received from the printer driver 73a to generate print data (the first print data) for drawing the text data "AAA, BBB", processes the form data added by the form data addition section 901 according to the commands (the command group of the third to fifth lines and the tenth line) instructing the embossed printing to generate form embossed print data (the second print data) which enables the embossed printing of the form data (double-column rectangular frame data), combines the first and second print data to generate embossment data, and then sends it to the image processing section 951.

The embossment data generated by the embossment data generation section 902 is sent to the image processing section 95 and input to the embossment data processing section 951.

The embossment data processing section 951 generates embossed print image data, which has a mixture of non-embossed image data corresponding to the first print data and embossed image data corresponding to the second print data, from the input embossment data.

In the generated embossed print image data, the non-embossed image data is data generated from the first print data and used to execute the ordinary printing of the test data "AAA, BBB".

Meanwhile, the embossed image data is data generated from the second print data (form embossed print data) and enables the embossed printing of form data (rectangular frame) to be added to the text data "AAA, BBB".

Therefore, the embossed print image data comprising the non-embossed image data and the embossed image data is sent to the printer 82 having a printing function corresponding to the image processing function (embossment data processing section 951) of the image processing section 95, the printer 82 prints the text data "AAA, BBB" as a non-embossed image, and at the same time, prints out the form data which is a rectangular frame surrounding the text data as an embossed image.

Thus, according to the fifth embodiment, the printer driver 73b is provided with the embossed print instruction section 76, and the execution of embossed printing of the unique data (form data) is instructed from the embossed print instruction section 25. Thus, the unique data (form data) added to the text data to be input from the general-purpose application 62 via the printer driver 73b during the processing (decomposer 90) can be printed out as an embossed image which can be distinguished in appearance from the output image (non-embossed image) of the text data.

The present invention is not limited to the above description and the embodiments shown in the drawings but can be modified appropriately without departing from the scope of the subject matter.

For example, in the embodiments described above, the embossed print instruction sections (67, 77, 35, 45, 91) are disposed (achieved by the input/operation section or the display section disposed for each device) as the components of the corresponding unique data adding devices (63, 20, 81, 40, 90) but they are not limited to such a configuration. For example, it may be achieved by a user interface unit by incorporating a Web server into such devices (63, 20, 81, 40, 90), inputting the above-described embossed printing instruction through the setting screen on the Web browser of an external terminal, and taking the input embossed printing instruction via the Web server.

What is claimed is:

1. A printing instruction device which generates a print job of document information as an object to be printed and sends it to a printer device, comprising:

an embossed printing instruction unit that instructs embossed print setting including an object to be embossed-printed;

an extraction unit that analyzes the document information to be printed and extracts the object instructed by the embossed printing instruction unit;

an embossed print drawing command generation unit that generates, in accordance with the extracted object, an embossed print drawing command needed for embossed printing of the object;

a print job generation unit that generates the print job by adding the embossed print drawing command to a non-embossed print drawing command needed for non-embossed printing of the document information to be printed; and a priority setting unit that determines whether priority is given to the instruction from the printing instruction device or the printer device for the embossed print setting instruction, wherein:

the embossed print setting instruction by the embossed printing instruction unit is accepted when the priority setting unit determines to give priority to the instruction from the printing instruction device.

2. The printing instruction device according to claim 1, wherein the embossed printing instruction unit has a function to instruct as an object to be embossed-printed at least one of text, graphics, image, color, specific symbol in text, font and font modification.

3. A printing instruction device which generates a print job of document information as an object to be printed and sends it to a printer device, comprising:
- a pseudo embossed printing instruction unit that instructs pseudo embossed print setting including an object to be pseudo embossed-printed;
- an extraction unit that analyzes the document information to be printed and extracts the object instructed by the pseudo embossed printing instruction device;
- a pseudo embossed drawing data generation unit that generates pseudo embossed drawing data for expressing the object as a pseudo embossed image from original data of the object extracted by the extraction unit;
- a print job generation unit that generates a print job including the pseudo embossed drawing data;
- a collection unit that collects information about a printing function from the printer device; and
- a recognition unit that recognizes, according to the information collected by the collection unit, whether the printer device is capable of embossed printing or not, wherein:
- when it is recognized by the recognition unit that the printer device is incapable of embossed printing, the pseudo embossed printing instruction device instructs pseudo embossed printing of the embossed print drawing command.

4. A printing instruction device which generates a print job of document information as an object to be printed and sends it to a printer device, comprising:
- an embossed printing instruction unit that instructs embossed print setting including an object to be embossed-printed;
- an extraction unit that analyzes the document information to be printed and extracts the object instructed by the embossed printing instruction unit;
- an embossed print drawing command generation unit that generates, in accordance with the extracted object, an embossed print drawing command needed for embossed printing of the object;
- a pseudo embossed printing instruction unit that instructs pseudo embossed printing of the embossed print drawing command;
- a pseudo embossed drawing data generation unit that generates pseudo embossed drawing data, when a pseudo embossed printing instruction is given by the pseudo embossed printing instruction unit, to express the object as a pseudo embossed image from the original data of the extracted object;
- a print job generation unit that generates a print job including the pseudo embossed drawing data;
- a collection unit that collects information about a printing function from the printer device; and
- a recognition unit that recognizes, according to the information collected by the collection unit, whether the printer device is capable of embossed printing or not, wherein:
- when it is recognized by the recognition unit that the printer device is incapable of embossed printing, the pseudo embossed printing instruction device instructs pseudo embossed printing of the embossed print drawing command.

5. The printing instruction device according to claim 4, wherein the pseudo embossed drawing data generation unit generates, from the original data of the object, data which has the original data displaced in a prescribed direction and is expressed as a shadow of an image corresponding to the original data, and merges the generated data with the original data to generate the pseudo embossed drawing data.

6. The printing instruction device according to claim 4, wherein the pseudo embossed drawing data generation unit generates, from the original data of the object, data which has the original data displaced in a prescribed direction and brightness or chroma different from the original data added and is expressed as a shadow of an image corresponding to the original data, and merges the generated data with the original data to generate the pseudo embossed drawing data.

7. The printing instruction device according to claim 4, wherein the pseudo embossed drawing data generation unit generates the pseudo embossed drawing data by generating data, from the original data of the object, which has the entire original data enlarged and is expressed as a contour of an image corresponding to the original data, and merging the generated data with the original data.

8. The printing instruction device according to claim 4, wherein the pseudo embossed drawing data generation unit generates the pseudo embossed drawing data by generating data, from the original data of the object, which has the entire original data enlarged and brightness or chroma different from the original data added and is expressed as a contour of an image corresponding to the original data, and merging the generated data with the original data.

9. The printing instruction device according to claim 4, wherein the pseudo embossed drawing data generation unit generates the pseudo embossed drawing data by generating data, from the original data of the object, which has the entire original data enlarged, brightness or chroma different from the original data added and is expressed as a contour of an image corresponding to the original data, and merging the generated data with the original data.

10. A printer device which receives a print job from a printing instruction device and records an image according to the print job comprising:
- an embossed printing instruction unit that instructs embossed print setting including an object to be embossed-printed;
- an extraction unit that analyzes a non-embossed print drawing command which is included in the print job and needed to print a non-embossed image and extracts an object instructed by the embossed printing instruction unit;
- an embossed print drawing command generation unit that generates, in accordance with the extracted object, an embossed print drawing command needed for embossed printing of the object;
- an image processing unit that generates, according to the non-embossed print drawing command and the embossed print drawing command, print data capable of printing an object to be drawn as a non-embossed image by the non-embossed print drawing and extracts printing an object to be drawn by the embossed print drawing command as an embossed image satisfying the embossed print setting; and a priority setting unit that determines whether priority is given to the instruction from the printing instruction device or the printer device for the embossed print setting instruction, wherein:
the embossed print setting instruction by the embossed printing instruction unit is accepted when the priority setting unit determines to give priority to the instruction from the printer device.

11. The printer device according to claim 10, further comprising:
a judging unit that, when it is not determined by the priority setting unit to give priority to the instruction from the printer device, analyzes the print job received from the printing instruction device and judges whether the embossed print drawing command is added or not, wherein:
the image processing unit generates the print data according to the embossed print drawing command and the non-embossed print drawing command when the embossed print drawing command is added.

12. The printer device according to claim 10, wherein the embossed printing instruction device has a function to instruct as an object to be embossed-printed at least one of text, graphic, image, color, specific symbol in text, font and font modification.

13. A printer device that receives a print job from a printing instruction device and records an image according to the print job, comprising:
an accepting unit that accepts an instruction for pseudo embossed print setting containing an object to be pseudo embossed-printed from a device other than the printing instruction device;
an extraction unit that extracts the object subject to the pseudo embossed printing according to the pseudo embossed printing instruction accepted by the accepting unit from drawing data in the print job received from the printing instruction device when there is no pseudo embossed printing instruction from the pseudo embossed printing instruction unit;
a pseudo embossed drawing data generation unit that generates pseudo embossed drawing data to have the object expressed as a pseudo embossed image from the original data of the object extracted by the extraction unit; and
a printing unit that executes pseudo embossed printing the object to be pseudo embossed-printed according to the pseudo embossed drawing data;
a priority setting unit that determines whether priority is given to the instruction from the printing instruction device or the printer device according to the instruction about the embossed print setting; and
a priority control unit that controls to accept the embossed print setting instruction by the embossed printing instruction unit from either the printing instruction device or the printer device according to the setting by the priority setting unit.

14. A print processing system comprising:
a printing instruction device for generating a print job of document information as an object to be printed and sending it to a printer device;
the printer device for receiving the print job from the printing instruction device and recording an image according to the print job;
an embossed printing instruction unit that instructs embossed print settings including an object subject to embossed printing, the embossed printing instruction unit being disposed on at least one of the printing instruction device and the printer device;
a priority setting unit that determines whether priority is given to the instruction from the printing instruction device or the printer device according to the instruction about the embossed print setting; and
a priority control unit that controls to accept the embossed print setting instruction by the embossed printing instruction unit from either the printing instruction device or the printer device according to the setting by the priority setting unit.

15. The print processing system according to claim 14, wherein:
the printing instruction device comprises:
an extraction unit that analyzes the document information to be printed and extracts the object instructed by the embossed printing instruction unit;
an embossed print drawing command generation unit that generates an embossed print drawing command needed for the embossed printing of the object in accordance with the extracted object; and
a print job generation unit that generates the print job with the embossed print drawing command added to the non-embossed print drawing command needed for the non-embossed printing of the document information subject to printing.

16. The print processing system according to claim 14, wherein:
the printer device comprises:
an extraction unit that analyzes a non-embossed print drawing command which is contained in the print job received from the printing instruction device and needed for printing a non-embossed image and extracts the object instructed by the embossed printing instruction unit;
an embossed print drawing command generation unit that generates an embossed print drawing command needed for embossed printing of the object in accordance with the extracted object; and
an image processing unit that generates, according to the non-embossed print drawing command and the embossed print drawing command, print data capable of printing an object to be drawn as a non-embossed image by the non-embossed print drawing and printing an object subject to drawing by the embossed print drawing command as an embossed image satisfying the embossed print setting.

17. The print processing system according to claim 16, wherein:
the printer device is provided with a judging unit that analyzes the print job received from the printing instruction device and judges whether an embossed print drawing command is added when it is not determined by the priority setting unit that priority is given to the instruction of the printer device; and
the image processing unit generates the print data according to the embossed print drawing command and the non-embossed print drawing command when the embossed print drawing command is added.

18. The print processing system according to claim 14, wherein the embossed printing instruction unit has a function to instruct as an object to be embossed-printed at least one of text, graphic, image, color, specific symbol in text, font and font modification.

19. The print processing system according to claim 14, wherein:
at least one of the printing instruction device or the printer device is provided with a display unit and an input/operation unit; and the embossed printing instruction unit comprises:
a user interface unit that instructs the embossed print setting from the input/operation unit on a setting screen shown on the display unit.

20. A print processing system comprising:
a printing instruction device for generating a print job of document information as an object to be printed and sending it to a printer device for receiving the print job from the printing instruction device and recording an image according to the print job; and
an embossed printing instruction unit, that instructs embossed print settings including an object subject to embossed printing, is disposed on at least one of the printing instruction device and the printer device, wherein:
at least one of the printing instruction device or the printer device is provided with a Web server unit; and
the embossed printing instruction unit comprises:
a user interface unit that takes the embossed print setting instructed on the setting screen on the Web browser of an external terminal via the Web server.

21. A storage medium that stores a program which causes a printing instruction device, that generates a print job of document information as an object to be printed and sends it to a printer device, to process to generate the print job of document information, the program comprising:
an embossed printing instruction step of instructing embossed print setting containing an object to be embossed-printed;
an extraction step of extracting the object instructed by the embossed printing instruction step by analyzing the document information subject to printing;
an embossed print drawing command generation step of generating an embossed print drawing command needed for embossed printing of the object in accordance with the extracted object;
a print job generation step of generating the print job with the embossed print drawing command added to a non-embossed print drawing command needed for non-embossed printing of the document information to be printed; and
a priority setting step that determines whether priority is given to an instruction from the printing instruction device or the printing device for the instructing embossed print setting, wherein:
the embossed print setting instruction is accepted from either the printing instruction device or the printer device according to the priority set in the priority setting step.

22. The storage medium according to claim 21, wherein the embossed printing instruction step processes to instruct as an object to be embossed-printed at least one of text, graphic, image, color, specific symbol in text, font and font modification.

23. The storage medium according to claim 21, wherein:
the printing instruction device has a user interface unit comprising a display unit and an input unit; and
the embossed printing instruction step executes:
processing to display an embossed print setting screen including a selection tool for the text, graphic, image, color, specific symbol in text, font and font modification on the display unit; and
processing to accept the object selected by operating the selection tool on the embossed print setting screen from the input unit as the object subject to embossed printing.

24. A storage medium that stores a program which causes a printing instruction device, that generates a print job of document information as an object to be printed and sends it to a printer device, to process to generate the print data, causing to perform the following:
a pseudo embossed printing instruction step of instructing pseudo embossed print setting including an object subject to pseudo embossed printing;
an extraction step of extracting the object instructed by the pseudo embossed printing instruction step by analyzing the document information subject to printing; and
a pseudo embossed drawing data generation step of generating pseudo embossed drawing data to express the object as a pseudo embossed image from the original data of the object extracted by the extraction step; and
priority setting step of determining whether priority is given to the instruction from the printing instruction device or the printer device for the embossed print setting instruction, wherein:
the embossed print setting instruction is accepted when the priority setting step determines to give priority to the instruction from the printing instruction device.

25. The storage medium according to claim 24, wherein the pseudo embossed drawing data generation step is caused to perform the following:
generating, from the original data of the object, data which has the original data displaced in a prescribed direction and is expressed as a shadow of an image corresponding to the original data, and merging the generated data with the original data to generate the pseudo embossed drawing data.

26. The storage medium according to claim 24, wherein the pseudo embossed drawing data generation step is caused to perform the following:
generating, from the original data of the object, data which has the original data displaced in a prescribed direction and brightness or chroma different from the original data added and is expressed as a shadow of an image corresponding to the original data, and merges the generated data with the original data to generate the pseudo embossed drawing data.

27. The storage medium according to claim 24, wherein the pseudo embossed drawing data generation step is caused to perform the following:
generating the pseudo embossed drawing data by generating data, from the original data of the object, which has the entire original data enlarged and is expressed as a contour of an image corresponding to the original data, and merging the generated data with the original data.

28. The storage medium according to claim 24, wherein the pseudo embossed drawing data generation step is caused to perform the following:
generating the pseudo embossed drawing data by generating data, from the original data of the object, which has the entire original data enlarged and brightness or chroma different from the original data added and is expressed as a contour of an image corresponding to the original data, and merging the generated data with the original data.

29. The storage medium according to claim 24, wherein the pseudo embossed drawing data generation step is caused to perform the following:
generating the pseudo embossed drawing data by generating data, from the original data of the object, which has the entire original data enlarged, brightness or chroma different from the original data added and is expressed as a contour of an image corresponding to the original data, and merging the generated data with the original data.

30. A storage medium that stores a program which causes a printing instruction device, that generates a print job of document information as an object to be printed and sends it to a printer device, to process to generate the print data, causing to perform the following:
- an embossed printing instruction step of instructing pseudo embossed print setting including an object subject to embossed printing;
- an extraction step of extracting the object instructed by the embossed printing instruction step by analyzing the document information subject to printing;
- an embossed print drawing command generation step of generating an embossed print drawing command needed for embossed printing of the object in accordance with the extracted object;
- a pseudo embossed printing instruction step of instructing pseudo embossed printing of the embossed print drawing command;
- a pseudo embossed drawing data generation step of generating pseudo embossed drawing data to express the object as a pseudo embossed image from the original data of the extracted object when the pseudo embossed printing instruction is given by the pseudo embossed printing instruction step; and
- priority setting step of determining whether priority is given to the instruction from the printing instruction device or the printer device for the embossed print setting instruction, wherein:
- the embossed print setting instruction is accepted when the priority setting step determines to give priority to the instruction from the printing instruction device.

31. The storage medium according to claim 30, further causing to perform the following:
- a collection step of collecting information about a printing function from the printer device;
- a recognition step of recognizing whether the printer device can execute embossed printing according to the information collected by the collection step; and
- a step of instructing the pseudo embossed printing of the embossed print drawing command in the pseudo embossed printing instruction step when it is recognized by the recognition step that the printer device is incapable of executing embossed printing.

32. A print processing system executing print processing to print an image having a mixture of an embossed image according to document information subject to printing, comprising:
- an embossed printing instruction unit that instructs embossed output specifications including a height of the embossed image;
- an embossed print drawing command generation unit that generates an embossed print drawing command needed to print an object subject to embossed printing in the document information subject to printing according to the embossed output specifications instructed by the embossed printing instruction unit; and
- a printing unit that generates embossed print data according to the embossed print drawing command generated by the embossed print drawing command generation unit and prints out an object subject to drawing by the embossed print drawing command as an embossed image satisfying the embossed output specifications instructed by the embossed printing instruction unit,
- the printing unit retains predetermined fixed embossed output specifications and generates the embossed print data by modifying the fixed embossed output specifications according to the embossed print drawing command generated by the embossed print drawing command generation unit.

33. The print processing system according to claim 32, wherein the embossed printing instruction unit is further provided with a unit that instructs the object subject to embossed printing.

34. The print processing system according to claim 32, wherein the embossed printing instruction unit is provided with a unit that instructs a height of an embossed image as the embossed output specifications.

35. The print processing system according to claim 32, wherein the embossed printing instruction unit is provided with a unit that instructs an enlargement/reduction ratio of an embossed image as the embossed printing specifications.

36. The print processing system according to claim 32, wherein the embossed printing instruction unit is provided with a unit that instructs a relief shape of an embossed image as the embossed printing specifications.

37. The print processing system according to claim 32, wherein the embossed printing instruction unit is provided with a unit that adds colors to an embossed image as the embossed printing specifications.

38. The print processing system according to claim 37, wherein the embossed printing instruction unit is further provided with a unit that instructs the colors to be added when the addition of colors to the embossed image is instructed as the embossed printing specifications.

39. The print processing system according to claim 38, wherein the embossed printing instruction unit is provided with a unit that instructs any of gradation, stripes or a check of a single color or plural colors as the color to be added to the embossed image.

40. The print processing system according to claim 32, wherein the embossed printing instruction unit is provided with a unit that adds a vertical interval to the surface of an embossed image as the embossed printing specifications.

41. The print processing system according to claim 32, wherein the embossed printing instruction unit is provided with a unit that instructs whether an embossed image is printed before or after the non-embossed image is printed as the embossed printing specifications.

42. The print processing system according to claim 32, wherein the embossed printing instruction unit is provided with a unit that instructs a height processing method when embossed images are overlapped as the embossed printing specification.

43. The print processing system according to claim 42, wherein the embossed printing instruction unit is provided with a unit, as the height processing method when the embossed images are overlapped, for instructing any of increasing a height of the overlapped area by n times according to the number of overlaps n, increasing a height of the overlapped area to a height of any embossed image, rendering the overlapped area as non-embossed, or calculating a height of the overlapped area by a logic operation.

44. The print processing system according to claim 32, wherein the embossed printing instruction unit is provided with a unit that instructs to convert a attribute value of the original data of the embossed image into a height as the embossed printing specifications.

45. The print processing system according to claim 44, wherein the embossed printing instruction unit is provided with a unit that instructs any of a hue, brightness or a chroma as a attribute value of the original data of the embossed image to be converted into the height.

46. The print processing system according to claim 32, wherein the embossed printing instruction unit is provided with a display unit and an input/operation unit and comprised of a user interface unit that instructs the embossed output specifications from the input/operation unit on a setting screen shown on the display device.

47. A print processing system executing print processing to print an image having a mixture of an embossed image according to document information subject to printing, comprising:

an embossed printing instruction unit that instructs embossed output specifications including a height of the embossed image;

an embossed print drawing command generation unit that generates an embossed print drawing command needed to print an object subject to embossed printing in the document information subject to printing according to the embossed output specifications instructed by the embossed printing instruction unit; and a printing unit that generates embossed print data according to the embossed print drawing command generated by the embossed print drawing command generation unit and prints out an object subject to drawing by the embossed print drawing command as an embossed image satisfying the embossed output specifications instructed by the embossed printing instruction unit, wherein the embossed printing instruction unit is provided with a Web server unit and composed of a user interface unit that takes instruction contents of the embossed output specifications being input on the setting screen of the Web browser of an external terminal via the Web server.

48. A print processing system which comprises a printing instruction device for generating a print job of document information as an object to be printed and sending it to a printer device and the printer device for receiving the print job from the printing instruction device and recording an image according to the print job, the printing instruction device is provided with:

a pseudo embossed printing instruction unit that instructs pseudo embossed print setting including an object to be pseudo embossed-printed;

an extraction unit that extracts the object instructed by the pseudo embossed printing instruction unit by analyzing the document information to be printed;

a pseudo embossed drawing data generation unit that generates pseudo embossed drawing data to express the object as a pseudo embossed image from the original data of the object extracted by the extraction unit; and a print job generation unit that generates a print job including the pseudo embossed drawing data, wherein the printer device is provided with:

a printing unit that executes pseudo embossed printing of the object subject to the pseudo embossed printing according to the pseudo embossed drawing data in the print job received from the printing instruction device;

an accepting unit that accepts an instruction for pseudo embossed print setting containing an object subject to pseudo embossed printing from a device other than the printing instruction device;

an extraction unit that extracts the object subject to the pseudo embossed printing according to the pseudo embossed printing instruction accepted by the accepting unit from drawing data in the print job received from the printing instruction device when there is no pseudo embossed printing instruction from the pseudo embossed printing instruction unit;

a pseudo embossed drawing data generation unit that generates pseudo embossed drawing data to have the object expressed as a pseudo embossed image from the original data of the object extracted by the extraction unit; and a printing unit that executes pseudo embossed printing of the object subject to the pseudo embossed printing according to the pseudo embossed drawing data.

49. A printing instruction device that generates a print job of document information as an object subject to printing and sends it to a printer device comprising:

an embossed printing instruction unit that includes embossed output specifications containing an object subject to embossed printing and a height of the embossed image when the object is printed as an embossed image;

an extraction unit that extracts the object instructed by the embossed printing instruction unit by analyzing the document information subject to printing;

an embossed print drawing command generation unit that generates an embossed print drawing command needed to print the object subject to embossed printing in the document information subject to printing according to the embossed output specifications instructed by the embossed printing instruction unit;

a pseudo embossed printing instruction unit that instructs pseudo embossed printing of the embossed print drawing command;

a pseudo embossed drawing data generation unit that, when a pseudo embossed printing instruction is executed by the pseudo embossed printing instruction unit, generates pseudo embossed drawing data to have the object expressed as a pseudo embossed image from the original data of the extracted object;

a print job generation unit that generates a print job including the pseudo embossed drawing data;

a collection unit that collects information about a printing function from the printer device; and a recognition unit that recognizes whether the printer device can execute embossed printing according to the information collected by the collection unit; wherein:

when it is recognized by the recognition unit that the printer device is incapable of executing embossed printing, pseudo embossed printing of an embossed print drawing command is instructed from the pseudo embossed printing instruction unit.

50. A printing instruction device that generates a print job of document information as an object subject to printing and sends it to a printer device, comprising:

an embossed printing instruction unit that includes embossed output specifications containing an object subject to embossed printing and a height of the embossed image when the object is printed as an embossed image;

an extraction unit that extracts the object instructed by the embossed printing instruction unit by analyzing the document information subject to printing;

an embossed print drawing command generation unit that generates an embossed print drawing command needed to print the object subject to embossed printing in the document information subject to printing according to the embossed output specifications instructed by the embossed printing instruction unit;

a pseudo embossed printing instruction unit that instructs pseudo embossed printing of the embossed print drawing command;

a pseudo embossed drawing data generation unit that, when a pseudo embossed printing instruction is executed by the pseudo embossed printing instruction unit, generates pseudo embossed drawing data to have the object expressed as a pseudo embossed image from the original data of the extracted object; and a print job generation unit that generates a print job including the pseudo embossed drawing data, wherein:

the pseudo embossed drawing data generation unit generates, from the original data of the object, data which has the original data displaced in a prescribed direction and is expressed as a shadow of an image corresponding to the original data, and merges the generated data with the original data to generate the pseudo embossed drawing data.

51. A printing instruction device that generates a print job of document information as an object subject to printing and sends it to a printer device, comprising:

an embossed printing instruction unit that includes embossed output specifications containing an object subject to embossed printing and a height of the embossed image when the object is printed as an embossed image;

an extraction unit that extracts the object instructed by the embossed printing instruction unit by analyzing the document information subject to printing;

an embossed print drawing command generation unit that generates an embossed print drawing command needed to print the object subject to embossed printing in the document information subject to printing according to the embossed output specifications instructed by the embossed printing instruction unit;

a pseudo embossed printing instruction unit that instructs pseudo embossed printing of the embossed print drawing command;

a pseudo embossed drawing data generation unit that, when a pseudo embossed printing instruction is executed by the pseudo embossed printing instruction unit, generates pseudo embossed drawing data to have the object expressed as a pseudo embossed image from the original data of the extracted object; and a print job generation unit that generates a print job including the pseudo embossed drawing data, wherein:

the pseudo embossed drawing data generation unit generates, from the original data of the object, data which has the original data displaced in a prescribed direction and brightness or chroma different from the original data added and is expressed as a shadow of an image corresponding to the original data, and merges the generated data with the original data to generate the pseudo embossed drawing data.

52. A printing instruction device that generates a print job of document information as an object subject to printing and sends it to a printer device, comprising:

an embossed printing instruction unit that includes embossed output specifications containing an object subject to embossed printing and a height of the embossed image when the object is printed as an embossed image;

an extraction unit that extracts the object instructed by the embossed printing instruction unit by analyzing the document information subject to printing;

an embossed print drawing command generation unit that generates an embossed print drawing command needed to print the object subject to embossed printing in the document information subject to printing according to the embossed output specifications instructed by the embossed printing instruction unit;

a pseudo embossed printing instruction unit that instructs pseudo embossed printing of the embossed print drawing command;

a pseudo embossed drawing data generation unit that, when a pseudo embossed printing instruction is executed by the pseudo embossed printing instruction unit, generates pseudo embossed drawing data to have the object expressed as a pseudo embossed image from the original data of the extracted object; and a print job generation unit that generates a print job including the pseudo embossed drawing data, wherein:

the pseudo embossed drawing data generation unit generates the pseudo embossed drawing data by generating data, from the original data of the object, which has the entire original data enlarged and is expressed as a contour of an image corresponding to the original data, and merging the generated data with the original data.

53. A printing instruction device that generates a print job of document information as an object subject to printing and sends it to a printer device, comprising:

an embossed printing instruction unit that includes embossed output specifications containing an object subject to embossed printing and a height of the embossed image when the object is printed as an embossed image;

an extraction unit that extracts the object instructed by the embossed printing instruction unit by analyzing the document information subject to printing;

an embossed print drawing command generation unit that generates an embossed print drawing command needed to print the object subject to embossed printing in the document information subject to printing according to the embossed output specifications instructed by the embossed printing instruction unit;

a pseudo embossed printing instruction unit that instructs pseudo embossed printing of the embossed print drawing command;

a pseudo embossed drawing data generation unit that, when a pseudo embossed printing instruction is executed by the pseudo embossed printing instruction unit, generates pseudo embossed drawing data to have the object expressed as a pseudo embossed image from the original data of the extracted object; and a print job generation unit that generates a print job including the pseudo embossed drawing data, wherein:

the pseudo embossed drawing data generation unit generates data, from the original data of the object, which has the entire original data enlarged and brightness or chroma different from the original data added and is expressed as a contour of an image corresponding to the original data, and merging the generated data with the original data.

54. A printing instruction device that generates a print job of document information as an object subject to printing and sends it to a printer device, comprising:

an embossed printing instruction unit that includes embossed output specifications containing an object subject to embossed printing and a height of the embossed image when the object is printed as an embossed image;

an extraction unit that extracts the object instructed by the embossed printing instruction unit by analyzing the document information subject to printing;

an embossed print drawing command generation unit that generates an embossed print drawing command needed to print the object subject to embossed printing in the document information subject to printing according to the embossed output specifications instructed by the embossed printing instruction unit;

a pseudo embossed printing instruction unit that instructs pseudo embossed printing of the embossed print drawing command;

a pseudo embossed drawing data generation unit that, when a pseudo embossed printing instruction is executed by the pseudo embossed printing instruction unit, generates pseudo embossed drawing data to have the object expressed as a pseudo embossed image from the original data of the extracted object; and a print job generation unit that generates a print job including the pseudo embossed drawing data, wherein:

the pseudo embossed drawing data generation unit generates data, from the original data of the object, which has the entire original data enlarged, brightness or chroma different from the original data added and is expressed as a contour of an image corresponding to the original data, and merging the generated data with the original data.

55. A print process system, comprising:

a unique data adding unit that adds unique data to text data;

an embossed printing instruction unit that instructs whether the unique data to be added to the text data is embossed-printed or not;

a unique data embossing instruction processing unit that adds the unique data to the text data and outputting it including an embossed printing instruction to the unique data when embossed printing of the unique data is instructed by the embossed printing instruction unit;

an embossment data processing unit that recognizes unique data in the data according to a unique data embossed printing instruction in the data being output from the unique data embossing instruction processing unit as embossment data to be embossed-printed and executes processing to output the unique data recognized as the embossment data and the text data not recognized as the embossment data as an embossed image and an ordinary image;

the unique data embossing instruction processing unit has an embossed drawing control command generation unit that generates an embossed drawing control command including an embossing instruction control command which instructs the unique data to be added to the text data as an object subject to embossed drawing, and uses the embossing instruction control command to execute the unique data embossed printing instruction, wherein the embossed drawing control command generation unit includes a unit that generates a command in a form describing a drawing control command of unique data subject to embossed drawing between the start command and the end command for embossed drawing as the embossing instruction control command.

56. A print process system, comprising:

a unique data adding unit that adds unique data to text data;

an embossed printing instruction unit that instructs whether the unique data to be added to the text data is embossed-printed or not;

a unique data embossing instruction processing unit that adds the unique data to the text data and outputting it including an embossed printing instruction to the unique data when embossed printing of the unique data is instructed by the embossed printing instruction unit;

an embossment data processing unit that recognizes unique data in the data according to a unique data embossed printing instruction in the data being output from the unique data embossing instruction processing unit as embossment data to be embossed-printed and executes processing to output the unique data recognized as the embossment data and the text data not recognized as the embossment data as an embossed image and an ordinary image;

the unique data embossing instruction processing unit has an embossed drawing control command generation unit that generates an embossed drawing control command including an embossing instruction control command which instructs the unique data to be added to the text data as an object subject to embossed drawing, and uses the embossing instruction control command to execute the unique data embossed printing instruction, wherein the embossment data processing unit has a development unit that recognizes, as embossment data and developing as an embossed print image, unique data subject to drawing by the embossing instruction control command in the embossed drawing control command output from the embossed drawing control command generation unit, and recognizing the unique data to be embossed-printed by the embossing instruction control command in the embossed drawing control command output from the unique data embossing instruction processing unit.

57. A print processing system comprising a unique data adding device for adding unique data to text data and an output device for executing image print output processing according to the text data to which the unique data is added, wherein:

the unique data adding device is provided with:

an embossed printing instruction unit that instructs whether the unique data to be added to the text data is embossed-printed or not; and a unique data embossing instruction processing unit that adds the unique data to the text data and outputs it with an embossed printing instruction to the unique data included when embossed printing of the unique data is instructed by the embossed printing instruction unit, wherein:

the output device is provided with an embossment data processing unit that recognizes the unique data in the data as embossment data to be embossed-printed according to the unique data embossed printing instruction in the data to be output from the unique data embossing instruction processing unit and executes processing to output the unique data recognized as the embossment data and the text data not recognized as the embossment data as an embossed image and an ordinary image, respectively, and the unique data adding device is a data decomposition processing device that previously stores form data as the unique data, adds form data corresponding to a form file name contained in print data under the printing instruction from the printing instruction device to the text data contained in the print data and sends it, and the unique data embossing instruction processing unit includes an embossment data generation unit that, when embossed printing of the unique data is instructed by the embossed printing instruction unit, generates data for embossed printing containing ordinary print data for ordinary printing of the text data and forms embossed print data enabling execution of embossed printing of the form data to be added to the text data.

58. The print processing system according to claim 57, wherein:
- the unique data adding device is a printing instruction device which sends print data generated by adding the unique data to the text data; and
- the unique data embossing instruction processing unit includes an embossing PDL command generation unit that generates as the print data an embossing PDL command comprising a PDL command to draw the text data and an embossing instruction PDL command to instruct the unique data to be added to the text data as the subject to be embossed-drawn.

59. The print processing system according to claim 58, wherein the embossing PDL command generation unit includes a unit that generates as the embossing instruction PDL command a PDL command in a form describing a PDL command of unique data subject to embossed drawing between the start command and the end command of embossed drawing.

60. The print processing system according to claim 58, wherein:
- the output device is a printer device that receives the embossing PDL command being sent from the print instruction device and prints out an image, and
- the embossment data processing unit includes:
- a development unit that executes bitmap development of the unique data and text data to be controlled by the embossing instruction PDL command and the PDL command in the received embossing PDL command as embossed image data and non-embossed image data respectively, and
- an image forming unit that forms an image having a mixture of an embossed image corresponding to the embossed image data and a non-embossed image corresponding to the non-embossed image data according to the developed bitmap data.

61. The print processing system according to claim 57, wherein:
- the output device is an image processing device for receiving the data for embossed printing from the data decomposition processing device to execute image processing, and
- the embossment data processing unit includes an image processing unit that analyzes the data for embossed printing received from the embossment data generation unit, and executing image processing to print the ordinary print data as an ordinary image and the form embossed print data as an embossed image.

62. A print processing system comprising software having functions to generate text data and to add unique data to the text data and a printing instruction device that receives print data having the unique data added to the text data from the software and gives a print instruction of the print data to an output device, wherein:
- the software is provided with:
- an embossed printing instruction unit that instructs whether the unique data to be added to the text data is embossed-printed or not;
- a print data generation unit that generates the print data by adding data for executing embossed printing of the unique data to the text data according to an instruction of embossed printing of the unique data from the embossed printing instruction unit, and sending it to the printing instruction device; and
- an embossed printing function inquiry unit that inquires of the printing instruction device whether it has an embossed printing function or not, and
- the printing instruction device is provided with:
- an embossed drawing command generation unit that analyzes the print data to be received from the software, generates data for embossed printing of unique data from the data for the embossed printing of the unique data, and generates an embossed print drawing command containing data for ordinary printing of the text data, and
- the print data generation unit includes:
- a unit that, when it is noticed from the printing instruction unit in response to the inquiry that it has an embossed printing function, specifies information capable of recognizing data for embossed printing by the embossed printing function to describe the data instructed to execute embossed printing by a character string or a command capable of recognizing the embossed print data to generate the print data.

63. The print processing system according to claim 62, wherein the print data generation unit includes a unit that generates the print data by compiling the data for ordinary printing and the data for embossed printing of the unique data in an independent form.

64. The print processing system according to claim 62, wherein the print data generation unit includes a unit that embeds the data for embossed printing of the unique data into the data for ordinary printing to generate and sending the print data.

* * * * *